(12) United States Patent
Imoto et al.

(10) Patent No.: US 10,464,300 B2
(45) Date of Patent: Nov. 5, 2019

(54) METHOD FOR MANUFACTURING PNEUMATIC TIRE

(71) Applicant: SUMITOMO RUBBER INDUSTRIES, LTD., Kobe-shi, Kyogo (JP)

(72) Inventors: Yoji Imoto, Kobe (JP); Mutsuki Sugimoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 462 days.

(21) Appl. No.: 15/223,964

(22) Filed: Jul. 29, 2016

(65) Prior Publication Data

US 2016/0368256 A1  Dec. 22, 2016

Related U.S. Application Data

(62) Division of application No. 14/349,369, filed as application No. PCT/JP2012/069157 on Jul. 27, 2012, now abandoned.

(30) Foreign Application Priority Data

Oct. 4, 2011 (JP) ................................. 2011-219824
Oct. 21, 2011 (JP) ................................. 2011-231680
(Continued)

(51) Int. Cl.
*B32B 38/00* (2006.01)
*B29D 30/30* (2006.01)
(Continued)

(52) U.S. Cl.
CPC ...... *B32B 38/0004* (2013.01); *B29D 30/0681* (2013.01); *B29D 30/30* (2013.01);
(Continued)

(58) Field of Classification Search
CPC .. B32B 38/0004; B29D 30/0681; B29D 30/30
See application file for complete search history.

(56) References Cited

U.S. PATENT DOCUMENTS

2009/0032155 A1*  2/2009  Matsuzawa ............. B60C 17/01
                                                                    152/152
2009/0068476 A1    3/2009  Kirino
(Continued)

FOREIGN PATENT DOCUMENTS

CN   101823409 A   9/2010
CN   102009511 A   4/2011
(Continued)

OTHER PUBLICATIONS

International Search Report issued in PCT/JP2012/069157, dated Oct. 23, 2012.
(Continued)

*Primary Examiner* — Jacob T Minskey
*Assistant Examiner* — Melody Tsui
(74) *Attorney, Agent, or Firm* — Birch, Stewart, Kolasch & Birch LLP

(57) ABSTRACT

In a method for manufacturing a pneumatic tire, molding of a green tire has an assembly step of bonding an inner liner and an unvulcanized rubber sheet with end portions thereof in a width direction being displaced from each other by 50 mm to 500 mm in the width direction to manufacture a laminate, cutting the laminate to have a constant length corresponding to a width of a drum to manufacture a cut sheet, and a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions (Continued)

of the joined end portions are displaced by a constant distance.

7 Claims, 6 Drawing Sheets

(30) Foreign Application Priority Data

| Oct. 26, 2011 | (JP) | 2011-234798 |
|---|---|---|
| Nov. 9, 2011 | (JP) | 2011-245507 |
| Nov. 22, 2011 | (JP) | 2011-255133 |
| Nov. 29, 2011 | (JP) | 2011-260390 |
| Mar. 23, 2012 | (JP) | 2012-067250 |

(51) Int. Cl.

| B29D 30/06 | (2006.01) |
|---|---|
| B32B 25/08 | (2006.01) |
| B32B 25/12 | (2006.01) |
| B32B 25/18 | (2006.01) |
| B32B 27/08 | (2006.01) |
| B32B 27/18 | (2006.01) |
| B32B 27/28 | (2006.01) |
| B32B 27/30 | (2006.01) |
| B32B 27/34 | (2006.01) |
| B60C 1/00 | (2006.01) |
| B60C 5/14 | (2006.01) |

(52) U.S. Cl.
CPC .......... *B29D 30/3007* (2013.01); *B32B 25/08* (2013.01); *B32B 25/12* (2013.01); *B32B 25/18* (2013.01); *B32B 27/08* (2013.01); *B32B 27/18* (2013.01); *B32B 27/285* (2013.01); *B32B 27/302* (2013.01); *B32B 27/306* (2013.01); *B32B 27/34* (2013.01); *B60C 1/0008* (2013.01); *B29D 2030/0682* (2013.01); *B29D 2030/3085* (2013.01); *B32B 2250/02* (2013.01); *B32B 2270/00* (2013.01); *B32B 2274/00* (2013.01); *B32B 2307/712* (2013.01); *B32B 2307/7242* (2013.01); *B32B 2605/00* (2013.01); *B60C 2005/145* (2013.01)

(56) References Cited

U.S. PATENT DOCUMENTS

| 2010/0126647 | A1 | 5/2010 | Hashimura et al. | |
|---|---|---|---|---|
| 2010/0181000 | A1* | 7/2010 | Takahashi | B29D 30/0681 |
| | | | | 152/532 |
| 2010/0294411 | A1 | 11/2010 | Custodero et al. | |
| 2011/0011511 | A1* | 1/2011 | Miyazaki | B60C 1/0008 |
| | | | | 152/564 |
| 2011/0056604 | A1 | 3/2011 | Sugimoto | |
| 2011/0060082 | A1 | 3/2011 | Sugimoto | |
| 2012/0003413 | A1 | 1/2012 | Lesage et al. | |
| 2013/0220519 | A1 | 8/2013 | Sugimoto | |

FOREIGN PATENT DOCUMENTS

| CN | 102010561 A | 4/2011 | | |
|---|---|---|---|---|
| EP | 0 206 756 A2 | 12/1986 | | |
| EP | 0 265 053 B1 | 10/1996 | | |
| JP | 62-048704 A | 3/1987 | | |
| JP | 64-062308 A | 3/1989 | | |
| JP | 9-165469 A | 6/1997 | | |
| JP | 2007-223089 A | 9/2007 | | |
| JP | 2007-291256 A | 11/2007 | | |
| JP | 2008-24215 A | 2/2008 | | |
| JP | 2008-127443 A | 6/2008 | | |
| JP | 2009-208444 A | 9/2009 | | |
| JP | 2010-005986 A | 1/2010 | | |
| JP | 2010-013646 A | 1/2010 | | |
| JP | 2010005986 A * | 1/2010 | ......... | B29D 30/0681 |
| JP | 2010-100082 A | 5/2010 | | |
| JP | 2010-100675 A | 5/2010 | | |
| JP | 2010 167829 A | 8/2010 | | |
| JP | 2010-528919 A | 8/2010 | | |
| JP | 2010-195864 A | 9/2010 | | |
| JP | 2010-195969 A | 9/2010 | | |
| JP | 2010-208109 A | 9/2010 | | |
| JP | 4551005 B2 | 9/2010 | | |
| JP | 2011-051320 A | 3/2011 | | |
| JP | 2011-057788 A | 3/2011 | | |
| JP | 2012-102269 A | 5/2012 | | |
| JP | 2012-510389 A | 5/2012 | | |
| WO | WO 2006/121140 A1 | 11/2006 | | |
| WO | WO 2008/029781 A1 | 3/2008 | | |
| WO | WO-2009119232 A1 * | 10/2009 | ........... | B60C 1/0008 |
| WO | WO 2010/063427 A1 | 6/2010 | | |
| WO | WO 2012/066816 A1 | 5/2012 | | |

OTHER PUBLICATIONS

Office Action dated Jan. 14, 2014 in Japanese Patent Application 2011-245507 and English translation.
Office Action dated Jun. 25, 2013 in Japanese Patent Application 2011-255133 and English translation.
Office Action dated Mar. 5, 2013 in Japanese Patent Application 2011-219824 and English translation.
Office Action dated May 21, 2013 in Japanese Patent Application 2011-231680 and English translation.
Office Action dated May 7, 2013 in Japanese Patent Application 2011-219824 and English translation.
Office Action dated Sep. 3, 2013 in Japanese Patent Application 2011-234798 and English translation.
Office Action dated Sep. 3, 2013 in Japanese Patent Application 2012-067250 and English translation.
Chinese Office Action and Search Report, dated Sep. 15, 2015, for Chinese Application No. 201280049273.4, along with English translations.
Extended European Search Report for European Application No. 12838681.0, dated Dec. 8, 2015.
Machine generated English language translation of JP 2009-208444 (original document dated Sep. 2009).
Machine generated English language translation of JP 2010-005986 (original document dated Jan. 2010).
Non-Final Office Action (Restriction Requirement) in parent application U.S. Appl. No. 14/349,369 dated Sep. 4, 2015.
Non-Final Office Action in parent application dated Jan. 6, 2016.
Office Action dated Jan. 14, 2014 in Japanese Patent Application 2011-245507.
Office Action dated Jun. 25, 2013 in Japanese Patent Application 2011-255133.
Office Action dated Mar. 5, 2013 in Japanese Patent Application 2011-219824.
Office Action dated May 21, 2013 in Japanese Patent Application 2011-231680.
Office Action dated May 7, 2013 in Japanese Patent Application 2011-219824.
Office Action dated Sep. 3, 2013 in Japanese Patent Application 2011-234798.
Office Action dated Sep. 3, 2013 in Japanese Patent Application 2012-067250.

* cited by examiner

FIG.3
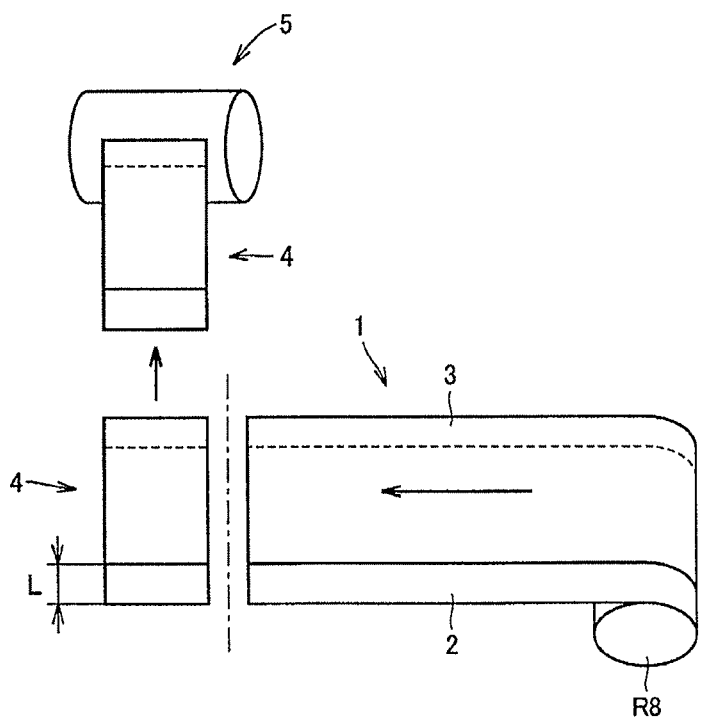
FIG. 4(A)
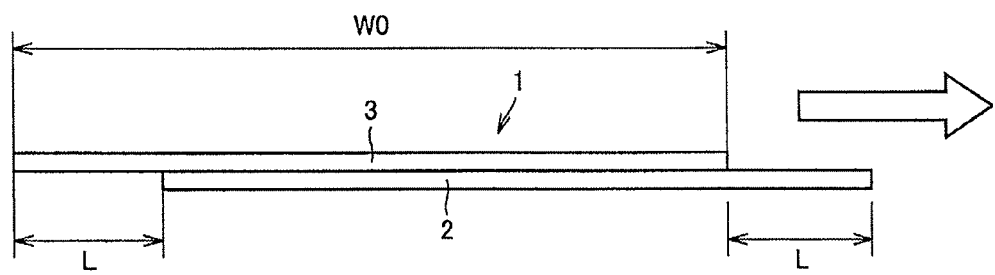
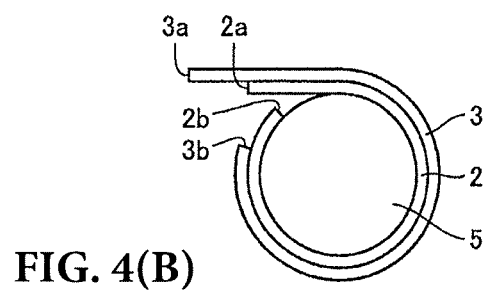
FIG. 4(B)

FIG. 6(A)
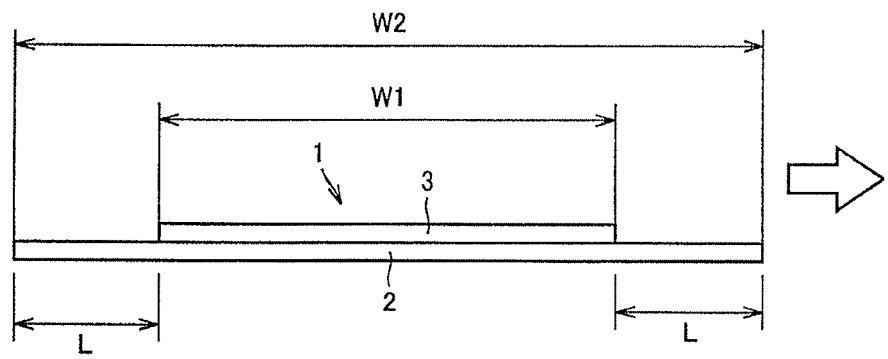
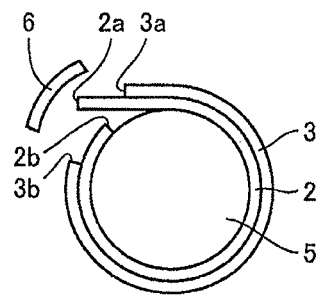
FIG. 6(B)
FIG.7
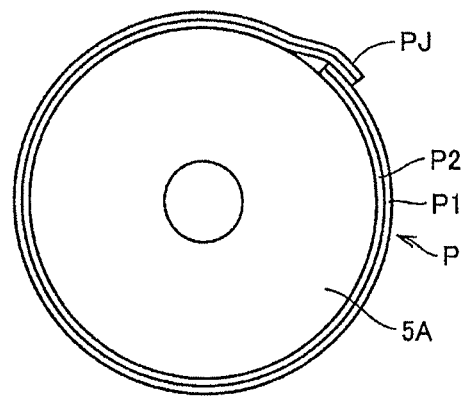

METHOD FOR MANUFACTURING PNEUMATIC TIRE

CROSS-REFERENCES

This application is a Divisional of copending application Ser. No. 14/349,369 filed on Apr. 3, 2014, which was filed as PCT International Application No. PCT/JP2012/069157 on Jul. 27, 2012, which claims the benefit under 35 U.S.C. § 119(a) to Patent Applications No. 2012-067250 filed in Japan on Mar. 23, 2012, No. 2011/260390 filed in Japan on Nov. 29, 2011, No. 2011-255133 filed in Japan on Nov. 22, 2011, No. 2011-245507 filed in Japan on Nov. 9, 2011, No. 2011-234798 filed in Japan on Oct. 26, 2011, No. 2011-231680 filed in Japan on Oct. 21, 2011, and No. 2011-219824 filed in Japan on Oct. 4, 2011, all of which are hereby expressly incorporated by reference into the present application.

TECHNICAL FIELD

The present invention relates to a method for manufacturing a pneumatic tire, in particular to a method for molding an inner liner, and to a method for manufacturing a pneumatic tire including the step of molding a green tire by manufacturing a laminate of an inner liner and an unvulcanized rubber sheet such as a carcass ply.

BACKGROUND ART

Recently, weight saving of tires has been pursued because of strong social demands for fuel efficiency of automobiles. Of tire members, weight saving has also been required for an air shutoff layer (inner liner) which is disposed inside a tire and is required to reduce leakage of air from the inside to the outside of a pneumatic tire.

At present, for a rubber composition for the air shutoff layer, a rubber formulation mainly composed of butyl rubber which contains, for example, 70 to 100% by mass of butyl rubber and 30 to 0% by mass of natural rubber is used to improve air permeation resistance of the tire. Further, the rubber formulation mainly composed of butyl rubber contains, in addition to butylene, about 1% by mass of isoprene, which allows intermolecular co-crosslinking with an adjacent rubber layer along with sulfur, a vulcanization accelerator, and zinc white. The butyl-based rubber having a general formulation is required to have a thickness of about 0.6 to 1.0 mm for tires for passenger cars, and a thickness of about 1.0 to 2.0 mm for tires for trucks and buses. To pursue weight saving of tires, there has been a demand for a polymer which is more excellent in air permeation resistance and allows a further reduction in the thickness of the air shutoff layer, when compared with the butyl-based rubber.

In molding a green tire for a pneumatic tire, when an inner liner P is molded on a drum 5A as shown in FIG. 7, generally, an inner liner film P2 is bonded to an unvulcanized inner liner rubber P1 beforehand on a conveyer, with positions of both end edges in a longitudinal direction being aligned, to produce a laminate, the laminate is wound on a band over its entire circumference with inner liner film P2 of the laminate being disposed on an inner surface side, both end portions of the laminate are overlapped with each other at one location on the circumference to form a joint PJ, and thereafter a stitching roller is used to press joint PJ of the laminate and remove air.

In such a technique, since inner liner film P2 and unvulcanized inner liner rubber P1 are bonded beforehand with the positions of their both end edges in the longitudinal direction being aligned, and thereafter wound on the drum, joint PJ formed on the circumference of drum 5A inevitably has a large thickness when the both end portions of the laminate are overlapped and joined on the drum. Thus, even if the stitching roller is applied over joint PJ, air may remain at joint PJ, and if the remaining air expands by vulcanization molding of the green tire, joint PJ of laminate P may peel off.

In addition, since the end portions of laminate P form the joint at one location on the circumference of drum 5A in this technique, peeling-off of the joint of the inner liner of the molded green tire may cause a damage to an adjacent carcass ply.

It has been proposed in conventional techniques to use a thermoplastic elastomer for an inner liner with the intention to achieve weight saving of a pneumatic tire. However, the material, which is thinner and has a higher air permeation resistance than an inner liner made of butyl-based rubber, is inferior to the inner liner made of butyl-based rubber in vulcanization adhesive strength with insulation rubber and carcass ply rubber adjacent to the inner liner.

In particular, if the joint of the inner liner has a weak adhesive strength, the joint may peel off during driving, which may cause a reduction in the internal pressure of the tire, and burst of the tire. Further, since the joint has a structure in which another member is exposed inside, an air leakage path may be formed, and a reduction in the internal pressure of the tire is likely to be caused.

Japanese Patent Laying-Open No. 2009-208444 (PTD 1) discloses a technique of molding an unvulcanized tire by bonding an inner liner film and an unvulcanized rubber sheet with both ends in an extending direction being displaced from each other, and winding the tacky body on a drum.

However, in order to displace the both ends in the extending direction from each other, it is necessary to cut each member one by one to have a constant size, and individually bond the members with being displaced from each other, which may deteriorate productivity. Further, depending on the bonding method, accuracy is deteriorated and air remains between the films, which may cause a damage during vulcanization of the tire.

Japanese Patent Laying-Open No. 2007-291256 (PTD 2) discloses a pneumatic tire including a rubber composition for an inner liner containing an ethylene-vinyl alcohol copolymer in the range of 15 to 30 parts by mass relative to 100 parts by mass of a rubber component made of natural rubber and/or synthetic rubber. However, this technique is not preferable from the viewpoint of weight saving of tires since the inner liner has a large thickness of 1 mm.

Japanese Patent Laying-Open No. 9-165469 (PTD 3) discloses a nylon film used as an inner liner. The document discloses manufacturing a pneumatic tire by subjecting the nylon film to RFL treatment and thereafter bonding the nylon film to a tire inner surface or a carcass layer with a rubber cement made of a rubber composition.

This technique has a problem that it results in complicated steps. Further, in a vulcanization step in which vulcanization molding is generally performed with an unvulcanized tire accommodated within a mold being pressed against an inner surface of the mold from an inner side of the unvulcanized tire, the inner liner made of the nylon film sticks and adheres to a bladder and is damaged when the bladder is heated during vulcanization.

Japanese Patent Laying-Open No. 2010-013646 (PTD 4) proposes improving adhesive strength by using petroleum resin or terpene resin as a tackifier, for an SIBS as a thermoplastic elastomer. However, a polyamide-based polymer is blended in addition to the SIBS, causing a reduction in flex crack resistance.

Further, Japanese Patent Laying-Open No. 2010-100675 (PTD 5) proposes improving adhesiveness with carcass ply rubber by using natural rosin, terpene, chromane indene resin, petroleum resin, alkylphenol resin, or the like as a tackifier, for a blended material of an SIBS and a sulfur-crosslinkable polymer.

However, in the technique of blending 10 to 300 parts by weight of the sulfur-vulcanizable polymer relative to 100 parts by weight of the SIBS, when the sulfur-crosslinkable polymer is less than or equal to 100 parts by weight, the SIBS serves as a matrix (sea portion) and the sulfur-crosslinkable polymer serves as a domain structure (island portion), and adhesive strength with the carcass rubber at a contact interface is not improved. Further, when the sulfur-crosslinkable polymer is more than or equal to 100 parts by weight, gas barrier property is deteriorated in other than butyl rubber, and adhesive strength is deteriorated in butyl rubber. In addition, depending on a polymer to be blended, tackiness is increased, and it is not possible to fabricate a film with a thickness of 600 μm or less.

In International Publication No. 2008-029781 (PTD 6), a tire is manufactured using strips of a film laminate obtained by blending a thermoplastic resin with a thermoplastic elastomer. By employing a laminate, gas barrier property and adhesiveness can be improved, which enables junction between the ribbon-shaped strips. However, in this technique, an unvulcanized green cover of the film laminate has a constant gauge, and if the gauge is thinned, a vulcanized tire may have a thinned finish at a buttress part or the like.

CITATION LIST

Patent Document

PTD 1: Japanese Patent Laying-Open No. 2009-208444
PTD 2: Japanese Patent Laying-Open No. 2007-291256
PTD 3: Japanese Patent Laying-Open No. 9-165469
PTD 4: Japanese Patent Laying-Open No. 2010-013646
PTD 5: Japanese Patent Laying-Open No. 2010-100675
PTD 6: International Publication No. 2008-029781

SUMMARY OF INVENTION

Technical Problem

A first object of the present invention is to implement, in a method for molding a tire by winding a laminate of an inner liner and an unvulcanized rubber sheet such as a carcass ply on a molding drum, enhanced uniformity in thickness at a joint on the circumference of the drum to manufacture a pneumatic tire, prevention of remaining of air, and effective reduction of peeling-off of the joints of the inner liner and the carcass ply. Thus, when the inner liner and the unvulcanized rubber sheet are laminated beforehand and wound on the drum, the inner liner and the unvulcanized rubber sheet are bonded with being displaced from each other in a width direction to manufacture the laminate.

A second object of the present invention is to provide, in a method for molding a tire by winding a laminate of an inner liner and an unvulcanized rubber sheet such as a carcass ply on a molding drum, a method for manufacturing a pneumatic tire which enhances uniformity in thickness at a joint on the circumference of the drum, prevents air from remaining, and effectively reduces peeling-off of the joints of the inner liner and the carcass ply. By adopting such a manufacturing method, a pneumatic tire excellent in flex crack growth, rolling resistance properties, and static air pressure drop rate is obtained.

A third object of the present invention is to provide, in a method for molding a tire by winding a laminate of an inner liner and an unvulcanized rubber sheet such as a carcass ply on a molding drum, a method for manufacturing a pneumatic tire which enhances uniformity in thickness at a joint on the circumference of the drum, prevents air from remaining, and effectively reduces peeling-off of the joints of the inner liner and the carcass ply. By adopting such a manufacturing method, a pneumatic tire excellent in rolling resistance properties, static air pressure drop rate, and uniformity is obtained.

A fourth object of the present invention is to provide, in a method for molding a tire by winding a laminate of an inner liner formed of a composite body having two layers and an unvulcanized rubber sheet such as a carcass ply on a molding drum, a method for manufacturing a pneumatic tire which enhances uniformity in thickness at a joint on the circumference of the drum, prevents air from remaining, and effectively reduces peeling-off of the joints of the inner liner and the carcass ply. With such a manufacturing method, the present invention is directed to obtaining a pneumatic tire having improved adhesiveness between the inner liner and the carcass ply, and excellent flex crack growth, rolling resistance properties, static air pressure drop rate, and uniformity.

A fifth object of the present invention is to implement, when molding a tire by winding a laminate of an inner liner and an unvulcanized rubber sheet such as a carcass ply on a molding drum, enhanced uniformity in thickness at joints of the inner liner and the carcass ply on the circumference of the drum, prevention of remaining of air, and effective reduction of peeling-off of the joints of the inner liner and the carcass ply. In addition, the present invention is directed to providing a method for manufacturing a pneumatic tire excellent in rolling resistance properties, static air pressure drop rate, and uniformity.

A sixth object of the present invention is to provide, in a method for molding a tire by winding a laminate of an inner liner and an unvulcanized rubber sheet such as a carcass ply on a molding drum, a method for manufacturing a pneumatic tire which enhances uniformity in thickness at a joint on the circumference of the drum, prevents air from remaining, and effectively reduces peeling-off of the joints of the inner liner and the carcass ply.

By adopting such a manufacturing method, the present invention is directed to obtaining a pneumatic tire having an inner liner with a reduced flex crack growth, and having excellent rolling resistance properties, static air pressure drop rate, and uniformity.

Solution to Problem

In connection with the first object, the present invention relates to a method for manufacturing a pneumatic tire having an inner liner on an inner side of the tire, molding of a green tire having:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner being a laminate of a first layer and a second layer, the first layer being a thermoplastic elastomer composition containing 0.1 to 50% by mass of an organic derivative of a clay mineral relative to 100 parts by mass of a thermoplastic elastomer mixture containing 60 to 99% by mass of a styrene-isobutylene-styrene block copolymer and 1 to 40 parts by mass of a polyamide-based polymer which contains polyamide in a molecular chain and has a Shore D hardness of 70 or less, and having a thickness of 0.05 mm to 0.6 mm, the second layer being disposed on a side of the unvulcanized rubber sheet, made of a thermoplastic elastomer composition, and having a thickness of 0.01 mm to 0.3 mm.

In the assembly step, the inner liner and the unvulcanized rubber sheet have different widths, and both end portions thereof in the width direction are displaced in the width direction so as not to overlap each other, and thereby the laminate can be manufactured.

Preferably, the second layer is a thermoplastic elastomer composition containing at least one of a styrene-isoprene-styrene block copolymer and a styrene-isobutylene block copolymer. Further, preferably, 15 to 40% by mass of an ethylene-vinyl alcohol copolymer is contained in a polymer component of the thermoplastic elastomer mixture of the first layer.

In the present invention, preferably, the styrene-isobutylene-styrene block copolymer contains 10 to 30% by mass of a styrene component. Further, preferably, the polyamide-based polymer is a block copolymer composed of a polyamide component and a polyether component. It is noted that the unvulcanized rubber sheet is, for example, a carcass ply.

In connection with the second object, the present invention relates to a method for manufacturing a pneumatic tire having an inner liner on an inner side of the tire, molding of a green tire having:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner being formed of a laminate of a first layer and a second layer, the first layer containing more than or equal to 60% by mass and less than or equal to 99.5% by mass of a styrene-isobutylene-styrene triblock copolymer and more than or equal to 0.5% by mass and less than or equal to 40% by mass of a polymer obtained by polymerizing a monomer having 4 carbon atoms, and having a thickness of more than or equal to 0.05 mm and less than or equal to 0.6 mm, the second layer being disposed on a side of the unvulcanized rubber sheet, made of a thermoplastic elastomer, and having a thickness of 0.01 mm to 0.3 mm.

In the method for manufacturing the pneumatic tire in accordance with the present invention, in the assembly step, the inner liner and the unvulcanized rubber sheet have different widths, and the inner liner and the unvulcanized rubber sheet can be bonded such that both end portions thereof in the width direction are displaced in the width direction so as not to overlap each other.

Further, preferably, the second layer has at least one of a styrene-isoprene-styrene triblock copolymer and a styrene-isobutylene diblock copolymer, has a thickness of more than or equal to 0.01 mm and less than or equal to 0.3 mm, and contains a polymer obtained by polymerizing a monomer having 4 carbon atoms by more than or equal to 0.5% by mass and less than or equal to 40% by mass of a polymer component.

As the polymer obtained by polymerizing a monomer having 4 carbon atoms, at least one of polybutene and polyisobutylene can be suitably used. In addition, preferably, the polymer obtained by polymerizing a monomer having 4 carbon atoms satisfies at least one of a number-average molecular weight of more than or equal to 300 and less than or equal to 3,000, a weight-average molecular weight of more than or equal to 700 and less than or equal to 100,000, and a viscosity-average molecular weight of more than or equal to 20,000 and less than or equal to 70,000.

Further, in the present invention, the styrene-isobutylene-styrene triblock copolymer preferably has a weight-average molecular weight of more than or equal to 50,000 and less than or equal to 400,000, and a styrene unit content of more than or equal to 10% by mass and less than or equal to 30% by mass, and the styrene-isoprene-styrene triblock copolymer preferably has a weight-average molecular weight of more than or equal to 100,000 and less than or equal to 290,000, and a styrene unit content of more than or equal to 10% by mass and less than or equal to 30% by mass. In addition, preferably, the styrene-isobutylene diblock copolymer is a linear copolymer, and has a weight-average molecular weight of more than or equal to 40,000 and less than or equal to 120,000, and a styrene unit content of more than or equal to 10% by mass and less than or equal to 35% by mass.

In connection with the third object, the present invention relates to a method for manufacturing a pneumatic tire having an inner liner on an inner side of the tire, molding of a green tire having:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner including a polymer sheet containing more than or equal to 0.1 parts by mass and less than or equal to 5 parts by mass of sulfur relative to 100 parts by mass of a polymer component containing more than or equal to 5% by mass and less than or equal to 40% by mass of a styrene-isobutylene-styrene triblock copolymer and more than or equal to 60% by mass and less than or equal to 95% by mass of at least one rubber component selected from the group consisting of natural rubber, isoprene rubber, and butyl rubber.

In the assembly step, the inner liner and the unvulcanized rubber sheet have different widths, and a method for bonding the inner liner and the unvulcanized rubber sheet such that both end portions thereof in the width direction are displaced in the width direction so as not to overlap each other can be adopted. In addition, preferably, the polymer sheet further contains more than or equal to 1 part by mass and less than or equal to 5 parts by mass of stearic acid, more than or equal to 0.1 parts by mass and less than or equal to 8 parts by mass of zinc oxide, more than or equal to 0.1 parts by mass and less than or equal to 5 parts by mass of an age inhibitor, and more than or equal to 0.1 parts by mass and less than or equal to 5 parts by mass of a vulcanization accelerator, relative to 100 parts by mass of the polymer component. Further, preferably, the styrene-isobutylene-styrene triblock copolymer has a weight-average molecular weight of more than or equal to 50,000 and less than or equal to 400,000, and a styrene unit content of more than or equal to 10% by mass and less than or equal to 30% by mass.

In the present invention, the inner liner can be a laminate of a first layer and a second layer, the first layer being a polymer sheet made of a polymer composition containing more than or equal to 0.1 parts by mass and less than or equal to 5 parts by mass of sulfur relative to 100 parts by mass of a polymer component containing more than or equal to 5% by mass and less than or equal to 40% by mass of a styrene-isobutylene-styrene triblock copolymer and more than or equal to 60% by mass and less than or equal to 95% by mass of at least one rubber component selected from the group consisting of natural rubber, isoprene rubber, and butyl rubber, the second layer being made of a thermoplastic resin composition containing more than or equal to 0.1 parts by mass and less than or equal to 5 parts by mass of sulfur relative to 100 parts by mass of a thermoplastic elastomer.

Preferably, the polymer composition of the first layer further contains more than or equal to 1 part by mass and less than or equal to 5 parts by mass of stearic acid, more than or equal to 0.1 parts by mass and less than or equal to 8 parts by mass of zinc oxide, more than or equal to 0.1 parts by mass and less than or equal to 5 parts by mass of an age inhibitor, and more than or equal to 0.1 parts by mass and less than or equal to 5 parts by mass of a vulcanization accelerator, relative to 100 parts by mass of the polymer component.

Preferably, the thermoplastic elastomer is at least one selected from the group consisting of a styrene-isoprene-styrene triblock copolymer, a styrene-isobutylene diblock copolymer, a styrene-butadiene-styrene triblock copolymer, a styrene-isoprene•butadiene-styrene triblock copolymer, a styrene-ethylene•butene-styrene triblock copolymer, a styrene-ethylene•propylene-styrene triblock copolymer, a styrene-ethylene•ethylene•propylene-styrene triblock copolymer, a styrene-butadiene•butylene-styrene triblock copolymer, and epoxy-modified thermoplastic elastomers thereof.

The second layer can include at least one of an SIS layer in which the thermoplastic elastomer contains a styrene-isoprene-styrene triblock copolymer, an SIB layer in which the thermoplastic elastomer contains a styrene-isobutylene diblock copolymer, and an epoxidized SBS layer in which the thermoplastic elastomer contains an epoxidized styrene-butadiene-styrene triblock copolymer.

In addition, preferably, the styrene-isobutylene-styrene triblock copolymer has a weight-average molecular weight of more than or equal to 50,000 and less than or equal to 400,000, and a styrene unit content of more than or equal to 10% by mass and less than or equal to 30% by mass. Further, preferably, the styrene-isoprene-styrene triblock copolymer has a weight-average molecular weight of more than or equal to 100,000 and less than or equal to 290,000, and a styrene unit content of more than or equal to 10% by mass and less than or equal to 30% by mass.

Further, preferably, the styrene-isobutylene diblock copolymer is a linear copolymer, and has a weight-average molecular weight of more than or equal to 40,000 and less than or equal to 120,000, and a styrene unit content of more than or equal to 10% by mass and less than or equal to 35% by mass.

In connection with the fourth object, the present invention relates to a method for manufacturing a pneumatic tire having an inner liner on an inner side of the tire, molding of a green tire having:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner being composed of a first layer disposed on the inner side of the tire and a second layer disposed in contact with a rubber layer of a carcass ply, the first layer being a thermoplastic elastomer composition mainly composed of a styrene-isobutylene-styrene block copolymer, the second layer being a styrene-based thermoplastic elastomer composition, (1) at least one of the thermoplastic elastomer compositions of the first and second layers containing 0.1 to 100 parts by mass of a tackifier relative to 100 parts by mass of a thermoplastic elastomer component, or (2) the second layer containing a styrene-isobutylene-styrene block copolymer by 10 to 80% by mass of a thermoplastic elastomer component.

Preferably, in the assembly step, the inner liner and the unvulcanized rubber sheet have different widths, and the inner liner and the unvulcanized rubber sheet are bonded such that both end portions thereof in the width direction are displaced in the width direction so as not to overlap each other. In addition, preferably, the tackifier has a weight-average molecular weight Mw of $1 \times 10^2$ to $1 \times 10^6$, and a softening point within a range of 50° C. to 150° C.

In an embodiment of the present invention, the second layer is a thermoplastic elastomer composition containing at least one of a styrene-isoprene-styrene block copolymer and a styrene-isobutylene diblock copolymer, and the first layer is formed to have a thickness of 0.05 mm to 0.6 mm and the second layer is formed to have a thickness of 0.01 mm to 0.3 mm.

Preferably, the styrene-isobutylene-styrene triblock copolymer has a weight-average molecular weight of more than or equal to 50,000 and less than or equal to 400,000, and a styrene unit content of more than or equal to 10% by mass and less than or equal to 30% by mass, and the styrene-isoprene-styrene triblock copolymer has a weight-average molecular weight of more than or equal to 100,000 and less than or equal to 290,000, and a styrene unit content of more than or equal to 10% by mass and less than or equal to 30% by mass. Further, preferably, the styrene-isobutylene diblock copolymer is a linear copolymer, and has a weight-average molecular weight of more than or equal to 40,000 and less than or equal to 120,000, and a styrene unit content of more than or equal to 10% by mass and less than or equal to 35% by mass.

In connection with the fifth object, the present invention relates to a method for manufacturing a pneumatic tire having an inner liner on an inner side of the tire, molding of a green tire having:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner being composed of a composite layer of a first layer disposed on the inner side of the tire and a second layer disposed in contact with the unvulcanized rubber sheet, at least one of the first layer and the second layer being made of an elastomer composition containing an isobutylene-based modified copolymer which is made of a polymer block (A) mainly composed of isobutylene and a polymer block (B) mainly composed of an aromatic vinyl-based compound, and in which at least one of the blocks contains β-pinene.

In the assembly step, the inner liner and the unvulcanized rubber sheet have different widths, and the inner liner and the unvulcanized rubber sheet can be bonded such that both end portions thereof in the width direction are displaced in the width direction so as not to overlap each other.

Further, preferably, the elastomer composition of the first layer contains the isobutylene-based modified copolymer by 10 to 100% by mass of an entire elastomer component, and the elastomer composition of the second layer contains the isobutylene-based modified copolymer by 5 to 80% by mass of an entire elastomer component.

In addition, preferably, a content of β-pinene in the isobutylene-based modified copolymer is 0.5 to 25% by mass.

Further, preferably, the isobutylene-based modified copolymer has a weight-average molecular weight of 30,000 to 400,000, and a value of molecular weight distribution (Mw/Mn) of less than or equal to 1.3, and β-pinene is contained in a styrene block of a styrene-isobutylene-styrene block copolymer, a styrene-isoprene-styrene block copolymer, or a styrene-isobutylene block copolymer.

In connection with the sixth object, the present invention relates to a method for manufacturing a pneumatic tire having an inner liner on an inner side of the tire, molding of a green tire having:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner being composed of a composite layer of a first layer disposed on the inner side of the tire and a second layer disposed in contact with the unvulcanized rubber sheet, the first layer being made of an elastomer composition containing an SIBS modified copolymer having a styrene block moiety of a styrene-isobutylene-styrene block copolymer modified with an acid chloride having an unsaturated bond or an acid anhydride and having a thickness of 0.05 mm to 0.6 mm, the second layer being made of an elastomer composition containing at least one of a styrene-isoprene-styrene block copolymer and a styrene-isobutylene block copolymer, and having a thickness of 0.01 mm to 0.3 mm.

In the assembly step, the inner liner and the unvulcanized rubber sheet have different widths, and the inner liner and the unvulcanized rubber sheet can be bonded such that both end portions thereof in the width direction are displaced in the width direction so as not to overlap each other.

In addition, desirably, a blending quantity of the SIBS modified copolymer in the first layer is adjusted in the range of 10% by mass to 100% by mass of an elastomer component. Further, desirably, the second layer contains an SIBS modified copolymer, and a blending quantity thereof is adjusted in the range of 5% by mass to 80% by mass of a thermoplastic elastomer component.

The first layer can be a mixture of the styrene-isobutylene-styrene block copolymer and the SIBS modified copolymer. Further, desirably, one of the first and second layers is blended with a tackifier. In addition, desirably, one of the first and second layers is blended with a rubber component by 5 to 75% by mass of an elastomer component.

Further, the method for manufacturing the pneumatic tire in accordance with the present invention is characterized in that the first layer of the inner liner is blended with at least one of an ultraviolet absorber and an antioxidant by 0.5 parts by mass to 40 parts by mass relative to 100 parts by mass of an elastomer component.

Advantageous Effects of Invention

As for a first effect of the present invention, since the inner liner made of a composite layer of the first layer as a thermoplastic elastomer composition obtained by blending an organic derivative of a clay mineral with a mixture of an SIBS and a polyamide-based polymer and the second layer as a thermoplastic elastomer composition is used in the present invention, an air-in phenomenon and flex crack growth can be reduced and static air pressure drop can also be improved. In addition, the composite layer and the unvulcanized rubber sheet are laminated such that the second layer thereof is in contact with the unvulcanized rubber sheet and the composite layer and the unvulcanized rubber sheet are displaced from each other in the width direction, then the laminate is wound on the drum over its entire circumference with the inner liner being disposed on the inner surface side, and the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be prevented.

In addition, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

Further, since the inner liner is the composite layer of the first layer disposed on the inner side of the tire, mainly composed of a styrene-isobutylene-styrene block copolymer, and having a thickness of 0.05 mm to 0.6 mm, and the second layer disposed on the side of the unvulcanized rubber sheet, made of a thermoplastic elastomer composition, and having a thickness of 0.01 mm to 0.3 mm, adhesive strength with rubber of the carcass ply adjacent to the second layer is enhanced. In addition, the inner liner has a high reinforcing effect when the joint of the carcass ply peels off, and the carcass ply has a high reinforcing effect when the joint of the inner liner peels off.

As for a second effect of the present invention, the inner liner is formed of a laminate of the first layer including a mixture of an SIBS and a polymer obtained by polymerizing a monomer having 4 carbon atoms (C4 polymer) and the second layer as a thermoplastic elastomer in the present invention. The inner liner and the unvulcanized rubber sheet are laminated with being displaced from each other in the width direction, then the laminate is wound on the drum over its entire circumference with the inner liner being disposed on the inner surface side, and the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be reduced.

Further, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

In particular, in the present invention, since the inner liner is a composite layer of the first layer disposed on the inner side of the tire and having a thickness of 0.05 mm to 0.6 mm and the second layer disposed on the side of the unvulcanized rubber sheet and having a thickness of 0.01 mm to 0.3 mm, adhesive strength with rubber of the adjacent carcass ply is enhanced. In addition, the inner liner has a high reinforcing effect when the joint of the carcass ply peels off, and the carcass ply has a high reinforcing effect when the joint of the inner liner peels off.

As for a third effect of the present invention, the inner liner is formed by mixing an SIBS with a rubber component and dynamically vulcanizing the mixture in the present invention. The inner liner and the unvulcanized rubber sheet are laminated with being displaced from each other in the width direction, then the laminate is wound on the drum over its entire circumference with the inner liner being disposed on the inner surface side, and the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be reduced.

Further, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

In particular, in the present invention, when the inner liner is composed of a composite layer of the first layer disposed on the inner side of the tire and having a thickness of 0.05 mm to 0.6 mm and the second layer disposed on the side of the unvulcanized rubber sheet and having a thickness of 0.01 mm to 0.3 mm, adhesive strength with rubber of the adjacent carcass ply is enhanced. In addition, the inner liner has a high reinforcing effect when the joint of the carcass ply peels off, and the carcass ply has a high reinforcing effect when the joint of the inner liner peels off.

As for a fourth effect of the present invention, the inner liner is formed of a composite body in the present invention. The inner liner and the unvulcanized rubber sheet are laminated with being displaced from each other in the width direction, then the laminate is wound on the drum over its entire circumference with the inner liner being disposed on the inner surface side, and the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be reduced.

Further, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

In the present invention, since the inner liner is composed of a composite body of the first layer mainly composed of an SIBS and the second layer made of a styrene-based thermoplastic elastomer, and a tackifier is mixed in one of the layers, vulcanization adhesion between the first layer and the second layer can be improved. As a result, adhesiveness between the first layer and the carcass ply is also enhanced, and occurrence of an air-in phenomenon between the first layer and the carcass ply, between the first layer and the second layer, and between the carcass ply and the second layer can be prevented, improving tire durability performance. Further, since the second layer is blended with an SIBS, adhesiveness with the first layer is improved, and thus adhesion among the first layer, the second layer, and the carcass ply can be further enhanced.

As for a fifth effect of the present invention, in the manufacturing method in accordance with the present invention, the inner liner made of an isobutylene-based modified copolymer and the unvulcanized rubber sheet are laminated with being displaced from each other in the width direction, and the laminate is wound on the drum over its entire circumference with the inner liner being disposed on the inner surface side. Then, the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be reduced.

Further, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

In addition, the inner liner has a high reinforcing effect when the joint of the carcass ply peels off, and the carcass ply has a high reinforcing effect when the joint of the inner liner peels off.

As for a sixth effect of the present invention, the inner liner is composed of a composite layer of the first layer made of an SIBS modified copolymer and the second layer containing an SIS or an SIB in the present invention. The inner liner and the unvulcanized rubber sheet are laminated with being displaced from each other in the width direction, then the laminate is wound on the drum over its entire circumference with the inner liner being disposed on the inner surface side, and the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be reduced.

Further, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

In addition, the inner liner has a high reinforcing effect when the joint of the carcass ply peels off, and the carcass ply has a high reinforcing effect when the joint of the inner liner peels off.

In particular, flex crack growth, durability driving index, and uniformity are improved by adopting the manufacturing method described above as well as using a laminated structure of the first layer and the second layer for the inner liner, using an SIBS modified copolymer for the first layer, and using one of an SIS and an SIB for the second layer. Further, weather resistance is also improved by blending an ultraviolet absorber, an antioxidant in the first layer.

BRIEF DESCRIPTION OF DRAWINGS

FIG. 3 is a schematic view showing a cutting step.
FIG. 4(A) is a cross sectional view of a laminate,
and FIG. 4(B) is a schematic view showing the state where the laminate is wound on a drum.
FIG. 6(A) is a cross sectional view of a laminate,
and FIG. 6(B) is a schematic view showing the state where the laminate is wound on the drum.
FIG. 7 is a schematic view of a conventional method for molding an inner liner.

DESCRIPTION OF EMBODIMENTS

The present invention is directed to a method for manufacturing a pneumatic tire having an inner liner on an inner side of the tire, the manufacturing method being performed through the following step of molding a green tire including:

(a) an assembly step of bonding the inner liner and an unvulcanized rubber sheet with end portions thereof in a width direction being displaced from each other in the range of 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance.

Here, the method for manufacturing the pneumatic tire in accordance with the present invention will be described with reference to the drawings.

Embodiment 1-1

Assembly Step

Figure 1:
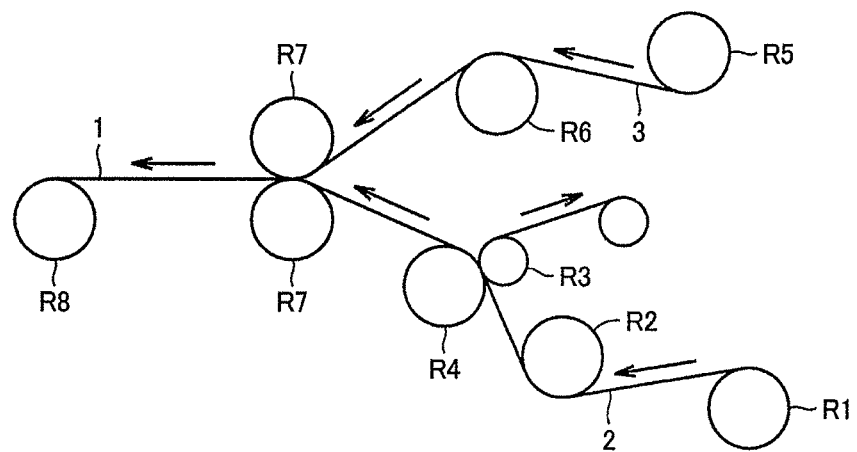
FIG. 1 is a schematic view showing an assembly step.
Figure 2:
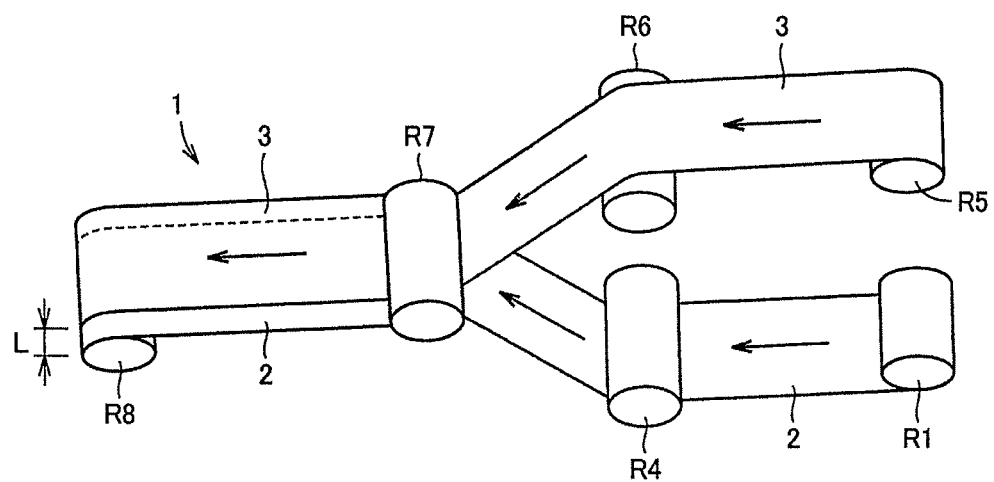
FIG. 2 is a perspective view schematically showing the assembly step.

FIG. 1 is a schematic lateral view showing the assembly step, and FIG. 2 is a schematic perspective view showing the assembly step. In FIGS. 1 and 2, a film-like inner liner 2 covered with exfoliate paper is fed from a storage roll R1 via a first drive roller R2 in a direction indicated by an arrow, and is separated from the exfoliate paper at peel-off rollers R3, R4. Then, inner liner 2 is fed to a pair of calender rolls R7.

On the other hand, an unvulcanized rubber sheet 3 is fed via a second drive roller R6 to the pair of calender rolls R7. Inner liner 2 and unvulcanized rubber sheet 3 are bonded by the pair of calender rolls R7 to manufacture a laminate 1. Laminate 1 is taken up by a take-up roll R8 for temporary storage, or is continuously fed to the subsequent cutting step. Here, inner liner 2 and unvulcanized rubber sheet 3 having a substantially identical width are used, and positions of their both ends are displaced from each other to form a displaced distance L.

Here, displaced distance L is adjusted in the range of 50 mm to 500 mm, preferably in the range of 100 mm to 300 mm. If displaced distance L is less than 50 mm, a space between a joint of the unvulcanized rubber sheet and a joint of the inner liner is small, and adhesion failure at the joints is likely to occur. On the other hand, if displaced distance L is more than 500 mm, it is difficult to mold a tire on a drum.

The inner liner is composed of a composite layer of a first layer made of a styrene-isobutylene-styrene block copolymer and having a thickness of 0.05 mm to 0.6 mm, and a second layer disposed on a side of the unvulcanized rubber sheet, made of a thermoplastic elastomer, and having a thickness of 0.01 mm to 0.3 mm. Further, the width of the inner liner is adjusted depending on the size of the tire.

In the present invention, since the inner liner and the unvulcanized rubber sheet are pressure-bonded using the rolls, they can be closely bonded reliably with no air left therebetween, and they can be bonded efficiently and with good productivity.

<Cutting Step>

FIG. 3 is a schematic perspective view showing the cutting step. Laminate 1 is fed from take-up roll R8, or continuously from the assembly step, to a cutter by a belt conveyer. Laminate 1 is cut to have a predetermined length in a longitudinal direction in accordance with the size of the tire to manufacture a cut sheet 4. A conventional technique such as cutting with a knife can be adopted to cut the laminate. A cutting direction of cut sheet 4 corresponds to a circumferential direction of a drum, and a cutting length thereof in the longitudinal direction corresponds to a width direction of drum 5. Further, the length of the inner liner is adjusted as appropriate depending on the size of the tire.

<Joining Step>

FIG. 4(A) is a schematic view showing the joining step for the laminate, showing a cross sectional view of cut sheet 4, and FIG. 4(B) is a schematic view showing a method for winding cut sheet 4 on drum 5. The laminate is wound such that inner liner 2 is adjacent to the surface of drum 5. Here, a position where end portions 2a, 2b of the inner liner are joined each other to form the joint and a position where end portions 3a, 3b of the unvulcanized rubber sheet are joined each other to form the joint are offset from each other.

<Tire Molding/Vulcanization Step>

As described above, in the joining step, the laminate of the inner liner and an unvulcanized carcass ply is manufactured and formed into a cylindrical shape on the drum. After the joining step, both end portions of the laminate located at both ends of the drum are folded back around bead cores, and thereafter a central portion of the laminate made of the inner liner and the unvulcanized carcass ply is expanded and deformed while narrowing a space between the bead cores. In association with this operation, a belt member, tread rubber, and the like are bonded to the central portion of the laminate, and other rubber members such as a side wall, a bead apex, and the like are also bonded to mold a green tire. The green tire molded as described above is introduced into a mold and vulcanized by a conventional method to obtain a product tire.

<Inner Liner>

In the present embodiment, the inner liner is composed of the first layer disposed on the inner side of the tire, and the second layer disposed in contact with a rubber layer of the carcass ply.

<First Layer>

The first layer is composed of a thermoplastic elastomer composition containing 0.1 to 50 parts by mass of an organic derivative of a clay mineral relative to 100 parts by mass of a thermoplastic elastomer mixture containing 60 to 99% by mass of a styrene-isobutylene-styrene block copolymer (hereinafter also referred to as an "SIBS") and 1 to 40% by mass of a polyamide-based polymer that contains polyamide in a molecular chain and has a Shore D hardness of 70 or less.

(SIBS)

The first layer is made of a thermoplastic elastomer composition mainly composed of a styrene-isobutylene-styrene block copolymer (SIBS). Since the SIBS is derived from an isobutylene block, a polymer film made of the SIBS has excellent air permeation resistance. Therefore, when a polymer made of the SIBS is used for the inner liner, a pneumatic tire having excellent air permeation resistance can be obtained.

Further, the SIBS has excellent durability since a molecular structure other than those of aromatic molecules is completely saturated and therefore deterioration and hardening are suppressed. Therefore, when a polymer film made of the SIBS is used for the inner liner, a pneumatic tire having excellent durability can be obtained.

When a pneumatic tire is manufactured by using a polymer film made of the SIBS for the inner liner, air permeation resistance can be ensured. Therefore, it is not necessary to use a halogenated rubber having a high specific gravity such as halogenated butyl rubber, which has been conventionally used to impart air permeation resistance, and even if the halogenated rubber is used, the amount of use can be reduced. This enables weight saving of the tire and improves fuel efficiency.

Although there is no particular limitation on the molecular weight of the SIBS, the weight-average molecular weight obtained by GPC measurement is preferably 50,000 to 400,000 in view of fluidity, workability, rubber elasticity, and the like. When the weight-average molecular weight is less than 50,000, tensile strength and tensile elongation may decrease. When the weight-average molecular weight is more than 400,000, extrusion moldability may deteriorate. Therefore, both the cases are not preferred. In the SIBS, in view of further improving air permeation resistance and durability, the content of a styrene component in the SIBS is 10 to 30% by mass, preferably 14 to 23% by mass.

In the SIBS as a copolymer, the polymerization degree of each block is preferably about 10,000 to 150,000 for isobutylene and about 5,000 to 30,000 for styrene, in view of rubber elasticity and handling (when the polymerization degree is less than 10,000, the SIBS becomes a liquid).

The SIBS can be obtained by a conventional living cationic polymerization method for a vinyl-based compound. For example, Japanese Patent Laying-Open No. 62-048704 and Japanese Patent Laying-Open No. 64-062308 disclose that living cationic polymerization of isobutylene with other vinyl compounds can be performed, and a polyisobutylene-based block copolymer can be manufactured by using isobutylene and other compounds as the vinyl compounds.

(Polyamide-Based Polymer)

In the first layer, the content of the polyamide-based polymer in the thermoplastic elastomer mixture is set to 1 to 40% by mass. Since the content of the polyamide-based polymer is 40% by mass or less, a polymer mixture that has both durability and adhesiveness is obtained. Further, when the SIBS, which can ensure durability and adhesiveness and has excellent air permeation resistance, is used together with an ethylene-vinyl alcohol copolymer, the content of the polyamide-based polymer is preferably set to 3 to 20% by mass.

The polyamide-based polymer is a polyamide-based polymer having a Shore D hardness of 70 or less. A Shore D hardness exceeding 70 results in poor cracking properties when the tire flexes and moves. The Shore D hardness is preferably within a range from 15 to 70, more preferably from 18 to 70, further preferably from 20 to 70, and particularly preferably from 25 to 70. The polyamide-based polymer preferably contains more than or equal to 50% by mass of a polyetheramide elastomer having a structure represented by the following formula (I).

Here, the polyetheramide elastomer is preferably a block copolymer composed of a polyamide component and a polyether component, obtained by polymerizing a triblock polyether diamine compound (A) represented by formula (I), a polyamide-forming monomer (B), and a dicarboxylic acid compound (C):

[Formula 1]

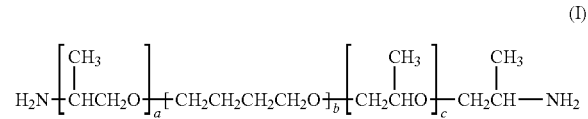

(I)

(where a and b represent 1 to 20, and c represents 4 to 50).

The polyamide-forming monomer (B) is preferably represented by formula (II) or (III):

[Formula 2]

$$H_2N-R^1-COOH \quad (II)$$

(where $R^1$ represents a linking group containing a hydrocarbon chain);

[Formula 3]

(III)

(where $R^2$ represents a linking group containing a hydrocarbon chain).

The dicarboxylic acid compound (C) is preferably represented by the following formula (IV) or an aliphatic dicarboxylic acid compound and/or an alicyclic dicarboxylic acid compound:

[Formula 4]

$$HOOC-(R^3)_y-COOH \quad (IV)$$

(where $R^3$ represents a linking group containing a hydrocarbon chain, and y represents 0 or 1).

When the polyamide-based polymer is a polyamide-based polymer having a hard segment derived from a polyamide component and a soft segment derived from a polyether component, it shows low crystallinity. Therefore, it is possible to obtain a polyamide-based polymer that has a high elongation at break (EB) and shows flexibility within a temperature range from a low temperature to a high temperature.

Further, the polyamide-based polymer can exhibit an excellent effect in adhesiveness with an adjacent rubber, since fluidity improves at a tire vulcanization temperature (140 to 180° C.) and wettability with an uneven surface improves.

As the polyamide-based polymer, a known polyamide-based polymer can be used. As the polyamide-based polymer, for example, an elastomer composed of a polyamide block made of at least one aliphatic nylon selected from nylon 6, nylon 66, nylon 11, and nylon 12, and at least one polyether block selected from polyoxyethylene, polyoxypropylene, and polyoxybutylene can be used.

<Ethylene-Vinyl Alcohol Copolymer>

The thermoplastic elastomer composition of the first layer preferably contains 15 to 40% by mass of an ethylene-vinyl alcohol copolymer in a polymer component. Since the content of the ethylene-vinyl alcohol copolymer is 15% by mass or more, gas barrier property of the thermoplastic elastomer composition is ensured. Since the content is 40% by mass or less, kneadability of the thermoplastic elastomer composition during fabrication is ensured, and basic performance such as mechanical strength in an inner liner layer of the tire is also ensured. The content is more preferably 20% by mass or more, and still more preferably 25% by mass or more. Furthermore, in view of durability of the tire, the content is more preferably 30% by mass or less. The ethylene-vinyl alcohol copolymer is represented by the following general formula (V):

[Formula 5]

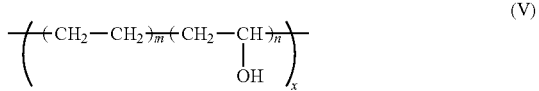

(V)

(where m and n each independently represent 1 to 100, and X is from 1 to 1,000).

Compatibility with other components in the polymer mixture is satisfactorily imparted by an ethylene-derived moiety of the ethylene-vinyl alcohol copolymer, and the ethylene-vinyl alcohol copolymer can exist in a fine dispersion size in the polymer composition. On the other hand, the ethylene-vinyl alcohol copolymer has satisfactory gas barrier property due to contribution of a vinyl alcohol-derived moiety. Specifically, in the present invention, since the ethylene-vinyl alcohol copolymer having excellent gas barrier property is dispersed in the form of islands in a fine size in the thermoplastic elastomer composition, satisfactory gas barrier property is exhibited even when a thin inner liner layer of a tire is formed. Thereby, weight saving of the tire can be achieved, and the effect of improving fuel efficiency is obtained.

In the general formula (V), m and n are set to 1 or more to constitute the ethylene-vinyl alcohol copolymer. On the other hand, since m and n are each 100 or less, an ethylene-vinyl alcohol copolymer that has both compatibility with other components in the polymer mixture and gas barrier property is obtained. Since compatibility with other components in the polymer mixture becomes more satisfactory, m is more preferably set to 5 or more. Further, since gas barrier property becomes more satisfactory, n is more preferably set to 5 or more. On the other hand, since it is hard to fail to exhibit gas barrier property due to the vinyl alcohol-derived moiety, m is preferably set to 95 or less, and more preferably 80 or less. Further, since it is hard to fail to exhibit satisfactory compatibility with the polymer mixture due to the ethylene-derived moiety, n is preferably set to 95 or less, and more preferably 80 or less.

In the general formula (V), x is set to 1 or more to constitute the ethylene-vinyl alcohol copolymer. On the other hand, since x is 1,000 or less, kneadability of the polymer composition during fabrication is ensured, and a polymer composition containing an ethylene-vinyl alcohol copolymer dispersed uniformly therein is obtained. Since compatibility with other components in the polymer mixture and gas barrier property are satisfactorily exhibited, x is more preferably set to 10 or more. In view of satisfactory kneadability, x is still more preferably set to 500 or less, and even more preferably 100 or less.

The ethylene-vinyl alcohol copolymer represented by the general formula (V) may be contained in the polymer composition, in the state of being copolymerized with other components. In this case, the content of the ethylene-vinyl alcohol copolymer means the content of the structure moiety represented by the general formula (V). The molecular structure of the ethylene-vinyl alcohol copolymer can be confirmed, for example, by an infrared absorption spectrum (IR) and a nuclear magnetic resonance spectrum (NMR).

<Polymer Mixture>

In the present embodiment, the thermoplastic elastomer composition can be blended with other polymers in a range of 20% by mass or less, in addition to the SIBS, the polyamide-based polymer, the ethylene-vinyl alcohol copolymer, as the polymer component. For example, the thermoplastic elastomer composition can be blended with PET, chlorobutyl rubber, natural rubber, ethylene-propylene-diene terpolymer (EPDM), styrene-butadiene rubber (SBR), butadiene rubber, isoprene rubber, butyl rubber, halogenated butyl rubber, and acrylonitrile-butadiene rubber (NBR).

<Organic Derivative of a Clay Mineral>

The first layer of the laminate contains 0.1 to 50 parts by mass of an organic derivative of a clay mineral relative to 100 parts by mass of the polymer component of the thermoplastic elastomer composition. The organic derivative of a clay mineral is a layered clay mineral obtained by intercalating an organic compound. By intercalating the organic compound between layers of the layered clay mineral, interlayer expansion occurs and dispersibility in the polymer is improved.

The layered clay mineral is a kind of layered silicate minerals, and has a crystal structure in which three layers of a silicic acid tetrahedron layer, an alumina octahedron layer, and a silicic acid tetrahedron layer are laminated, and the unit layer is in the form of a very thin plate having a thickness of about 10 Å (1 nm) and a spread of 0.1 to 1 μm.

Typical examples of the layered clay mineral include montmorillonite. Montmorillonite has an insufficient positive charge since a portion of Al atoms as a central atom of an alumina octahedron layer in a crystal structure may be substituted with Mg atoms, and thus each crystal layer itself is negatively charged, but the insufficient charge is alleviated by interposing cations such as $Na^+$, $K^+$, $Ca^{2+}$, and $Mg^{2+}$ between the crystal layers, resulting in a stable state. Therefore, montmorillonite is present in a state where a number of crystal layers are laminated.

When water is brought into contact with a surface of a plate crystal layer of montmorillonite, water molecules are hydrated with interlaminar exchangeable cations and interlayer expansion occurs. Further, by intercalating an organic compound between layers utilizing cation exchangeability of montmorillonite, interlayer expansion occurs and thus dispersibility in an organic solvent or a polymer is improved.

Examples of the layered clay mineral include phyllosilicates, for example, smectite-based clays such as montmorillonite (particularly sodium montmorillonite, magnesium montmorillonite, and calcium montmorillonite), bentonite, kaolinite, nonlite, beidellite, volchonskoite, hectorite, saponite, sauconite, sobockite, stevensite, svinfordite, and vermiculite; mica minerals such as illite and illite/smectite mixtures (mixtures of rectorite, tarosovite, ledikite, and the clay compounds described above, and illite), or attapulgite and a sepiolitehydrotalcite-based layered compound. Of these layered clay minerals, a smectite-based clay is preferred, and a montmorillonite-based clay is particularly preferred. Bentonite containing a smectite-based clay mineral may also be used. These layered clay minerals are usually obtained by collecting a natural mineral and subjecting the mineral to a predetermined purification operation. These synthetic clays can be used without any distinction.

Examples of the organic compound that can be used as an intercalant include an organic compound having an easily ionizable polar group in the molecule. It is considered that the organic compound having a polar group causes a strong interaction with a surface of a layer coated with negative ions such as oxygen ions of a smectite-based clay mineral, and intercalates between layers of the layered clay mineral, resulting in interlayer expansion.

The organic compound is preferably a compound which has an alkyl group having 6 or more carbon atoms, and has an ionizable polar group at the end. Examples thereof include those having a hydroxyl group or a carboxyl group, aldehydes, amines, amides, or quaternary ammonium salts.

Examples of the organic compound having a hydroxyl group include aliphatic alcohols such as octyl alcohol and nonyl alcohol; alcohols substituted with an alkyl group, such as aromatic alcohol; and phenols.

Examples of the organic compound having a carboxyl group include linear aliphatic acids such as stearic acid, palmitic acid, and lauric acid; linear alkenoic acids such as oleic acid; dienoic acids such as linolelaidic acid; and polyunsaturated aliphatic acids such as trienonic acid.

Examples of aldehydes include hexylaldehyde. Examples of amines or amides include polar organic compounds having one or more amines or amides, such as alkylamines, aminocycloalkanes and aminocycloalkane substituted compounds, cyclic aliphatic diamines, aliphatic amines, alkylaromatic amines, alkyldiarylamines, and aliphatic amides, and also include primary, secondary, and/or tertiary amines or amides. Of these, alkylamines, aliphatic amines, alkylaromatic amines, and alkyldiarylamines are preferred. These organic compounds can be used alone, or two or more types thereof can be used in combination.

Examples of amines include primary amines such as 1-hexylamine, 1-heptylamine, 1-octylamine, 1-nonylamine, 1-dodecylamine, 1-hexadecylamine, 1-octadecylamine, and oleylamine; secondary amines such as di-n-dodecylamine, di-n-hexadecylamine, and di-n-octadecylamine; tertiary amines such as dimethyl-n-octylamine, dimethyl-n-decylamine, dimethyl-n-tetradecylamine, dimethyl-n-hexadecylamine, dimethyl-n-octadecylamine, and dimethyloleylamine; and aliphatic amines such as di-n-decylmethylamine di(coco alkyl)methylamine, tri-n-octylamine, tri-n-decylamine, and tri-n-hexadecylamine.

Examples of amides include hexylamide, heptylamide, octylamide, nonylamide, lauramide, myristamide, palmitamide, steramide, palmiamide, oleamide, and linoleamide.

It is also possible to use, as the organic compound having a polar group, those having a nitrile group or a lactam group, pyridines, esters, surfactants, ethers, and the like.

Examples of the quaternary ammonium salt include a dimethyldistearylammonium salt, a trimethylstearylammonium salt, dimethyldioctadecylammonium, dimethylbenzyloctadecylammonium, and trimethyloctadecylammonium.

As a method of intercalating an organic compound into a layered clay mineral, a known method can be employed. For example, there is a method in which, in order to bring a montmorillonite-based clay mineral into contact with an organic compound, a layered clay mineral is impregnated with water in the amount of about 10% by mass of the layered clay mineral to 20 times thereof in advance, and then the organic compound is brought into contact with the montmorillonite-based clay mineral to obtain an organic derivative of a clay mineral. The cation exchange amount of the organic compound in the organic derivative of a clay mineral is preferably from 50 to 200 meg/100 g.

The blending quantity of the organic derivative of a clay mineral is 0.1 to 50% by mass, and more preferably 0.5 to 30 parts by mass, relative to 100 parts by mass of the polymer mixture. When the blending quantity of the organic derivative of a clay mineral is less than 0.1 parts by mass, air permeability of the polymer composition and its tensile characteristics at high temperature deteriorate. In contrast, when the blending quantity of the organic derivative of a clay mineral is more than 50 parts by mass, the hardness of the polymer composition excessively increases and thus flex fatigue properties deteriorate.

<Other Compounding Agents>

The thermoplastic elastomer composition in the present embodiment can be blended with various compounding agents and additives which are blended into a common rubber composition, such as other reinforcing agents, vulcanization agents, vulcanization accelerators, various oils, age inhibitors, softeners, plasticizers, and coupling agents. The content of these compounding agents and additives can also be set to a common amount.

(Thickness of First Layer)

The thickness of the first layer made of the SIBS is 0.05 to 0.6 mm. When the thickness of the first layer is less than 0.05 mm, the first layer may be broken by a pressing pressure during vulcanization of a green tire in which a polymer laminate is used as the inner liner, and thus an air leak phenomenon may occur in the resultant tire. On the other hand, when the thickness of the first layer is more than 0.6 mm, tire weight increases and fuel efficiency performance deteriorates. The thickness of the first layer is preferably 0.05 to 0.4 mm. The first layer can be obtained by forming the SIBS into a film by a conventional method of forming a thermoplastic resin or a thermoplastic elastomer into a film, such as extrusion molding or calender molding.

<Second Layer>

In the present embodiment, the second layer is composed of a thermoplastic elastomer, in particular a styrene-based thermoplastic elastomer composition. Here, the styrene-based thermoplastic elastomer refers to a copolymer containing a styrene block as a hard segment. Examples thereof include a styrene-isoprene-styrene block copolymer (hereinafter also referred to as an "SIS"), a styrene-isobutylene block copolymer (hereinafter also referred to as an "SIB"), a styrene-butadiene-styrene block copolymer (hereinafter also referred to as an "SBS"), a styrene-isobutylene-styrene block copolymer (hereinafter also referred to as an "SIBS"), a styrene-ethylene-butene-styrene block copolymer (hereinafter also referred to as an "SEBS"), a styrene-ethylene-propylene-styrene block copolymer (hereinafter also referred to as an "SEPS"), a styrene-ethylene-ethylene-propylene-styrene block copolymer (hereinafter also referred to as an "SEEPS"), and a styrene-butadiene-butylene-styrene block copolymer (hereinafter also referred to as an "SBBS").

Further, the styrene-based thermoplastic elastomer may have an epoxy group in its molecular structure, and for example an epoxy-modified styrene-butadiene-styrene copolymer (epoxidized SBS) such as Epofriend A1020 manufactured by Daicel Chemical Industries, Ltd. (having a weight-average molecular weight of 100,000 and an epoxy equivalent of 500) can be used.

Of the styrene-based thermoplastic elastomers used for the second layer, the SIS and the SIB are particularly suitable. Since an isoprene block of the SIS is a soft segment, a polymer film made of the SIS is easily vulcanization-bonded with a rubber component. Therefore, when the polymer film made of the SIS is used for the inner liner, the inner liner is excellent in adhesiveness with the rubber layer of the carcass ply, for example, and thus a pneumatic tire excellent in durability can be obtained.

Although there is no particular limitation on the molecular weight of the SIS, the weight-average molecular weight obtained by the GPC measurement is preferably 100,000 to 290,000 in view of rubber elasticity and moldability. When the weight-average molecular weight is less than 100,000, tensile strength may decrease. When the weight-average molecular weight is more than 290,000, extrusion moldability may deteriorate. Therefore, both the cases are not preferred. The content of a styrene component in the SIS is preferably 10 to 30% by mass in view of tackiness, adhesiveness, and rubber elasticity.

In the present invention, the polymerization degree of each block in the SIS is preferably about 500 to 5,000 for isoprene and about 50 to 1,500 for styrene, in view of rubber elasticity and handling.

The SIS can be obtained by a conventional polymerization method for a vinyl-based compound, and can be obtained, for example, by the living cationic polymerization method. An SIS layer can be obtained by forming the SIS into a film by a conventional method of forming a thermoplastic resin or a thermoplastic elastomer into a film, such as extrusion molding or calender molding.

Since an isobutylene block of the styrene-isobutylene block copolymer (SIB) is a soft segment, a polymer film made of the SIB is easily vulcanization-bonded with a rubber component. Therefore, when the polymer film made of the SIB is used for the inner liner, the inner liner is excellent in adhesiveness with an adjacent rubber constituting a carcass or an insulation, for example, and thus a pneumatic tire excellent in durability can be obtained.

It is preferable to use a linear SIB in view of rubber elasticity and adhesiveness. Although there is no particular limitation on the molecular weight of the SIB, the weight-average molecular weight obtained by the GPC measurement is preferably 40,000 to 120,000 in view of rubber elasticity and moldability. When the weight-average molecular weight is less than 40,000, tensile strength may decrease. When the weight-average molecular weight is more than 120,000, extrusion moldability may deteriorate. Therefore, both the cases are not preferred.

The content of a styrene component in the SIB is preferably 10 to 35% by mass in view of tackiness, adhesiveness, and rubber elasticity. In the present invention, the polymerization degree of each block in the SIB is preferably about 300 to 3,000 for isobutylene and about 10 to 1,500 for styrene, in view of rubber elasticity and handling.

The SIB can be obtained by a conventional living polymerization method for a vinyl-based compound. For example, methylcyclohexane, n-butyl chloride, and cumyl chloride are charged in a stirrer, cooled to −70° C. and thereafter reacted for 2 hours, and then the reaction is terminated by adding a large amount of methanol, and the reaction product is vacuum-dried at 60° C. Thereby, the SIB can be manufactured.

The second layer can be molded, for example, by subjecting the SIB to a conventional method of forming a styrene-based thermoplastic elastomer into a film, such as extrusion molding or calender molding. The thickness of the second layer is preferably 0.01 mm to 0.3 mm. Here, when the second layer is made of a plurality of layers, the thickness of the second layer refers to the total thickness of these layers. When the thickness of the second layer is less than 0.01 mm, the second layer may be broken by a pressing pressure during vulcanization of the green tire in which the polymer laminate is used as the inner liner, and thus vulcanization adhesive strength may be reduced. On the other hand, when the thickness of the second layer is more than 0.3 mm, tire weight may increase and fuel efficiency performance may deteriorate.

<Polymer Laminate>

In the present embodiment, a polymer laminate composed of a composite layer of the first layer and the second layer is used as the inner layer. Here, the first layer and the second layer are thermoplastic elastomer compositions, and are in a softened state in the mold at a vulcanization temperature, for example 150° C. to 180° C. The softened state refers to an intermediate state between a solid and a liquid with improved molecular mobility. Further, since a thermoplastic elastomer composition in the softened state has an improved reactivity than in the solid state, it adheres to or is bonded with an adjacent member. Accordingly, in order to manufacture a tire, a cooling step is required to prevent a change in the shape of a thermoplastic elastomer and its adhesion or fusion to the adjacent member. In the cooling step, the inside of a bladder portion is cooled rapidly to 50 to 120° C. for 10 to 300 seconds after vulcanization of the tire. As a cooling medium, at least one selected from air, steam, water, and oil is used. By adopting such a cooling step, a thin inner liner in the range of 0.05 to 0.6 mm can be formed as the inner liner.

Embodiment 1-2

In Embodiment 1-2, inner liner 2 has a width W2 formed to be larger than a width W1 of unvulcanized rubber sheet 3.

<Cutting Step>

Figure 5:
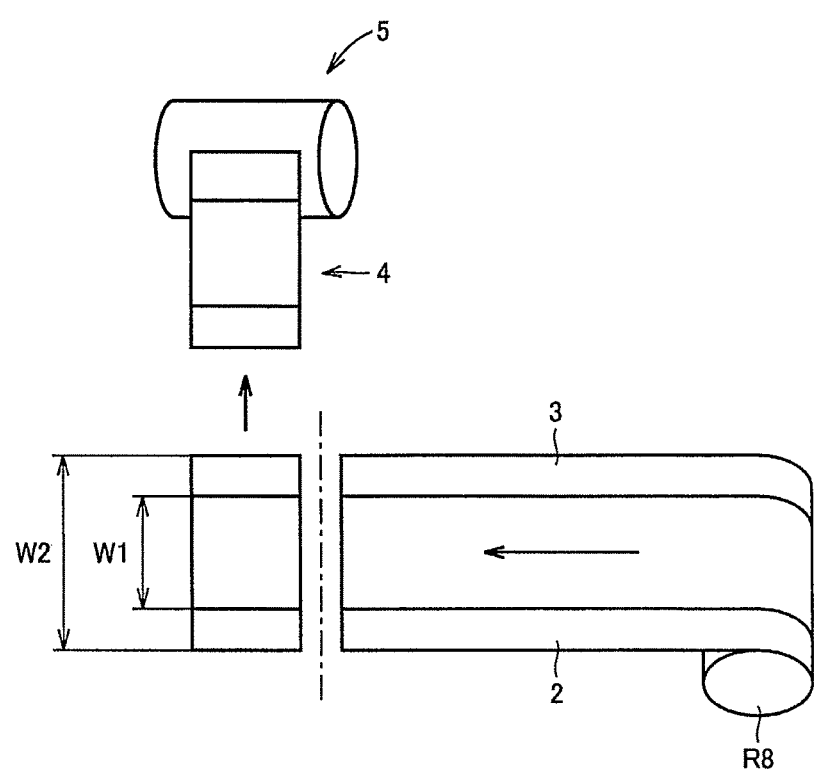
FIG. 5 is a schematic view showing the cutting step.

FIG. 5 is a schematic view showing the cutting step. Laminate 1 is fed from take-up roll R8, or continuously from the assembly step, to a cutter by a belt conveyer. Laminate 1 is cut to have a predetermined length in the longitudinal direction in accordance with the size of the tire to manufacture cut sheet 4. A conventional technique such as cutting with a knife can be adopted to cut the laminate. The cutting direction of cut sheet 4 corresponds to the circumferential direction of the drum, and the cutting length thereof in the longitudinal direction corresponds to the width direction of drum 5.

<Joining Step>

FIG. 6(A) is a cross sectional view of the laminate, and FIG. 6(B) is a schematic view showing the joining step of winding the laminate on the drum. Here, the laminate is wound such that inner liner 2 is on and in contact with drum 5, and end portions 2a, 2b thereof are overlapped to form a joint. Thereon, end portions 3a, 3b of unvulcanized rubber sheet 3 such as an insulation are joined using an unvulcanized rubber piece 6. In this case, two joints are formed at positions that are offset from the position of the joint of the inner liner.

<Structure of Tire>

Figure 8:
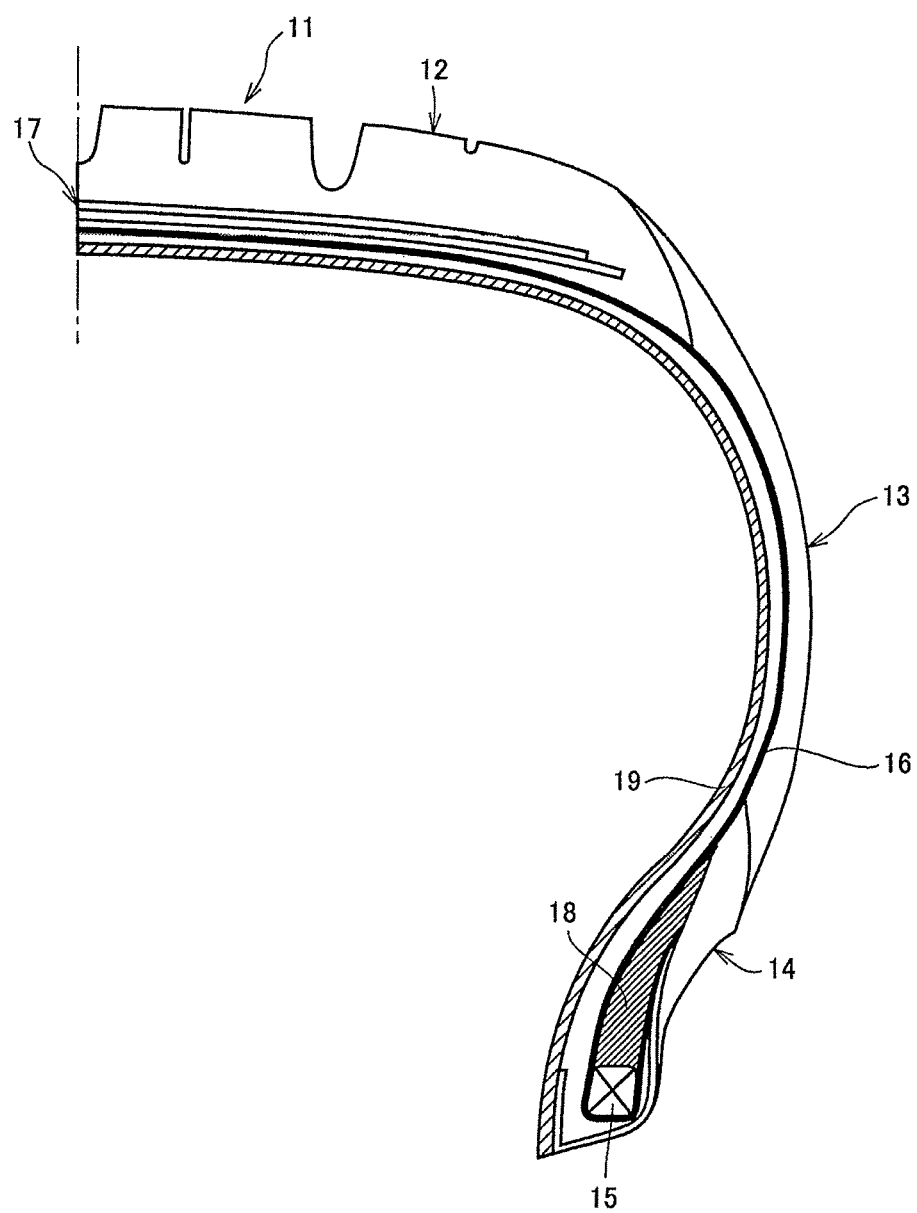
FIG. 8 is a schematic cross sectional view of a pneumatic tire.

A pneumatic tire having an inner liner on an inner side of the tire in accordance with Embodiments 1-1, 1-2 will be described with reference to the drawings. FIG. 8 is a schematic cross sectional view of the right half of the pneumatic tire. In the drawing, a pneumatic tire 11 has a tread part 12, and a sidewall part 13 and a bead part 14 forming a toroidal shape from both ends of the tread part. Further, a bead core 15 is embedded in bead part 14. Also provided are a carcass ply 16 arranged to extend from one bead part 14 to the other bead part with each of both ends being folded back around bead core 15 and locked, and a belt layer 17 composed of at least two plies on an outer side of carcass ply 16 at a crown part.

The two plies of belt layer 17, each being usually made of a steel cord or a cord of aramid fiber or the like, are arranged so that the cords intersect with each other between the plies and each form an angle of usually 5 to 30° with respect to a tire circumferential direction. A topping rubber layer can be provided on an outer side of each of both ends of the belt layer to reduce peeling-off at the both ends of the belt layer. Regarding the carcass ply, organic fiber cords made of polyester, nylon, aramid or the like are arranged at an angle of about 90° with respect to the tire circumferential direction, and a bead apex 18 extending from the top end of bead core 15 toward the sidewall is disposed in a region surrounded by the carcass ply and the folded part thereof. An inner liner 19 extending from one bead part 14 to the other bead part 14 is disposed on a tire radial inner side of carcass ply 16.

Figure 9A:
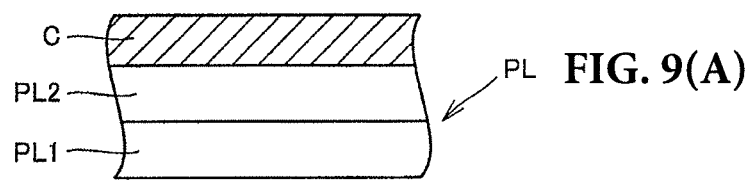
FIGS. 9(A), 9(B), 9(C) and 9(D) represent schematic cross sectional views of a polymer laminate.

Next, the state of arrangement of the inner liner with respect to the carcass ply in a vulcanized tire will be specifically shown in FIGS. 9(A), 9(B), 9(C) and 9(D). In FIG. 9(A), a polymer laminate PL is composed of a first layer PL1 and an SIS-based layer (a layer mainly composed of the SIS) PL2 as a second layer. When polymer laminate PL is used as the inner liner of the pneumatic tire, if SIS-based layer PL2 is arranged toward a tire radial outer side so as to contact a carcass ply C, adhesive strength between SIS-based layer PL2 and carcass C can be enhanced in the tire vulcanization step. Therefore, the resultant pneumatic tire can have excellent air permeation resistance and durability, since the inner liner is satisfactorily bonded with a rubber layer of carcass ply C.

Figure 9B:
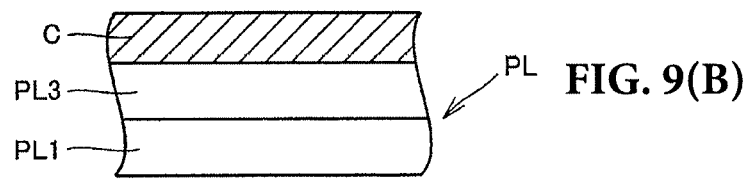

In FIG. 9(B), polymer laminate PL is composed of first layer PL1 and an SIB-based layer PL3 as a second layer. When polymer laminate PL is used as the inner liner of the pneumatic tire, if a surface of SIB-based layer PL3 is arranged toward the tire radial outer side so as to contact carcass ply C, adhesive strength between SIB-based layer PL3 and carcass C can be enhanced in the tire vulcanization step. Therefore, the resultant pneumatic tire can have excellent air permeation resistance and durability, since the inner liner is satisfactorily bonded with the rubber layer of carcass ply C.

Figure 9C:
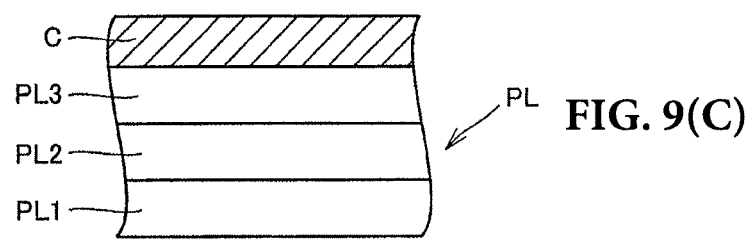

In FIG. 9(C), polymer laminate PL is composed of first layer PL1 and SIS-based layer PL2 and SIB-based layer PL3 as a second layer, laminated in the order listed above. When polymer laminate PL is used as the inner liner of the pneumatic tire, if a surface of SIB-based layer PL3 is arranged toward the tire radial outer side so as to contact carcass ply C, adhesive strength between SIB-based layer PL3 and carcass ply C can be enhanced in the tire vulcanization step. Therefore, the resultant pneumatic tire can have excellent air permeation resistance and durability, since the inner liner is satisfactorily bonded with the rubber layer of carcass ply C.

Figure 9D:
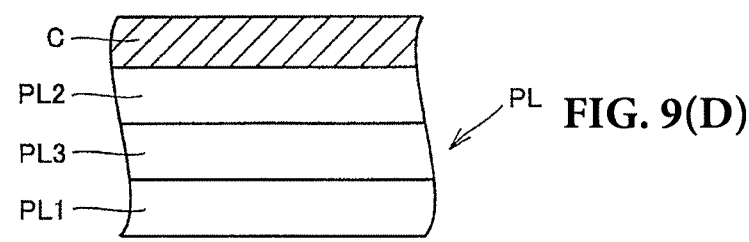

In FIG. 9(D), polymer laminate PL is composed of first layer PL1 and SIB-based layer PL3 and SIS-based layer PL2 as a second layer, laminated in the order listed above. When polymer laminate PL is used as the inner liner of the pneumatic tire, if a surface of SIS-based layer PL2 is arranged toward the tire radial outer side so as to contact carcass ply C, adhesive strength between SIS-based layer PL2 and carcass ply C can be enhanced in the tire vulcanization step. Therefore, the resultant pneumatic tire can have excellent air permeation resistance and durability, since the inner liner is satisfactorily bonded with the rubber layer of carcass ply C.

<Method for Manufacturing Pneumatic Tire>

The pneumatic tire in accordance with the present embodiment can be manufactured using an ordinary manufacturing method. An inner liner is manufactured using polymer laminate PL. The inner liner is used for a green tire for pneumatic tire 11 and vulcanization-molded together with other members, and thereby the pneumatic tire can be manufactured. When polymer laminate PL is arranged in the green tire, SIS-based layer PL2 or SIB-based layer PL3 as the second layer of polymer laminate PL is arranged toward the tire radial outer side so as to contact carcass ply C. With such an arrangement, adhesive strength between SIS-based layer PL2 or SIB-based layer PL3 and the carcass ply can be enhanced in the tire vulcanization step. The resultant pneumatic tire can have excellent air permeation resistance and durability, since the inner liner is satisfactorily bonded with the rubber layer of the carcass ply.

Embodiment 2-1

As the assembly step, the cutting step, the joining step, and the tire molding/vulcanization step, the same methods as those in Embodiment 1-1 can be used.

<Inner Liner>

In the present embodiment, an inner liner is formed of a laminate of a first layer made of a mixture of an SIBS and a C4 polymer and a second layer disposed on a side of an unvulcanized rubber sheet, made of a thermoplastic elastomer, and having a thickness of 0.01 mm to 0.3 mm.

<First Layer>

The first layer contains more than or equal to 60% by mass and less than or equal to 99.5% by mass of a styrene-isobutylene-styrene triblock copolymer (SIBS) and more than or equal to 0.5% by mass and less than or equal to 40% by mass of a polymer obtained by polymerizing a monomer having 4 carbon atoms (hereinafter also referred to as a "C4 polymer"), and has a thickness of more than or equal to 0.05 mm and less than or equal to 0.6 mm.

As the SIBS, the same one as that in Embodiment 1-1 can be used.

(C4 Polymer)

In the first layer, the C4 polymer is mixed with the SIBS. The polymer contains a low molecular weight component, which can improve unvulcanization tack strength and vulcanization adhesive strength of the first layer with another polymer sheet or rubber layer without degrading air permeation resistance derived from the SIBS. Therefore, using the first layer containing the C4 polymer and the SIBS for an inner liner part of a tire can improve adhesive strength with a rubber layer constituting an adjacent carcass or insulation, and prevent an air-in phenomenon between the inner liner and the carcass or between the inner liner and the insulation.

The number-average molecular weight of the polymer obtained by polymerizing a monomer having 4 carbon atoms obtained by a GPC method is preferably more than or equal to 300 and less than or equal to 3,000, and more preferably more than or equal to 500 and less than or equal to 2,500. The weight-average molecular weight of that polymer obtained by the GPC method is preferably more than or equal to 700 and less than or equal to 100,000, and more preferably more than or equal to 1,000 and less than or equal to 80,000. The viscosity-average molecular weight of that polymer obtained by an FCC method is preferably more than or equal to 20,000 and less than or equal to 70,000, and more preferably more than or equal to 30,000 and less than or equal to 60,000. Examples of the C4 polymer include polybutene, polyisobutylene, and the like.

Polybutene is a copolymer having a molecular structure of long chain hydrocarbon mainly composed of isobutene as a monomer unit, with normal butene being further used, and obtained by causing them to react with each other. Hydrogenated polybutene can also be used as polybutene.

Polyisobutylene is a copolymer having a molecular structure of long chain hydrocarbon composed of isobutene as a monomer unit and obtained by polymerization thereof.

(Mixture of SIBS and C4 Polymer)

The first layer contains more than or equal to 0.5% by mass and less than or equal to 40% by mass of the C4 polymer. When the content of the C4 polymer is less than 0.5% by mass, vulcanization adhesive strength with the carcass or the insulation may be reduced, and when the content of the C4 polymer is more than 40% by mass, air permeation resistance may be reduced, further reducing viscosity, which may cause deterioration in extrusion moldability. The content of the C4 polymer is preferably more than or equal to 5% by mass and less than or equal to 20% by mass. On the other hand, the content of the SIBS in the first layer is more than or equal to 60% by mass and less than or equal to 99.5% by mass. When the content of the SIBS is less than 60% by mass, air permeation resistance may be reduced, and when the content of the SIBS is more than 99.5% by mass, vulcanization adhesive strength with the carcass or the insulation may be reduced. Therefore, both the cases are not preferred. The content of the SIBS is more preferably more than or equal to 80% by mass and less than or equal to 95% by mass.

(Thickness of First Layer)

The thickness of the first layer made of the SIBS is 0.05 to 0.6 mm. When the thickness of the first layer is less than 0.05 mm, the first layer may be broken by a pressing pressure during vulcanization of a green tire in which a polymer laminate is used as the inner liner, and thus an air leak phenomenon may occur in the tire. On the other hand, when the thickness of the first layer is more than 0.6 mm, tire weight increases and fuel efficiency performance deteriorates.

The first layer can be obtained by forming the SIBS and the C4 polymer into a film by a conventional method of forming a thermoplastic resin or a thermoplastic elastomer into a film, such as extrusion molding or calender molding.

<Second Layer>

As the second layer, the same one as that in Embodiment 1-1 can be used.

The second layer can be molded by subjecting an SIB to a conventional method of forming a styrene-based thermoplastic elastomer into a film, such as extrusion molding or calender molding. The thickness of the second layer is preferably 0.01 mm to 0.3 mm. When the thickness of the second layer is less than 0.01 mm, the second layer may be broken by a pressing pressure during vulcanization of the green tire in which the polymer laminate is used as the inner liner, and thus vulcanization adhesive strength may be reduced. On the other hand, when the thickness of the second layer is more than 0.3 mm, tire weight may increase and fuel efficiency performance may deteriorate. The thickness of the second layer is more preferably 0.05 to 0.2 mm.

Embodiment 2-2

Embodiment 2-2 is different from Embodiment 2-1 in that inner liner 2 has width W2 formed to be larger than width W1 of unvulcanized rubber sheet 3.

As the cutting step and the joining step, the same methods as those in Embodiment 1-2 can be used.

<Structure of Tire>

The tire manufactured based on Embodiments 2-1, 2-2 can have the same structure as that in Embodiment 1-1.

Next, the state of arrangement of the inner liner with respect to the carcass ply in a vulcanized tire will be shown in FIG. 9(a). In FIG. 9(a), polymer laminate PL is composed of first layer PL1 and second layer PL2. When polymer laminate PL is used as the inner liner of the pneumatic tire, if second layer PL2 is arranged toward the tire radial outer side so as to contact carcass ply C, adhesive strength between second layer PL2 and carcass C can be enhanced in the tire vulcanization step. The resultant pneumatic tire has excellent air permeation resistance and flex crack growth resistance, since the inner liner is satisfactorily bonded with the rubber layer of carcass ply C.

<Method for Manufacturing Pneumatic Tire>

As a method for manufacturing the pneumatic tire in accordance with the present invention, a conventional manufacturing method can be used. An inner liner is manufactured using polymer laminate PL. The inner liner is used for a green tire for pneumatic tire 11 and vulcanization-molded together with other members, and thereby the pneumatic tire is manufactured. When polymer laminate PL is arranged in the green tire, second layer PL2 of polymer laminate PL is arranged toward the tire radial outer side so as to contact carcass ply C. With such an arrangement, adhesive strength between second layer PL2 and carcass 6 can be enhanced in the tire vulcanization step. The resultant pneumatic tire has excellent air permeation resistance and flex crack growth resistance, since the inner liner is satisfactorily bonded with the rubber layer of carcass ply C.

Embodiment 3-1

As the assembly step, the cutting step, the joining step, and the tire molding/vulcanization step, the same methods as those in Embodiment 1-1 can be used.

<Inner Liner>

In the present embodiment, an inner liner is composed of a sheet of a polymer composition made of a mixture of a styrene-isobutylene-styrene triblock copolymer (hereinafter also referred to as an "SIBS") and a rubber component. Further, the inner liner can also be composed of a composite body of a first layer made of the polymer sheet and a second layer made of a thermoplastic elastomer composition.

The inner liner is composed of a single layer of a polymer sheet made of a polymer composition containing a styrene-isobutylene-styrene block copolymer and a rubber component, and having a thickness of 0.05 mm to 0.6 mm, or alternatively, the inner liner is composed of a composite layer of a first layer made of the polymer sheet and a second layer disposed on a side of an unvulcanized rubber sheet, made of a thermoplastic elastomer, and having a thickness of 0.01 mm to 0.3 mm. Further, the width of the inner liner is adjusted depending on the size of the tire.

<Polymer Composition>

In the present embodiment, the polymer sheet is made of a polymer composition containing more than or equal to 0.1 parts by mass and less than or equal to 5 parts by mass of sulfur relative to 100 parts by mass of a polymer component containing more than or equal to 5% by mass and less than or equal to 40% by mass of a styrene-isobutylene-styrene triblock copolymer (SIBS) and more than or equal to 60% by mass and less than or equal to 95% by mass of at least one rubber component selected from the group consisting of natural rubber, isoprene rubber, and butyl rubber.

The polymer composition contains an SIBS, a rubber component, and sulfur. When a rubber component and sulfur are added to the SIBS and mixed by heating, the rubber component and sulfur produce a vulcanization reaction during mixing by heating to form a sea-island structure in which the SIBS serves as a matrix (sea) and the rubber component serves as an island.

The polymer composition having the sea-island structure has air permeation resistance derived from the matrix phase made of the SIBS. Further, the rubber component constituting the island phase has tackiness before vulcanization with an adjacent member containing a rubber component and vulcanization adhesiveness with the adjacent member because of the vulcanization reaction produced with the rubber component of the adjacent member during mixing by heating. Therefore, the polymer sheet made of the polymer composition can have excellent air permeation resistance, and tackiness before vulcanization and vulcanization adhesiveness with the adjacent member.

As the SIBS, the same one as that in Embodiment 1-1 can be used.

The SIBS content is more than or equal to 5% by mass and less than or equal to 40% by mass in the polymer component of the polymer composition. When the SIBS content is less than 5% by mass, air permeation resistance of the polymer sheet may be reduced. On the other hand, when the SIBS content is more than 40% by mass, vulcanization adhesiveness with the adjacent member may be insufficient. The SIBS content is preferably more than or equal to 10% by mass and less than or equal to 30% by mass in the polymer component, from the viewpoint of ensuring air permeation resistance.

(Rubber Component)

The polymer composition constituting the polymer sheet for the inner liner contains a rubber component. The rubber component can provide the polymer composition with tackiness before vulcanization with an adjacent member containing a rubber component. Further, because of the vulcanization reaction with sulfur, the rubber component can provide the polymer composition with vulcanization adhesiveness with an adjacent member such as a carcass or an insulation. The rubber component contains at least one selected from the group consisting of natural rubber, isoprene rubber, and butyl rubber, and particularly preferably contains natural rubber in view of breaking strength and adhesiveness.

The content of the rubber component is more than or equal to 60% by mass and less than or equal to 95% by mass in the polymer component of the polymer composition. When the content of the rubber component is less than 60% by mass, the viscosity of the polymer composition increases to cause extrusion moldability to deteriorate, so that when fabricating a polymer sheet, the polymer sheet cannot be made thin. On the other hand, when the content of the rubber component is more than 95% by mass, air permeation resistance of the polymer sheet may be reduced. The content of the rubber component is preferably more than or equal to 70% by mass and less than or equal to 90% by mass in the polymer component in view of tackiness before vulcanization and vulcanization adhesiveness.

(Sulfur)

For the polymer composition, sulfur commonly used can be used, and it is preferable to use insoluble sulfur. Here, insoluble sulfur refers to sulfur obtained by heating and rapidly cooling natural sulfur $S_8$, and polymerizing it so as to become Sx (x=100,000 to 300,000). The use of insoluble sulfur can prevent blooming that would usually occur when sulfur is used as a rubber vulcanization agent.

The sulfur content is more than or equal to 0.1 parts by mass and less than or equal to 5 parts by mass relative to 100 parts by mass of the polymer component. When the sulfur content is less than 0.1 parts by mass, the effect of vulcanizing the rubber component cannot be achieved. On the other hand, when the sulfur content is more than 5 parts by mass, the hardness of the polymer composition increases, and when the polymer sheet is used as the inner liner, the durability performance of a pneumatic tire may deteriorate. The sulfur content is more preferably more than or equal to 0.3 parts by mass and less than or equal to 3.0 parts by mass.

(Additives in Polymer Composition)

The polymer composition constituting the polymer sheet can contain additives such as stearic acid, zinc oxide, an age inhibitor, and a vulcanization accelerator. Stearic acid functions as a vulcanization assistant for the rubber component. The content of stearic acid is preferably more than or equal to 1 part by mass and less than or equal to 5 parts by mass relative to 100 parts by mass of the polymer component. When the content of stearic acid is less than 1 part by mass, the effect as a vulcanization assistant cannot be achieved. On the other hand, when the content of stearic acid is more than 5 parts by mass, the viscosity of the polymer composition may be reduced, and breaking strength may be reduced, which is not preferable. The content of stearic acid is more preferably more than or equal to 1 part by mass and less than or equal to 4 parts by mass.

Zinc oxide functions as a vulcanization assistant for the rubber component. The content of zinc oxide is preferably more than or equal to 0.1 part by mass and less than or equal to 8 parts by mass relative to 100 parts by mass of the polymer component. When the content of zinc oxide is less than 0.1 part by mass, the effect as a vulcanization assistant cannot be achieved. On the other hand, when the content of zinc oxide is more than 8 parts by mass, the hardness of the polymer composition increases, and when the polymer sheet is used as the inner liner, the durability performance of a pneumatic tire may deteriorate. The content of zinc oxide is more preferably more than or equal to 0.5 parts by mass and less than or equal to 6 parts by mass.

An age inhibitor has a function of preventing a series of degradations called aging, such as oxidation degradation, thermal degradation, ozone degradation, and fatigue degradation. Age inhibitors are classified into a primary age inhibitor composed of amines or phenols and a secondary age inhibitor composed of sulfur compounds or phosphites. The primary age inhibitor has a function of supplying hydrogen to various polymer radicals to stop a chain reaction of autooxidation, and the secondary age inhibitor exhibits a stabilizing effect by turning hydroxyperoxide into stable alcohol.

Examples of the age inhibitor include amines, phenols, imidazoles, phosphors, thioureas, and the like. One type of the above-mentioned age inhibitors may be used solely, or two or more types thereof may be used in combination. Particularly, it is preferable to use N-(1,3-dimethylbutyl)-N'-phenyl-p-phenylenediamine.

The content of the age inhibitor is preferably more than or equal to 0.1 parts by mass and less than or equal to 5 parts by mass relative to 100 parts by mass of the polymer component. When the content of the age inhibitor is less than 0.1 parts by mass, the effect of inhibiting aging cannot be achieved. On the other hand, when the content of the age inhibitor is more than 5 parts by mass, a blooming phenomenon will occur in the polymer composition. The content of the age inhibitor is more preferably more than or equal to 0.3 parts by mass and less than or equal to 4 parts by mass.

As a vulcanization accelerator, thiurams, thiazoles, thioureas, dithiocarbamates, guanidines, sulfenamides, and the like can be used. One type of the above-mentioned vulcanization accelerators may be used solely, or two or more types thereof may be used in combination. Particularly, it is preferable to use dibenzothiazyl sulfide.

The content of the vulcanization accelerator is preferably more than or equal to 0.1 parts by mass and less than or equal to 5 parts by mass relative to 100 parts by mass of the polymer component. When the content of the vulcanization accelerator is less than 0.1 parts by mass, the effect of accelerating vulcanization cannot be achieved. On the other hand, when the content of the vulcanization accelerator is more than 5 parts by mass, the hardness of the polymer composition increases, and when the polymer sheet is used as the inner liner, the durability performance of a pneumatic tire may deteriorate. In addition, the raw material cost for the polymer composition increases. The content of the vulcanization accelerator is more preferably more than or equal to 0.3 parts by mass and less than or equal to 4 parts by mass.

<Inner Liner Made of Composite Body>

In the present embodiment, as the inner liner, the composite body of the first layer made of the polymer sheet and the second layer mainly composed of a thermoplastic elastomer is used.

(Second Layer)

In the composite body of the first layer and the second layer, the second layer is made of a thermoplastic elastomer composition containing a thermoplastic elastomer and sulfur. In such a second layer, at least one rubber component selected from the group consisting of natural rubber, isoprene rubber, and butyl rubber can also be mixed with the thermoplastic elastomer. By adding sulfur to the thermoplastic elastomer, tack strength before vulcanization and vulcanization adhesive strength with the first layer are improved. Further, tack strength before vulcanization and vulcanization adhesive strength with an adjacent member such as a carcass or an insulation are also improved.

As the thermoplastic elastomer in the second layer, the same one as that in Embodiment 1-1 can be used.

Particularly, it is preferable to use a styrene-isoprene-styrene triblock copolymer (SIS), a styrene-isobutylene diblock copolymer (SIB), or an epoxidized styrene-butadiene-styrene triblock copolymer (epoxidized SBS).

Since an isoprene block of the styrene-isoprene-styrene triblock copolymer (hereinafter also referred to as the SIS) is a soft segment, a thermoplastic elastomer composition containing the SIS is easily vulcanization-bonded with a rubber component. Therefore, when the thermoplastic elastomer composition containing the SIS is used for the inner liner, the inner liner is excellent in adhesiveness with an adjacent rubber constituting a carcass or an insulation, and thus a pneumatic tire that can prevent the air-in phenomenon and has excellent durability can be obtained.

As the SIS and the SIB, the same ones as those in Embodiment 1-1 can be used.

The epoxidized styrene-butadiene-styrene triblock copolymer (hereinafter also referred to as the epoxidized SBS) is a thermoplastic elastomer in which a hard segment is a polystyrene block, a soft segment is a butadiene block, and an unsaturated double bond portion contained in the butadiene block has been epoxidized. Since the epoxidized SBS has the soft segment, a thermoplastic elastomer composition containing the epoxidized SBS is easily vulcanization-bonded with a rubber component. Therefore, when the thermoplastic elastomer composition containing the epoxidized SBS is used for the inner liner, the inner liner is excellent in adhesiveness with an adjacent rubber constituting a carcass or an insulation, and thus a pneumatic tire that can prevent the air-in phenomenon and has excellent durability can be obtained.

Regarding the molecular weight of the epoxidized SBS, the weight-average molecular weight obtained by the GPC method is preferably more than or equal to 10,000 and less than or equal to 400,000 in view of rubber elasticity and moldability. When the weight-average molecular weight is less than 10,000, the reinforcing effect may be lessened. When the weight-average molecular weight is more than 400,000, the thermoplastic elastomer composition may have an increased viscosity. Therefore, both the cases are not preferred.

The content of a styrene unit in the epoxidized SBS is preferably more than or equal to 10% by mass and less than or equal to 30% by mass in view of tackiness, adhesiveness, and rubber elasticity. In the epoxidized SBS, a molar ratio of a butadiene unit to a styrene unit (butadiene unit/styrene unit) is preferably 90/10 to 70/30. In the epoxidized SBS, the polymerization degree of each block is preferably about 500 to 5,000 for a butadiene block and about 500 to 1,500 for a styrene block, in view of rubber elasticity and handling.

When the second layer contains a rubber component, the rubber component is preferably more than or equal to 20% by mass and less than or equal to 90% by mass, more preferably more than or equal to 30% by mass and less than or equal to 80% by mass, relative to the sum of the thermoplastic elastomer and the rubber component. When the rubber component is less than 20% by mass, the second layer may be unlikely to be vulcanization-bonded with a carcass layer, and when the rubber component is more than 90% by mass, the second layer and the carcass layer may be vulcanization-bonded excessively.

The sulfur content is more than or equal to 0.1 parts by mass and less than or equal to 5 parts by mass relative to 100 parts by mass of the thermoplastic elastomer. When the sulfur content is less than 0.1 parts by mass, the vulcanization reaction may not be produced. On the other hand, when the sulfur content is more than 5 parts by mass, the cross-linking density of the thermoplastic elastomer composition may be increased, which may increase viscosity. The sulfur content is more preferably more than or equal to 0.3 parts by mass and less than or equal to 3 parts by mass. The thermoplastic elastomer composition can contain additives such as stearic acid, zinc oxide, an age inhibitor, and a vulcanization accelerator.

For these additives, the formulation in the first layer can be adopted.

<Method for Manufacturing Inner Liner>

(Polymer Sheet and Composite Body)

The polymer sheet for an inner liner in accordance with the present invention can be manufactured by a method described below. The compounding agents are charged into a twin-screw extruder and kneaded under the conditions of about 150 to 280° C. and 50 to 300 rpm, thereby obtaining pellets of a polymer composition in which the SIBS, the rubber component, sulfur, and various additives as necessary are dynamically crosslinked. The obtained pellets are charged into a T-die extruder to obtain a sheet-like polymer sheet (or the first layer) made of the polymer composition and a sheet-like second layer made of a thermoplastic elastomer composition.

In the twin-screw extruder, the SIBS, which is a thermoplastic elastomer, serves as the matrix phase, and the rubber component serves as the island phase and is dispersed. Further, in the twin-screw extruder, the rubber component reacts with an additive component, and the rubber component serving as the island phase produces a crosslinking reaction. Since the rubber component is dynamically crosslinked in the twin-screw extruder, so-called dynamic crosslinking is formed. Even if the rubber component is dynamically crosslinked in the twin-screw extruder, the shear viscosity of the entire system is low and extrusion molding is possible because the matrix phase of the system is composed of a thermoplastic elastomer component.

In the pellets of the dynamically-crosslinked polymer composition obtained with the twin-screw extruder, the rubber component is crosslinked, whereas the thermoplastic elastomer component of the matrix phase holds plasticity, and serves to produce plasticity of the entire polymer composition. Therefore, the polymer composition also exhibits plasticity in T-die extrusion, and thus can be molded into a sheet shape.

Further, since the rubber component is crosslinked in the pellets of the dynamically-crosslinked polymer composition, the polymer composition of the inner liner can be prevented from penetrating into the carcass ply even when a pneumatic tire is heated while manufacturing the pneumatic tire by using the polymer sheet fabricated from the pellets as the inner liner.

When the inner liner is composed of a composite body, the first layer and the second layer are bonded with each other. Here, the polymer sheet is used as the first layer. Further, the composite body of the first layer and the second layer is formed by lamination extrusion, such as laminate extrusion or coextrusion, of the respective pellets of the polymer composition and the thermoplastic elastomer composition.

Embodiment 3-2

Embodiment 3-2 is different from Embodiment 3-1 in that inner liner 2 has width W2 formed to be larger than width W1 of unvulcanized rubber sheet 3.

As the cutting step and the joining step, the same methods as those in Embodiment 1-2 can be used.

<Structure of Tire>

The pneumatic tire manufactured based on Embodiments 3-1, 3-2 can have the same structure as that in Embodiment 1-1.

Next, the state of arrangement of the inner liner with respect to the carcass ply in a vulcanized tire will be shown in FIG. 9(a). In FIG. 9(a), composite body PL is composed of first layer PL1 and second layer PL2. When composite body PL is used as the inner liner of the pneumatic tire, if second layer PL2 is arranged toward the tire radial outer side so as to contact carcass ply C, adhesive strength between second layer PL2 and carcass C can be enhanced in the tire vulcanization step. The resultant pneumatic tire has excellent air permeation resistance, since the inner liner is satisfactorily bonded with the rubber layer of carcass ply C.

<Method for Manufacturing Pneumatic Tire>

As a method for manufacturing the pneumatic tire in accordance with the present invention, a conventional manufacturing method can be used. An inner liner is manufactured using composite body PL. The inner liner is used for a green tire for pneumatic tire 11 and vulcanization-molded together with other members, and thereby the pneumatic tire is manufactured. When composite body PL is arranged in the green tire, second layer PL2 of composite body PL is arranged toward the tire radial outer side so as to contact carcass ply C. With such an arrangement, adhesive strength between second layer PL2 and carcass 6 can be enhanced in the tire vulcanization step. The resultant pneumatic tire has excellent air permeation resistance, since the inner liner is satisfactorily bonded with the rubber layer of carcass ply C.

Embodiment 4-1

As the assembly step, the cutting step, the joining step, and the tire molding/vulcanization step, the same methods as those in Embodiment 1-1 can be used.

It is noted that an inner liner is composed of a composite layer of a first layer made of a polymer composition containing a styrene-isobutylene-styrene block copolymer and a rubber component and having a thickness of 0.05 mm to 0.6 mm, and a second layer disposed on a side of an unvulcanized rubber sheet, made of a thermoplastic elastomer, and having a thickness of 0.01 mm to 0.3 mm. Further, the width of the inner liner is adjusted depending on the size of the tire. In the present invention, since the inner liner and the unvulcanized rubber sheet are pressure-bonded using the rolls, they can be closely bonded reliably with no air left therebetween, and they can be bonded efficiently and with good productivity.

<Inner Liner>

In the present embodiment, the inner liner is composed of a composite body of the first layer disposed on the inner side of the tire and the second layer disposed in contact with a rubber layer of the carcass ply. The first layer is a thermoplastic elastomer composition mainly composed of a styrene-isobutylene-styrene block copolymer (hereinafter also referred to as an "SIBS"), and the second layer is a styrene-based thermoplastic elastomer composition. At least one of the thermoplastic elastomer compositions of the first and second layers contains 0.1 to 100 parts by mass of a tackifier relative to 100 parts by mass of the thermoplastic elastomer.

<First Layer>

The first layer is made of a thermoplastic elastomer composition mainly composed of a styrene-isobutylene-styrene block copolymer (SIBS).

As the SIBS, the same one as that in Embodiment 1-1 can be used.

A thickness T1 of the first layer mainly composed of the SIBS is 0.05 to 0.6 mm. When the thickness of the first layer is less than 0.05 mm, the first layer may be broken by a pressing pressure during vulcanization of a green tire in which a polymer laminate is used as the inner liner, and thus an air leak phenomenon may occur in the resultant tire. On the other hand, when the thickness of the first layer is more than 0.6 mm, tire weight increases and fuel efficiency performance deteriorates. The thickness of the first layer is more preferably 0.05 to 0.4 mm. The first layer can be obtained by forming the SIBS into a film by a conventional method of forming a thermoplastic resin or a thermoplastic elastomer into a film, such as extrusion molding or calender molding.

The first layer contains the SIBS by 90% by mass or more in a thermoplastic elastomer component. As the thermoplastic elastomer, a styrene-based thermoplastic elastomer, an urethane-based thermoplastic elastomer, or the like can be used.

<Second Layer>

The second layer of the composite body is composed of a styrene-based thermoplastic elastomer composition.

As the styrene-based thermoplastic elastomer composition, the same one as that in Embodiment 1-1 can be used.

The thickness of the second layer is preferably 0.01 mm to 0.3 mm. Here, when the second layer is made of, for example, a single layer such as an SIS or SIB layer, the thickness of the second layer refers to a thickness of the single layer. On the other hand, when the second layer is made of, for example, two layers including an SIS layer, an SIB layer, and the like, the thickness of the second layer refers to the total thickness of these layers. When the thickness of the second layer is less than 0.01 mm, the second layer may be broken by a pressing pressure during vulcanization of the green tire in which the polymer laminate is used as the inner liner, and thus vulcanization adhesive strength may be reduced. On the other hand, when the thickness of the second layer is more than 0.3 mm, tire weight may increase and fuel efficiency performance may deteriorate. The thickness of the second layer is more preferably 0.05 to 0.2 mm.

<Formulation of Tackifier>

In the present embodiment, at least one of the first layer and the second layer is blended with 0.1 to 100 parts by mass of a tackifier relative to 100 parts by mass of the thermoplastic elastomer. Here, the "tackifier" refers to an additive for increasing tackiness of the thermoplastic elastomer composition. Examples of such a tackifier will be illustrated below. Further, desirably, the tackifier has a weight-average molecular weight Mw of $1 \times 10^2$ to $1 \times 10^6$ and a softening point within a range of 50° C. to 150° C. When the weight-average molecular weight is less than $1 \times 10^2$, a degree of viscosity becomes low to result in disadvantage in sheet moldability. On the other hand, when the weight-average molecular weight is more than $1 \times 10^6$, the first layer and the second layer are provided with insufficient tackiness.

The following is the list of exemplary tackifiers.

[C9 Petroleum Resin]

A C9 petroleum resin is an aromatic petroleum resin obtained by polymerizing C5 to C9 fractions (mainly C9 fraction) in a mixed state. The C5 to C9 fractions are remnants when obtaining useful compounds, such as ethylene, propylene, and butadiene, by thermally decomposing naphtha. Examples thereof include products such as: ARKON P70, P90, P100, P125, P140, M90, M100, M115, and M135 (each manufactured by Arakawa Chemical Industries, Ltd, and having a softening point of 70 to 145° C.); I-MARV 5100, S110, P100, P125, and P140 (aromatic copolymer-based hydrogenated petroleum resins each manufactured by Idemitsu Petrochemical Ltd, having a softening point of 100 to 140° C., a weight-average molecular weight of 700 to 900, and a bromine number of 2.0 to 6.0 g/100 g); and Petcoal XL (manufactured by TOSOH Corporation).

[C5 Petroleum Resin]

A C5 petroleum resin is an aliphatic petroleum resin obtained by polymerizing C4 to C5 fractions (mainly C5 fraction) in a mixed state. The C4 to C5 fractions are remnants when obtaining useful compounds, such as ethylene, propylene, and butadiene, by thermally decomposing naphtha. Examples thereof include products such as: Hilets G100 (manufactured by Mitsui Petrochemicals Industries, Ltd, and having a softening point of 100° C.); Marcalets T100AS (manufactured by Maruzen Petrochemical Co., Ltd, and having a softening point of 100° C.); and Escorez 1102 (manufactured by Tonex Co., Ltd, and having a softening point of 110° C.).

[Terpene Resin]

Examples of a terpene resin include products such as: YS Resin PX800N, PX1000, PX1150, PX1250, and PXN1150N; and Clearon P85, P105, P115, P125, P135, P150, M105, M115, and K100 (each manufactured by Yasuhara Chemical Co., Ltd, and having a softening point of 75 to 160° C.).

[Aromatic Modified Terpene Resin]

Examples of an aromatic modified terpene resin include products such as: YS Resin TO85, TO105, 10115, and TO125 (each manufactured by Yasuhara Chemical Co., Ltd, and having a softening point of 75 to 165° C.).

[Terpene Phenol Resin]

Examples of a terpene phenol resin include products such as: Tamanol 803L and 901 (manufactured by Arakawa Chemical Industries Co., Ltd, and having a softening point of 120° C. to 160° C.); and YS Polyster U115, U130, T80, T100, T115, T145, and T160 (each manufactured by Yasuhara Chemical Co., Ltd, and having a softening point of 75 to 165° C.).

[Cumarone Resin]

Examples of a cumarone resin include a cumarone resin having a softening point of 90° C. (manufactured by Kobe Oil Chemical Industrial Co., Ltd).

[Cumarone Indene Oil]

Examples of a cumarone indene oil include products such as 15E (manufactured by Kobe Oil Chemical Industrial Co., Ltd, and having a pour point of 15° C.).

[Rosin Ester]

Examples of a rosin ester include products such as: Ester Gum AAL, A, AAV, 105, AT, H, HP, and HD (each manufactured by Arakawa Chemical Industries Co., Ltd, and having a softening point of 68° C. to 110° C.); and Hariester TF, S, C, DS70L, DS90, and DS130 (each manufactured by Harima Chemicals Inc., and having a softening point of 68° C. to 138° C.).

[Hydrogenated Rosin Ester]

Examples of a hydrogenated rosin ester include products such as Super Ester A75, A100, A115, and A125 (each manufactured by Arakawa Chemical Industries Co., Ltd., and having a softening point of 70° C. to 130° C.).

[Alkylphenol Resin]

Examples of an alkylphenol resin include products such as Tamanol 510 (manufactured by Arakawa Chemical Industries Co., Ltd, and having a softening point of 75° C. to 95° C.).

[DCPD]

Examples of a DCPD include products such as Escorez 5300 (manufactured by Tonex Co., Ltd, and having a softening point of 105° C.).

As the tackifier, a fully hydrogenated petroleum resin of the C9 petroleum resins is well compatible with the SIB, and can improve adhesiveness without deteriorating gas barrier property. Further, it has an effect of decreasing a degree of viscosity, and can be used advantageously for film extrusion molding.

The tackifier is blended in a range of 0.1 to 100 parts by mass, preferably 1 to 50 parts by mass, relative to 100 parts by mass of the thermoplastic elastomer of the first layer. When the tackifier is less than 0.1 parts by mass, vulcanization adhesive strength with the second layer is insufficient. On the other hand, when the tackifier is more than 100 parts by mass, tackiness becomes too high, with the result that workability and productivity are decreased and gas barrier property is also deteriorated.

The second layer is disposed between the first layer on the inner side of the tire and the carcass ply, and is required to have adhesiveness with both of them. To attain this, the tackifier is blended in a range of 0.1 to 100 parts by mass, preferably 1 to 50 parts by mass, relative to 100 parts by mass of the thermoplastic elastomer of the second layer. When the tackifier is less than 0.1 parts by mass, vulcanization adhesive strength with the first layer is insufficient. On the other hand, when the tackifier is more than 100 parts by mass, tackiness becomes too high, with the result that workability and productivity are decreased and gas barrier property is also deteriorated.

<Second Layer: SIBS Mixture>

In the present embodiment, the second layer can be composed of a mixture of a styrene-based thermoplastic elastomer and the SIBS, particularly a mixture layer of the SIS and the SIBS or a mixture of the SIB and the SIBS. In this case, the blending quantity of the SIBS is adjusted in a range of 10 to 80% by mass, preferably 30 to 70% by mass, of a thermoplastic elastomer component. When the SIBS is less than 10% by mass, adhesiveness with the first layer is likely to be reduced, and when the SIBS is more than 80% by mass, adhesiveness with the carcass ply is likely to be reduced.

<Composite Body>

In the present embodiment, the composite body formed of the first layer and the second layer is used as the inner layer. Here, the first layer and the second layer are thermoplastic elastomer compositions, and are in a softened state in a mold at a vulcanization temperature, for example 150° C. to 180° C. The softened state refers to an intermediate state between a solid and a liquid with improved molecular mobility. Further, a thermoplastic elastomer composition in the softened state is likely to adhere to or to be bonded with an adjacent member. Accordingly, in order to manufacture a tire, a cooling step is required to prevent a change in the shape of a thermoplastic elastomer and its adhesion or fusion to the adjacent member. In the cooling step, the inside of a bladder is cooled rapidly to 50 to 120° C. for 10 to 300 seconds after vulcanization of the tire. As a cooling medium, at least one selected from air, steam, water, and oil is used. By adopting such a cooling step, a thin inner liner in the range of 0.05 to 0.6 mm can be formed as the inner liner.

<Method for Manufacturing Pneumatic Tire>

The pneumatic tire in accordance with the present embodiment can be manufactured by molding a green tire using the inner liner obtained by the aforementioned method and an unvulcanized rubber sheet (carcass ply) together with other members, and thereafter vulcanizing them. When composite body PL is arranged in the green tire, second layer PL2 is arranged toward the tire radial outer side so as to contact carcass ply C. With such an arrangement, the second layer made of a styrene-based thermoplastic elastomer composition, for example, the SIS layer or the SIB layer, can have an improved adhesive strength with carcass ply C in the tire vulcanization step. The resultant pneumatic tire has excellent air permeation resistance and durability, since the inner liner is satisfactorily bonded with the rubber layer of carcass ply C.

Embodiment 4-2

Embodiment 4-2 is different from Embodiment 4-1 in that inner liner 2 has width W2 formed to be larger than width W1 of unvulcanized rubber sheet 3.

As the cutting step and the joining step, the same methods as those in Embodiment 1-2 can be used.

<Inner Liner>

In Embodiment 4-2, for an inner liner, the same thermoplastic elastomer compositions as those in Embodiment 4-1 are used, and the same thicknesses thereof are also adopted.

<Method for Manufacturing Pneumatic Tire>

In a method for manufacturing the pneumatic tire in Embodiments 4-1, 4-2, firstly, the inner liner and an unvulcanized rubber sheet (carcass ply) are laminated using composite body PL to manufacture a laminate. Using the laminate, a green tire is molded together with other members, and thereafter vulcanized to manufacture a pneumatic tire. When composite body PL is arranged in the green tire, second layer PL2 of composite body PL is arranged toward the tire radial outer side so as to contact carcass ply C. With such an arrangement, adhesive strength between second layer PL2 and carcass 6 can be enhanced in the tire vulcanization step. The resultant pneumatic tire has excellent air permeation resistance, since the inner liner is satisfactorily bonded with the rubber layer of carcass ply C.

<Structure of Tire>

The pneumatic tire manufactured based on Embodiments 4-1, 4-2 can have the same structure as that in Embodiment 1-1.

Next, the state of arrangement of the inner liner with respect to the carcass ply in a vulcanized tire will be shown in FIG. 9(a). In FIG. 9(a), composite body PL is composed of first layer PL1 and second layer PL2. When composite body PL is used as the inner liner of the pneumatic tire, if second layer PL2 is arranged toward the tire radial outer side so as to contact carcass ply C, adhesive strength between second layer PL2 and carcass C can be enhanced in the tire vulcanization step. The resultant pneumatic tire has excellent air permeation resistance, since the inner liner is satisfactorily bonded with the rubber layer of carcass ply C.

Embodiment 5-1

As the assembly step, the cutting step, the joining step, and the tire molding/vulcanization step, the same methods as those in Embodiment 1-1 can be used.

It is noted that an inner liner is a single layer of a polymer sheet made of an elastomer composition mainly composed of an isobutylene-based modified copolymer, and having a thickness of 0.05 mm to 0.6 mm, or alternatively, an inner liner is composed of a composite layer of a first layer made of the polymer sheet and a second layer disposed on a side of an unvulcanized rubber sheet, made of a thermoplastic elastomer, and having a thickness of 0.01 mm to 0.3 mm. Further, the width of the inner liner is adjusted depending on the size of the tire.

Embodiment 5-2

Embodiment 5-2 is different from Embodiment 5-1 in that inner liner 2 has width W2 formed to be larger than width W1 of unvulcanized rubber sheet 3.

As the cutting step and the joining step, the same methods as those in Embodiment 1-2 can be used.

<Inner Liner>

The inner liner used in Embodiments 5-1, 5-2 is composed of a composite layer of the first layer disposed on the inner side of the tire and the second layer disposed in contact with a rubber layer of the carcass ply. In addition, either the first layer or the second layer is composed of an elastomer composition containing an isobutylene-based modified copolymer.

<Isobutylene-Based Modified Copolymer>

In the present embodiment, the isobutylene-based modified copolymer is an isobutylene-based modified copolymer made of a polymer block (A) mainly composed of isobutylene and a polymer block (B) mainly composed of an aromatic vinyl-based compound, and is a random copolymer in which at least one of the blocks contains β-pinene.

Here, the isobutylene-based modified copolymer is typically a copolymer in which β-pinene is contained in a styrene block of a styrene-isobutylene-styrene block copolymer (SIBS), a styrene-isoprene-styrene block copolymer (SIS), or a styrene-isobutylene block copolymer (SIB).

The polymer block (A) mainly composed of isobutylene is a polymer block in which a unit whose soft segment is derived from isobutylene occupies more than or equal to 80% by mass. Such a polymer block can be manufactured using aliphatic olefins, dienes, vinyl ethers, silanes, vinylcarbazole, acenaphthylene, or the like as a monomer component.

On the other hand, the polymer block (B) mainly composed of an aromatic vinyl-based compound is a polymer block in which a unit whose hard segment is derived from the aromatic vinyl-based compound occupies more than or equal to 80% by mass.

Examples of the aromatic vinyl-based compound include styrene, methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, t-butylstyrene, methoxy styrene, chloromethylstyrene, bromomethylstyrene, and the like. In view of cost, styrene and α-methylstyrene are particularly preferable.

In the isobutylene-based modified copolymer of the present embodiment, at least one of the polymer blocks (A) and (B) is a random copolymer with β-pinene. In view of low-temperature characteristics, it is preferable that β-pinene has been copolymerized with the polymer block (B) mainly composed of an aromatic vinyl-based compound.

On the other hand, in view of adhesiveness, it is preferable that β-pinene has been copolymerized with the polymer block (A) mainly composed of isobutylene. In this case, the content of β-pinene is preferably 0.5 to 25% by mass, and more preferably 2 to 25% by mass, of the isobutylene-based modified copolymer. When the content of β-pinene is less than 0.5% by mass, adhesiveness is insufficient. When the content of β-pinene us more than 25% by mass, it will become fragile, and rubber elasticity is likely to be decreased.

In the present embodiment, there is no particular limitation on the structure of the isobutylene-based modified copolymer, and any of a block copolymer, a triblock copolymer, a multi-block copolymer, and the like having a linear, branched, or star molecular chain structure can be selected. In view of property balance and molding workability, a structure in which the polymer blocks (A) and (B) constitute a diblock copolymer ((A)-(B)) or a triblock copolymer ((B)-(A)-(B)) can be adopted. They can be used solely, or two or more types thereof can be used in combination, in order to obtain desired physical properties and molding workability.

Further, as for the molecular weight of the isobutylene-based modified copolymer, the weight-average molecular weight obtained by GPC measurement is preferably 30,000 to 300,000, and particularly preferably 30,000 to 150,000, in view of fluidity, molding workability, rubber elasticity, and the like. When the weight-average molecular weight is less than 30,000, mechanical physical properties are less likely to be fully exhibited. On the other hand, when the weight-average molecular weight is more than 300,000, fluidity and workability are likely to deteriorate. Furthermore, in view of processing stability, the value of molecular weight distribution of the isobutylene-based modified copolymer (weight-average molecular weight/number-average molecular weight) is preferably less than or equal to 1.3.

<Method for Manufacturing Isobutylene-Based Modified Copolymer>

A method for manufacturing an isobutylene-based modified copolymer is disclosed, for example, in Japanese Patent Laying-Open No. 2010-195969. For example, the isobutylene-based modified copolymer can be manufactured by polymerizing the above-described monomer components under the presence of a polymerization initiator expressed by a general formula (1) indicated below.

$$(CR^1R^2X)_nR^3 \quad (1)$$

(where X is a substituent selected from a halogen atom, an alkoxy group having 1 to 6 carbon atoms, and an acyloxy group, each of $R^1$ and $R^2$ is a hydrogen atom or a monovalent hydrocarbon group having 1 to 6 carbon atoms, $R^1$ and $R^2$ may be the same or may be different, $R^3$ is a monovalent or multivalent aromatic hydrocarbon group, or a monovalent or multivalent aliphatic hydrocarbon group, and n indicates a natural number of 1 to 6).

The compound expressed by the above general formula (1) will be an initiator, and generates carbocations under the presence of Lewis acid or the like to be a starting point of cationic polymerization. Examples of the compound expressed by the above general formula (1) include bis(1-chloro-1-methylethyl) benzene $[C_6H_4(C(CH_3)_2Cl)_2]$ and tris(1-chloro-1-methylethyl) benzene $[(ClC(CH_3)_2)_3C_6H_3]$.

When manufacturing an isobutylene-based modified copolymer, a Lewis acid catalyst can further be present together. Lewis acid can be used for cationic polymerization, and a metal halide such as $TiCl_4$, $TiBr_4$, $BCl_3$, $BF_3$, $BF_3 \cdot OEt_2$, $ZnBr_2$, or $AlCl_3$, or an organic metal halide such as $Et_2AlCl$ or $EtAlCl_2$ can be used, for example. The above Lewis acid can be used by 0.1 to 100 molar equivalent relative to the compound expressed by the general formula (1).

Further, when manufacturing the isobutylene-based modified copolymer, an electron donor component can also be present together. Examples of this electron donor component include pyridines, amines, amides, and sulfoxides.

Polymerization of the isobutylene-based modified copolymer can be performed in an organic solvent. Here, an organic solvent that does not inhibit cationic polymerization can be used. For example, a halogenated hydrocarbon such as methyl chloride, dichloromethane, chloroform, ethyl chloride, and dichloroethane, alkylbenzenes such as benzene, toluene, xylene, and ethylbenzene, linear aliphatic hydrocarbons such as ethane, propane, butane, pentane, hexane, and heptane, branched aliphatic hydrocarbons such as 2-methylpropane and 2-methylbutane, or cyclic aliphatic hydrocarbons such as cyclohexane, methylcyclohexane, and ethylcyclohexane can be used.

In view of viscosity adjustment and heat dissipation of a copolymer solution to be generated, the amount of the above-mentioned organic solvent is adjusted such that the copolymer has a concentration of 5 to 40% by mass. It is noted that a copolymerization reaction in the range of −20° C. to −70° C. is preferable.

<Elastomer Composition of First Layer>

In the present embodiment, an elastomer component of the elastomer composition used for the first layer of the inner layer is composed of an isobutylene-based modified copolymer alone, or a mixture of an isobutylene-based modified copolymer and another elastomer component.

The isobutylene-based modified copolymer ranges from 10 to 100% by mass, preferably 30 to 100% by mass, of the entire elastomer component. When the isobutylene-based modified copolymer is less than 10% by mass, vulcanization adhesive strength with the second layer may be reduced.

As the elastomer component, a thermoplastic elastomer, in particular a styrene-based thermoplastic elastomer is suitably used. Here, the styrene-based thermoplastic elastomer refers to a copolymer containing a styrene block as a hard segment. Examples thereof include a styrene-isoprene-styrene block copolymer (SIS), a styrene-isobutylene block copolymer (SIB), a styrene-butadiene-styrene block copolymer (SBS), a styrene-isobutylene-styrene block copolymer (SIBS), a styrene-ethylene-butene-styrene block copolymer (SEBS), a styrene-ethylene-propylene-styrene block copolymer (SEPS), a styrene-ethylene-ethylene-propylene-styrene block copolymer (SEEPS), and a styrene-butadiene-butylene-styrene block copolymer (SBBS).

Further, the styrene-based thermoplastic elastomer may have an epoxy group in its molecular structure, and for example an epoxy-modified styrene-butadiene-styrene copolymer (epoxidized SBS) such as Epofriend A1020 manufactured by Daicel Chemical Industries, Ltd. (having a weight-average molecular weight of 100,000 and an epoxy equivalent of 500) can be used. It is noted that, among styrene-based thermoplastic elastomers, a styrene-isobutylene-styrene block copolymer is suitably used.

A rubber component can be mixed as the elastomer component of the first layer. By mixing the rubber component, tackiness with the adjacent carcass ply in an unvulcanized state is imparted, and vulcanization adhesiveness with the carcass ply or the insulation can be increased through vulcanization.

The rubber component preferably contains at least one selected from the group consisting of natural rubber, isoprene rubber, chloroprene rubber, and butyl rubber. The blending quantity of the rubber component preferably ranges from 5 to 20% by mass of a thermoplastic polymer component.

The thickness of the first layer is 0.05 to 0.6 mm. When the thickness of the first layer is less than 0.05 mm, the first layer may be broken by a pressing pressure during vulcanization of a green tire in which a polymer laminate is used as the inner liner, and thus an air leak phenomenon may occur in the resultant tire. On the other hand, when the thickness of the first layer is more than 0.6 mm, tire weight increases and fuel efficiency performance deteriorates. The thickness of the first layer is more preferably 0.05 to 0.4 mm. The first layer can be obtained by forming the SIBS into a film by a conventional method of forming a thermoplastic resin or a thermoplastic elastomer into a film, such as extrusion molding or calender molding.

<Elastomer Composition of Second Layer>

In the present embodiment, an elastomer component of the elastomer composition used for the second layer of the inner layer is composed of a mixture of an isobutylene-based modified copolymer and another elastomer component.

The isobutylene-based modified copolymer ranges from 5 to 80% by mass, preferably 10 to 60% by mass, of the entire elastomer component. When the isobutylene-based modified copolymer is less than 5% by mass, vulcanization adhesive strength with the first layer may be reduced. When the isobutylene-based modified copolymer is more than 80% by mass, vulcanization adhesion with the carcass ply may be reduced.

As the elastomer component of the elastomer composition used for the second layer, a thermoplastic elastomer, in particular a styrene-based thermoplastic elastomer is suitably used. As the styrene-based thermoplastic elastomer, the same one as that in Embodiment 1-1 can be used.

The thickness of the second layer is preferably 0.01 mm to 0.3 mm. Here, when the second layer is made of, for example, a single layer such as an SIS or SIB layer, the thickness of the second layer refers to a thickness of the single layer. On the other hand, when the second layer is made of, for example, two or three layers including an SIS layer, an SIB layer, and the like, the thickness of the second layer refers to the total thickness of these layers. When the thickness of the second layer is less than 0.01 mm, the second layer may be broken by a pressing pressure during vulcanization of the green tire in which the polymer laminate is used as the inner liner, and thus vulcanization adhesive strength may be reduced. On the other hand, when the thickness of the second layer is more than 0.3 mm, tire weight may increase and fuel efficiency performance may deteriorate. The thickness of the second layer is more preferably 0.05 to 0.2 mm.

Further, the styrene-based thermoplastic elastomer may have an epoxy group in its molecular structure, and for example an epoxy-modified styrene-butadiene-styrene copolymer (epoxidized SBS) such as Epofriend A1020 manufactured by Daicel Chemical Industries, Ltd. (having a weight-average molecular weight of 100,000 and an epoxy equivalent of 500) can be used.

<SIBS Mixture>

At least one of the first layer and the second layer can be composed of a mixture of the SIS and the SIBS, or a mixture of the SIB and the SIBS. In this case, the mixing quantity of the SIBS is adjusted in a range of 10 to 80% by mass, preferably 30 to 70% by mass, of the elastomer component. When the SIBS is less than 10% by mass, adhesiveness with the first layer is likely to be reduced, and when the SIBS is more than 80% by mass, adhesiveness with the carcass ply is likely to be reduced.

<Tackifier>

In the present embodiment, at least one of the first layer and the second layer is blended with 0.1 to 100 parts by mass of a tackifier relative to 100 parts by mass of the elastomer component. Here, the tackifier refers to a compounding agent for increasing tackiness of the elastomer composition. For example, the same tackifier as that in Embodiment 4-1 can be used.

<Additives in Elastomer Composition>

The elastomer compositions of the first and second layers can be added with a crosslinking agent and a crosslinking assistant. As the crosslinking agent, sulfur, tetramethylthiuram disulfide, 4,4-dithiobismorpholine, organic peroxide, phenol-formaldehyde resin, or halomethylphenol can be used.

As the crosslinking assistant, a metal oxide such as sulfenamide, benzothiazyl, guanidine, dithiocarbamic acid, and zinc oxide; an aliphatic acid such as stearic acid; a nitrogen-containing compound, triallyl isocyanurate, ethylene glycol dimethacrylate, or trimethylolpropane methacrylate can be used. The blending quantity of the crosslinking agent and the crosslinking assistant is 0.3 to 6 parts by mass relative to 100 parts by mass of the elastomer component.

The elastomer compositions can be further added with a filler, an age inhibitor, a softener, a processing assistant, and the like. As the filler, carbon black, wet silica, dry silica, calcium carbonate, kaolin, talc, clay, or the like can be used. The age inhibitor includes an antioxidant, an ultraviolet absorber, and a light stabilizer. As the softener, a paraffinic oil, a napthenic oil, an aromatic oil, rapeseed oil, di-octylphthalate, or the like can be used. Further, as the processing assistant, a higher fatty acid, a fatty acid ester, a fatty acid metal salt, a fatty acid amide, paraffin wax, a fatty alcohol, a fluorine/silicone-based resin, or the like can be used.

<Structure of Tire>

The pneumatic tire manufactured based on Embodiments 5-1, 5-2 can have the same structure as that in Embodiment 1-1.

Next, the state of arrangement of the inner liner with respect to the carcass ply in a vulcanized tire will be shown in FIG. 9(a). In FIG. 9(a), composite layer PL is composed of first layer PL1 and second layer PL2. When composite layer PL is used as the inner liner of the pneumatic tire, if second layer PL2 is arranged toward the tire radial outer side so as to contact carcass ply C, adhesive strength between second layer PL2 and carcass C can be enhanced in the tire vulcanization step. The resultant pneumatic tire has excellent air permeation resistance, since the inner liner is satisfactorily bonded with the rubber layer of carcass ply C.

<Method for Manufacturing Pneumatic Tire>

As a method for manufacturing the pneumatic tire in accordance with the present invention, a conventional manufacturing method can be used. An inner liner is manufactured using composite layer PL. The inner liner is used for a green tire for pneumatic tire 11 and vulcanization-molded together with other members, and thereby the pneumatic tire is manufactured. When composite layer PL is arranged in the green tire, second layer PL2 of composite layer PL is arranged toward the tire radial outer side so as to contact carcass ply C. With such an arrangement, adhesive strength between second layer PL2 and carcass 6 can be enhanced in the tire vulcanization step. The resultant pneumatic tire has excellent air permeation resistance, since the inner liner is satisfactorily bonded with the rubber layer of carcass ply C.

Embodiment 6-1

As the assembly step, the cutting step, the joining step, and the tire molding/vulcanization step, the same methods as those in Embodiment 1-1 can be used.

It is noted that an inner liner is composed of a composite layer of a first layer made of an elastomer composition containing an SIBS modified copolymer and having a thickness of 0.05 mm to 0.6 mm, and a second layer disposed on a side of an unvulcanized rubber sheet, made of a thermoplastic elastomer, and having a thickness of 0.01 mm to 0.3 mm. Further, the width of the inner liner is adjusted depending on the size of the tire.

Embodiment 6-2

Embodiment 6-2 is different from Embodiment 6-1 in that inner liner 2 has width W2 formed to be larger than width W1 of unvulcanized rubber sheet 3.

As the cutting step and the joining step, the same methods as those in Embodiment 1-2 can be used.

<Inner Liner>

The inner liner used in Embodiments 6-1, 6-2 is composed of a composite layer of the first layer disposed on the inner side of the tire and the second layer disposed in contact with a rubber layer of the carcass ply.

The first layer is a thermoplastic elastomer composition containing an SIBS modified copolymer having a styrene block moiety of a styrene-isobutylene-styrene block copolymer (hereinafter also referred to as an "SIBS") modified with an acid chloride or an acid anhydride having an unsaturated bond.

Further, the second layer is an elastomer composition containing at least one of a styrene-isoprene-styrene block copolymer (hereinafter also referred to as an "SIS") and a styrene-isobutylene block copolymer (hereinafter also referred to as an "SIB").

<First Layer>

The first layer is a composition containing an SIBS modified copolymer by 10% by mass to 100% by mass of an elastomer component. The SIBS modified copolymer is obtained by modifying a styrene block moiety thereof with an acid chloride or an acid anhydride having an unsaturated bond, and contains a chemical structure expressed by formula (VI) below in a molecular chain.

[Formula 6]

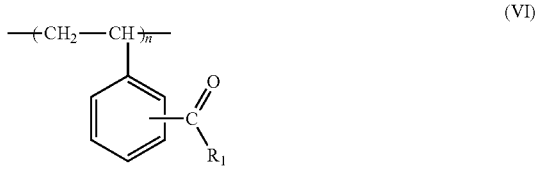

(VI)

In formula (VI), $R^1$ is a monovalent organic group having a functional group.

Examples of the acid chloride having an unsaturated bond used for modification in the present invention include methacrylic acid chloride, methacrylic acid bromide, methacrylic acid iodide, acrylic acid chloride, acrylic acid bromide, acrylic acid iodide, crotonic acid chloride, and crotonic acid bromide. In particular, methacrylic acid chloride and acrylic acid chloride are suitable.

Examples of the acid anhydride include acetic anhydride, maleic anhydride, phthalic anhydride, and the like. Acetic anhydride is particularly suitable. Two or more types of these compounds can also be used in combination. Through such modification, an unsaturated group is introduced into the SIBS, which enables crosslinking through the use of a crosslinking agent.

As described above, the blending quantity of the SIBS modified copolymer ranges from 10 to 100% by mass, preferably 30 to 100% by mass, of the elastomer component. When the blending quantity of the SIBS modified copolymer is less than 10% by mass of the elastomer component, vulcanization adhesion between the first layer and both of the second layer and a carcass ply rubber may be insufficient.

The SIBS modified copolymer contains an acid chloride and an acid anhydride having an unsaturated bond at a content of more than or equal to 1% by weight, preferably more than or equal to 5% by weight, and less than or equal to 30% by weight. In order to crosslink the SIBS modified copolymer, a conventional method can be used. For example, thermal crosslinking by heating and crosslinking with a crosslinking agent can be performed. As the crosslinking agent, an organic peroxide, such as, for example, dicumylperoxide, di-tert-butyl peroxide, or 2,5-dimethyl-2, 5-di-(tert-butylperoxy) hexane can be used. The blending quantity of the organic peroxide preferably ranges from 0.1 to 3.0 parts by mass relative to 100 parts by mass of an thermoplastic elastomer component.

In the present embodiment, for the elastomer composition of the first layer, a polyfunctional vinyl monomer (e.g., divinylbenzene, triaryl cyanurate), or a polyfunctional methacrylate monomer (e.g., ethylene glycol dimethacrylate, diethylene glycol dimethacrylate, triethylene glycol dimethacrylate, polyethylene glycol dimethacrylate, trimethylolpropane trimetacrylate, allyl methacrylate) can be used in combination as a crosslinking agent. In this case, the composition after crosslinking can be expected to have improved flex crack characteristics.

Since the SIBS modified copolymer is derived from an isobutylene block, a film made of the SIBS modified copolymer has excellent air permeation resistance. Further, since the unsaturated group is introduced into the SIBS in the SIBS modified copolymer, thermal crosslinking and crosslinking with a crosslinking agent can be performed. Thus, flex crack characteristics and air permeation resistance are improved together with basic characteristics such as tensile strength, elongation at break, and permanent strain, and accordingly, characteristics as the inner liner are improved.

When a pneumatic tire is manufactured by using a polymer film made of the elastomer composition containing the SIBS modified copolymer for the inner liner, air permeation resistance can be ensured. Therefore, it is not necessary to use a halogenated rubber having a high specific gravity such as halogenated butyl rubber, which has been conventionally used to impart air permeation resistance, and even if the halogenated rubber is used, the amount of use can be reduced. This enables weight saving of the tire and improves fuel efficiency.

Although there is no particular limitation on the molecular weight of the SIBS modified copolymer, the weight-average molecular weight obtained by GPC measurement is preferably 50,000 to 400,000 in view of fluidity, workability, rubber elasticity, and the like. When the weight-average molecular weight is less than 50,000, tensile strength and tensile elongation may decrease. When the weight-average molecular weight is more than 400,000, extrusion moldability may deteriorate. Therefore, both the cases are not preferred. In the SIBS modified copolymer, in view of further improving air permeation resistance and durability, the content of a styrene component in the SIBS is 10 to 30% by mass, preferably 14 to 23% by mass.

In the SIBS as a copolymer, the polymerization degree of each block is preferably about 10,000 to 150,000 for isobutylene and about 5,000 to 30,000 for styrene, in view of rubber elasticity and handling (when the polymerization degree is less than 10,000, the SIBS becomes a liquid).

<Manufacturing of SIBS Modified Copolymer>

The SIBS can be obtained by a conventional living cationic polymerization method for a vinyl-based compound. For example, Japanese Patent Laying-Open No. 62-048704 and Japanese Patent Laying-Open No. 64-062308 disclose that living cationic polymerization of isobutylene with other vinyl compounds can be performed, and a polyisobutylene-based block copolymer can be manufactured by using isobutylene and other compounds as the vinyl compounds.

For manufacturing the SIBS modified copolymer, the following method can be adopted for example. The styrene-isobutylene-styrene block copolymer is charged into a separable flask, and then the inside of a polymerization vessel is substituted by nitrogen. Then, an organic solvent (e.g., n-hexane and butyl chloride) having been dried with molecular sieves is added, and methacrylic acid chloride is further added. At last, aluminum trichloride is added while stirring the solution to produce a reaction. A predetermined amount of water is added to the reaction solution after a certain period of time since the start of reaction, and the solution is stirred. The reaction is then terminated. The reaction solution is washed several times or more with a large amount of water, and further, slowly dropped into a large amount of a methanol-acetone mixed solvent to precipitate a polymer. The resulting polymer is vacuum dried to obtain the SIBS modified copolymer. It is noted that a method for manufacturing an SIBS modified copolymer is disclosed for example in Japanese Patent No. 4551005.

<Elastomer Composition Containing SIBS Modified Copolymer>

The first layer is an elastomer composition containing the SIBS modified copolymer. That is, the first layer preferably contains the SIBS modified copolymer by more than or equal to 10% by mass, more preferably more than or equal to 35% by mass, in the elastomer component. As the elastomer component, a styrene-based thermoplastic elastomer, an urethane-based thermoplastic elastomer, or the like can be suitably used.

The thickness of the first layer is 0.05 to 0.6 mm. When the thickness of the first layer is less than 0.05 mm, the first layer may be broken by a pressing pressure during vulcanization of a green tire in which a polymer laminate composed of the first and second layers is used as the inner liner, and thus an air leak phenomenon may occur in the resultant tire. On the other hand, when the thickness of the first layer is more than 0.6 mm, tire weight increases and fuel efficiency performance deteriorates. The thickness of the first layer is more preferably 0.05 to 0.4 mm. The first layer can be obtained by adopting a conventional method of forming a thermoplastic resin or a thermoplastic elastomer into a film, such as extrusion molding or calender molding.

<Second Layer>

The second layer is a composition containing either one thermoplastic elastomer of a styrene-isoprene-styrene block copolymer (SIS) and a styrene-isobutylene block copolymer (SIB). Further, the second layer can contain an SIBS modified copolymer, a styrene-based thermoplastic elastomer, or a rubber component. The SIBS modified copolymer preferably ranges from 5 to 80% by mass, more preferably 10 to 80% by mass, of the entire thermoplastic elastomer component. When the SIBS modified copolymer is less than 5% by mass, vulcanization adhesive strength with the first layer may be reduced, and when the SIBS modified copolymer is more than 80% by mass, adhesive strength with the carcass ply may be reduced.

Here, the styrene-based thermoplastic elastomer refers to a copolymer containing a styrene block as a hard segment. For example, the same one as that in Embodiment 1-1 can be used.

<Mixture with SIBS>

In the present invention, the second layer can be composed of a mixture of the SIS and the SIBS, or a mixture of the SIB and the SIBS. In this case, the blending quantity of the SIBS is adjusted in a range of 10 to 80% by mass of the elastomer component. When the SIBS is less than 10% by mass, adhesiveness with the first layer is likely to be reduced, and when the SIBS is more than 80% by mass, adhesiveness with the carcass ply is likely to be reduced.

<Tackifier>

In the present embodiment, at least one of the first layer and the second layer can be blended with a tackifier in a range of 0.1 to 100 parts by mass relative to 100 parts by mass of the elastomer component. Here, the tackifier refers to a compounding agent for increasing tackiness of the elastomer composition, and for example, the same one as that in Embodiment 4-1 can be used.

The tackifier is blended in a range of 0.1 to 100 parts by mass, preferably 1 to 50 parts by mass, relative to 100 parts by mass of the elastomer component of the first layer. When the tackifier is less than 0.1 parts by mass, vulcanization adhesive strength with the second layer is insufficient. On the other hand, when the tackifier is more than 100 parts by mass, tackiness becomes too high, with the result that workability and productivity are decreased and gas barrier property is also deteriorated.

The second layer is disposed between the first layer on the inner side of the tire and the carcass ply, and is required to have adhesiveness with both of them. To attain this, the tackifier is blended in a range of 0.1 to 100 parts by mass, preferably 1 to 50 parts by mass, relative to 100 parts by mass of the elastomer component of the second layer. When the tackifier is less than 0.1 parts by mass, vulcanization adhesive strength with the first layer is insufficient. On the other hand, when the tackifier is more than 100 parts by mass, tackiness becomes too high, with the result that workability and productivity are decreased and gas barrier property is also deteriorated.

<Rubber Component>

The elastomer composition of the first layer or the second layer can be blended with a rubber component. By blending the rubber component, tackiness with the adjacent carcass ply in an unvulcanized state is imparted, and vulcanization adhesiveness with the carcass ply or the insulation can be increased through vulcanization.

The rubber component preferably contains at least one selected from the group consisting of natural rubber, isoprene rubber, chloroprene rubber, and butyl rubber. The blending quantity of the rubber component preferably ranges from 5 to 75% by mass in a polymer component.

<Ultraviolet Absorber and Antioxidant>

In the present embodiment, the elastomer composition preferably contains an ultraviolet absorber. The ultraviolet absorber absorbs light in an ultraviolet range having a wavelength of more than or equal to 290 nm to prevent deterioration of the molecular chain of a polymer compound. For example, benzophenone-based, salicylate-based, and benzotriazol-based ultraviolet absorbers absorb ultraviolet light having a wavelength of around 320 nm to 350 nm where the polymer compound is most likely to suffer from deterioration. The absorbers have a function of converting light in this wavelength range into vibrational energy or thermal energy, thereby preventing absorption into the polymer compound. In particular, the benzotriazol-based ultraviolet absorber can absorb a wide range of ultraviolet light. Here, examples of the ultraviolet absorber are listed below.

[Benzotriazol-Based Ultraviolet Absorber]

Examples of the benzotriazol-based ultraviolet absorber can include: TINUVIN P/FL (manufactured by BASF, and having a molecular weight of 225, a melting point of 128 to 132° C., and a maximum absorption wavelength of 341 nm) (2-(2-hydroxy-benzotriazol-2-yl)-p-cresol); TINUVIN 234 (manufactured by BASF, and having a molecular weight of 447.6, a melting point of 137 to 141° C., and a maximum absorption wavelength of 343 nm) (2-[2-hydroxy-3,5-bis(α, α' dimethylbenzyl) phenyl]-2H-benzotriazol); TINUVIN 326/FL (manufactured by BASF, and having a molecular weight of 315.8, a melting point of 138 to 141° C., and a maximum absorption wavelength of 353 nm); ADK STAB LA-36 (manufactured by ADEKA Corporation) (2-(2'-hydroxy-3'-tert-butyl-5'-methylphenyl)-5-chlorobenzotriazol); TINUVIN 237 (manufactured by BASF, and having a molecular weight of 338.4, a melting point of 139 to 144° C., and a maximum absorption wavelength of 359 nm) (2,4-di-t-butyl-6-(5-chlorobenzotriazol-2-yl-)phenol); TINUVIN 328 (manufactured by BASF, and having a molecular weight of 351.5, a melting point of 80 to 88° C., and a maximum absorption wavelength of 347 nm) (2-(3,5-di-t-amyl-2-hydroxyphenyl) benzotriazol); and TINUVIN 329/FL (manufactured by BASF, and having a molecular weight of 323, a melting point of 103 to 105° C., and a maximum absorption wavelength of 343 nm) (2-(2-hydroxy-benzotriazol-2-yl)-4-tert-octylphenol).

[Liquid Ultraviolet Absorber]

Examples of a liquid ultraviolet absorber can include: TINUVIN 213 (manufactured by BASF, and having a melting point of −40° C. and a maximum absorption wavelength of 344 nm) (5-(2-hydroxy-benzotriazol-2-yl)-4-hydroxy-3-tert-butylbenzenpropanoic acid methyl); TINUVIN 571 (manufactured by BASF, and having a molecular weight of 393.6, a melting point of −56° C., and a maximum absorption wavelength of 343 nm) (2-(2-hydroxybenzotriazol-2-yl)-4-methyl-6-dodecylphenol); TINUVIN 1577FF (manufactured by BASF, and having a molecular weight of 425, a melting point of 148° C., and a maximum absorption wavelength of 274 nm) (2-[4,6-diphenyl-1,3,5-triazine-2-yl]-5-(hexyloxy)phenol).

[Benzophenone-Based Ultraviolet Absorber]

Examples of the benzophenone-based ultraviolet absorber can include CHIMASSORB 81/FL (manufactured by BASF, and having a molecular weight of 326.4 and a melting point of 48 to 49° C.) (2-hydroxy-4-(octyloxy)benzophenone).

[Benzoate-Based Ultraviolet Absorber]

Examples of a benzoate-based ultraviolet absorber can include TINUVIN 120 (manufactured by BASF, and having a molecular weight of 438.7, a melting point of 192 to 197° C., and a maximum absorption wavelength of 265 nm) (2,4-di-tert-butylphenyl-3,5-di-tert-butyl-4-hydroxybenzoate).

[Hindered Amine Stabilizer]

Examples of a hindered amine stabilizer can include: CHIMASSORB 2020 FDL (manufactured by BASF, and having a molecular weight of 2600 to 3400 and a melting point of 130 to 136° C.) (polycondensate of dibutylamine 1,3,5-triazine N,N-bis(2,2,6,6-tetramethyl-4-piperidyl-1,6-hexamethylenediamine N-(2,2,6,6-tetramethyl-4-piperidyl) butylamine); CHIMASSORB 944 FDL (manufactured by BASF, and having a molecular weight of 2000 to 3100 and a melting point of 100 to 135° C.) (poly [{6-(1,1,3,3-tetramethylbutyl)amino-1,3,5-triazine-2,4-diyl} {(2,2,6,6-tetramethyl-4-piperidyl)imino} hexamethylene {2,2,6,6-tetramethyl-4-piperidyl)imino}]); TINUVIN 622 LD (manufactured by BASF, and having a molecular weight of 3100 to 4000 and a melting point of 55 to 70° C.) (butanedioic acid 1-[2-(4-hydroxy-2,2,6,6-tetramethyl-piperidino) ethyl]); TINUVIN 144 (manufactured by BASF, and having a molecular weight of 685 and a melting point of 146 to 150° C.) (2-butyl-2-[3,5-di(tert-butyl)-4-hydroxybenzyl] malonic acid bis(1,2,2,6,6-pentamethyl-4-piperidyl); TINUVIN 292 (manufactured by BASF, and having a molecular weight of 509) (sebacic acid bis(1,2,2,6,6-pentamethyl-4-piperidinyl); and TINUVIN 770 DF (manufactured by BASF, and having a molecular weight of 481 and a melting point of 81 to 85° C.) (sebacic acid bis(2,2,6,6-tetramethylpiperidine-4-yl).

In the present invention, ultraviolet transmission is restrained by blending titanium oxide into the thermoplastic elastomer composition. Deterioration due to ultraviolet radiation can therefore be prevented. When blending titanium oxide into the thermoplastic elastomer, care should be taken to achieve uniform dispersion in mixing because poor dispersion may result in degraded durability.

Further, the elastomer composition preferably contains an antioxidant. The antioxidant can function as a radical supplementary agent to mainly supplement a carbon radical, thereby preventing deterioration of the molecular chain of the polymer. In particular, it is preferable to use the ultraviolet absorber and the antioxidant in combination. Examples of the antioxidant used in the present invention are listed below.

[Hindered Phenolic Antioxidant]

IRGANOX 1010 (manufactured by BASF); ADK STAB AO-60 (manufactured by ADEKA Corporation); SUMILIZER BP-101 (manufactured by Sumitomo Chemical Co., Ltd.) (pentaerythrityl tetrakis[3-(3,5-di-t-butyl-4-hydroxyphenyl) propionate]); IRGANOX 1035 (manufactured by BASF) (2,2-thio-diethylenebis [(3-(3,5-di-t-butyl-4-hydroxyphenyl) propionate)]); IRGANOX 1076 (manufactured by BASF) (octadecyl-3-(3,5-di-t-butyl-4-hydroxyphenyl) propionate); IRGANOX 1098 (manufactured by BASF) (N,N'-hexamethylenebis(3,5-di-t-butyl-4-hydroxy-hydrocinnamamide); IRGANOX 1135 (manufactured by BASF) (isooctyl-3-(3,5-di-t-butyl-4-hydroxyphenyl) propionate]); IRGANOX 1330 (manufactured by BASF) (1,3,5-trimethyl-2,4,6-tris(3,5-di-t-butyl-4-hydroxybenzyl) benzene); IRGANOX 1726 (manufactured by BASF) (4,6-bis(dodecylthiomethyl)-O-cresol); IRGANOX 1425 (manufactured by BASF) (bis(3,5-di-t-butyl-4-hydroxybenzylphosphonic acid ethyl) calcium (50%), polyethylene wax (50%)); IRGANOX 1520 (manufactured by BASF) (2,4-bis [(octylthio)methyl]-O-cresol); IRGANOX 245 (manufactured by BASF) (triethyleneglycol-bis[(3-(3-t-butyl-5-methyl-4-hydroxyphenyl) propionate)]); IRGANOX 259 (manufactured by BASF) (1,6-hexanediol-bis[(3-(3,5-di-t-butyl-4-hydroxyphenyl) propionate]); IRGANOX 3114 (manufactured by BASF) (tris-(3,5-di-t-butyl-4-hydroxybenzyl)-isocyanurate); IRGANOX 5057 (manufactured by BASF) (octylated diphenylamine); IRGANOX 565 (manufactured by BASF) (2,4-bis-(n-octylthio)-6-(4-hydroxy-3,5-di-t-butylanilino)-1,3,5-triazine); Cyanox CY1790 (manufactured by Sun Chemical Company Ltd.) (1,3,5-tris(4-t-butyl-3-hydroxy-2,6-dimethylbenzyl) isocyanuric acid); ADK STAB AO-40 (manufactured by ADEKA Corporation); SUMILIZER BBM (manufactured by Sumitomo Chemical Co., Ltd.)

(4,4'-butylidenebis(3-methyl-6-t-butylphenol); ADK STAB AO-50 (manufactured by ADEKA Corporation); SUMILIZER BP-76 (manufactured by Sumitomo Chemical Co., Ltd.) (stearyl-β-(3,5-di-t-butyl-4-hydroxyphenyl) propionate); ADK STAB AO-80 (manufactured by ADEKA Corporation); SUMILIZER GA-80 (manufactured by Sumitomo Chemical Co., Ltd.) (3,9-bis[1,1-dimethyl-2-[β-(3-t-butyl-4-hydroxy-5-methylphenyl)propionyloxy]ethyl]2,4,8,10-tetraoxaspiro[5,5]-undecane).

[Phosphorus-Based Antioxidant]

A phosphorus-based antioxidant is used as a peroxide decomposition agent, and has an excellent function of preventing oxidation during thermal process molding. Examples thereof are listed below.

IRGAFOS 12 (manufactured by BASF, and having a molecular weight of 1462.9) (6,6',6"-[nitrilotris (ethyleneoxy)]tris(2,4,8,10-tetra-tert-butylbenzo [d, f] [1, 3, 2] dioxaphosphepin)); IRGAFOS 38 (manufactured by BASF, and having a molecular weight of 514) (phosphorous acid ethylbis (2,4-di-tert-butyl-6-methylphenyl)); IRGAFOS 168 (manufactured by BASF, and having a molecular weight of 646); ADK STAB 2112 (manufactured by ADEKA Corporation); SUMILIZER P-16 (manufactured by Sumitomo Chemical Co., Ltd.) (tris(2,4-di-t-butylphenyl)phosphite); ADK STAB PEP-8 (manufactured by ADEKA Corporation) (distearyl pentaerythritol diphosphite); ADK STAB PEP-36 (manufactured by ADEKA Corporation) (cyclic neopentanetetraylbis(2,6-di-t-butyl-4-methylphenyl)phosphite).

[Hydroxylamine-Based]

IRGASTAB FS 042 (manufactured by BASF) (N,N-dioctadecylhydroxylamine).

[Hindered Phenol/Phosphorus Mixture-Based Antioxidant]

IRGANOX B 225 (manufactured by BASF) (IRGAFOS 168:IRGANOX 1010=1:1); IRGANOX 215 (manufactured by BASF) (IRGAFOS 168:IRGANOX 1010=2:1); IRGANOX 220 (manufactured by BASF) (IRGAFOS 168: IRGANOX 1010=3:1); IRGANOX 921 (manufactured by BASF) (IRGAFOS 168:IRGANOX 1076=2:1).

[Oxygen Absorbent]

In the present embodiment, the antioxidant includes an oxygen absorbent. As the oxygen absorbent, a typical oxygen absorbent having a capacity to capture oxygen in the air can be used. Examples thereof can include an iron powder oxygen absorbent that absorbs oxygen in the air by way of oxidizing reaction of iron powder. Commonly used is a combination of 100 parts by weight of iron powder having a surface area of more than or equal to 0.5 m$^2$/g and 0.1 to 50 parts by weight of a halogenated metal, for example, a halide such as a chloride, a bromide, or an iodide of an alkali metal or an alkaline earth metal, such as sodium chloride, sodium bromide, calcium chloride, or magnesium chloride. This may be a mixture thereof, or may be obtained by coating the surface of iron powder with the halogenated metal.

It is noted that porous particles, such as zeolite, impregnated with moisture can be further combined with the oxygen absorbent used in the present embodiment to further promote the aforementioned oxidation of iron by oxygen. In particular, a hindered phenolic antioxidant is preferable as a radical trap agent for a carbon radical.

In the present embodiment, at least one or two or more of the above-mentioned ultraviolet absorbers and antioxidants can be used in combination. In particular, it is preferable to use a benzotriazol-based ultraviolet absorber and a hindered phenolic antioxidant in combination.

[Blending Quantity of Ultraviolet Absorber/Antioxidant]

The elastomer composition containing a styrene-isobutylene-styrene block copolymer is likely to suffer from deterioration in a wavelength range of an ultraviolet wavelength of more than or equal to 290 nm. Thus, by blending an ultraviolet absorber with the elastomer composition, light having a wavelength of around 320 nm to 350 nm where deterioration is most likely to occur is absorbed and converted into harmless vibrational energy or thermal energy, thereby protecting the elastomer composition from ultraviolet light. Here, the ultraviolet absorber includes a light stabilizer.

On the other hand, in the elastomer composition, a radical is produced due to flex fatigue during driving of the tire. The radical induces a main chain and linked deterioration proceeds, which is likely to cause occurrence of cracks and destruction in the elastomer composition. Thus, by blending an antioxidant with the elastomer composition, the antioxidant has a function of supplementing the radical produced by flex fatigue to prevent deterioration.

In the present embodiment, the elastomer composition of the first layer contains at least one of an ultraviolet absorber and an antioxidant, and the total blending quantity thereof ranges from 0.5 to 40% by mass of the elastomer component. When the blending quantity is less than 0.5% by mass, the effect of preventing deterioration by ultraviolet light and preventing oxidation deterioration by oxygen cannot be achieved. On the other hand, when the blending quantity is more than 40% by mass, durability of the elastomer composition may deteriorate. The ultraviolet absorber and the antioxidant are preferably in a range of 2.0 to 20% by mass of the elastomer component.

<Composite Layer of First Layer and Second Layer>

In the present embodiment, the inner layer is composed of a composite layer of the first layer and the second layer. Here, the first layer and the second layer are thermoplastic elastomer compositions, and are in a softened state in a mold at a vulcanization temperature, for example 150° C. to 180° C. In the softened state, the thermoplastic elastomer is in an intermediate state between a solid and a liquid with improved molecular mobility. Further, since the thermoplastic elastomer in the softened state has an improved reactivity than in the solid state, it adheres to or is bonded with an adjacent member. Accordingly, in order to manufacture a tire, a cooling step is required to prevent a change in the shape of the thermoplastic elastomer and its adhesion or fusion to the adjacent member. In the cooling step, the inside of a bladder portion can be cooled rapidly to 50 to 120° C. for 10 to 300 seconds after vulcanization of the tire. As a cooling medium, at least one selected from air, steam, water, and oil is used. By adopting such a cooling step, a thin inner liner of 0.9 mm or less is easily formed.

Next, the state of arrangement of the inner liner with respect to the carcass ply in a vulcanized tire will be shown in FIG. 9. In FIG. 9(a), composite layer PL is composed of first layer PL1 and second layer PL2. When composite layer PL is used as the inner liner of the pneumatic tire, if second layer PL2 is arranged toward the tire radial outer side so as to contact carcass ply C, adhesive strength between second layer PL2 and carcass C can be enhanced in the tire vulcanization step. The resultant pneumatic tire has excellent air permeation resistance, since the inner liner is satisfactorily bonded with the rubber layer of carcass ply C.

<Method for Manufacturing Pneumatic Tire>

As a method for manufacturing the pneumatic tire in accordance with the present invention, a conventional manufacturing method can be used. An inner liner is manufactured using composite layer PL. The inner liner is used for a green tire for pneumatic tire 11 and vulcanization-molded together with other members, and thereby the pneumatic tire is manufactured. When composite layer PL is arranged in the green tire, second layer PL2 of composite layer PL is arranged toward the tire radial outer side so as to contact carcass ply C. With such an arrangement, adhesive strength between second layer PL2 and carcass 6 can be enhanced in the tire vulcanization step. The resultant pneumatic tire can have excellent air permeation resistance, since the inner liner is satisfactorily bonded with the rubber layer of carcass ply C.

Example 1

Polymer Laminate

The first layer and the second layer used for the inner liner in accordance with the present invention were manufactured to have formulations shown in Tables 1 and 2 and used to manufacture a polymer laminate. Polymer components and blended components used herein are listed below.

[SIBS]
"SIBSTAR 102 (having a Shore A hardness of 25, a styrene component content of 25% by mass, and a weight-average molecular weight of 100,000)" manufactured by Kaneka Corporation was used.

The SIBS, a polymer mixture component, and an organic derivative of a clay mineral or inorganic clay mineral were charged into a twin-screw extruder (screw diameter: ϕ50 mm; L/D: 30; cylinder temperature: 220° C.) in accordance with the formulations shown in Tables 1 and 2 to obtain pellets.

[SIS]
D1161JP (having a styrene component content of 15% by mass and a weight-average molecular weight of 150,000) manufactured by Kraton Performance Polymers Inc. was used.

[SIB]
In a 2 L reaction vessel equipped with a stirrer, 589 mL of methylcyclohexane (dried with molecular sieves), 613 ml of n-butyl chloride (dried with molecular sieves), and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for another 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating the polymer, and the resultant polymer was dried at 60° C. for 24 hours to obtain a styrene-isobutylene diblock copolymer (having a styrene component content of 15% by mass and a weight-average molecular weight of 70,000).

[Polyamide-Based Polymer]
"UBESTA XPA 9040 (having a Shore D hardness of 40)" manufactured by Ube Industries, Ltd.

[Ethylene-Vinyl Alcohol Copolymer]
"EVAL E105" manufactured by KURARAY CO., LTD.

[Chlorobutyl]
"Exxon Chlorobutyl 1068" manufactured by Exxon Mobil Corporation

[Natural Rubber (NR)]
TSR20

Carbon black: "SEAST V" (N660, $N_2SA$: 27 m$^2$/g) manufactured by Tokai Carbon Co., Ltd.

Organic derivative of a clay mineral: "BENTONE 34" manufactured by Pheox Co. was used. Its layered clay mineral is a hectorite clay mineral, its organic compound is dimethyldistearylammonium salt, and the cation exchange amount of the organic compound is 100 meg/100 g.

Inorganic clay mineral: "Kunipia F" manufactured by KUNIMINE INDUSTRIES CO., LTD.

TABLE 1

| | | | Example 1-1 | Example 1-2 | Example 1-3 | Example 1-4 | Example 1-5 | Example 1-6 |
|---|---|---|---|---|---|---|---|---|
| Laminate structure/ Formulation | First layer | SIBS [phr] | 90 | 90 | 90 | 90 | 90 | 90 |
| | | Polyamide-based polymer [phr] | 10 | 10 | 10 | 10 | 10 | 10 |
| | | Ethylene-vinyl alcohol copolymer [phr] | — | — | — | — | — | — |
| | | Chlorobutyl [phr] | — | — | — | — | — | — |
| | | NR [phr] | — | — | — | — | — | — |
| | | Organic derivative of a clay mineral [phr] | 0.1 | 0.1 | 0.1 | 30 | 30 | 30 |
| | | Inorganic clay mineral [phr] | — | — | — | — | — | — |
| | | Carbon [phr] | — | — | — | — | — | — |
| | | Thickness of SIBS layer [mm] | 0.25 | 0.25 | 0.25 | 0.25 | 0.25 | 0.25 |
| | Second layer | SIS [phr] | 100 | — | 100 | 100 | — | 100 |
| | | SIB [phr] | — | 100 | — | — | 100 | — |
| | | Thickness of SIS layer [mm] | 0.05 | — | 0.05 | 0.05 | — | 0.05 |
| | | Thickness of SIB layer [mm] | — | 0.05 | — | — | 0.05 | — |
| | | Inner liner dimension [mm] | 1300 | 1300 | 1300 | 1300 | 1300 | 1300 |
| | Carcass ply | Ply dimension [mm] | 1250 | 800 | 800 | 1250 | 800 | 800 |
| | | Displaced amount between inner liner and carcass ply in width direction [mm] | 50 | 500 | 250 | 50 | 500 | 250 |
| Evaluation | | Presence/absence of air-in portions | A | A | A | A | A | A |
| | | Flex crack growth index | 119 | 118 | 119 | 126 | 125 | 122 |
| | | Rolling resistance index | 117 | 117 | 118 | 116 | 115 | 117 |
| | | Static air pressure drop rate (%) | 2.3 | 2.4 | 2.2 | 1.8 | 1.8 | 1.7 |
| | | Overall judgment | A | A | A | A | A | A |
| | | Uniformity | 121 | 122 | 122 | 123 | 122 | 121 |

TABLE 1-continued

|  |  |  | Example 1-7 | Example 1-8 | Example 1-9 | Example 1-10 | Example 1-11 | Example 1-12 |
|---|---|---|---|---|---|---|---|---|
| Laminate structure/ Formulation | First layer | SIBS [phr] | 90 | 90 | 90 | 70 | 70 | 70 |
|  |  | Polyamide-based polymer [phr] | 10 | 10 | 10 | 10 | 10 | 10 |
|  |  | Ethylene-vinyl alcohol copolymer [phr] | — | — | — | 20 | 20 | 20 |
|  |  | Chlorobutyl [phr] | — | — | — | — | — | — |
|  |  | NR [phr] | — | — | — | — | — | — |
|  |  | Organic derivative of a clay mineral [phr] | 50 | 50 | 50 | 30 | 30 | 30 |
|  |  | Inorganic clay mineral [phr] | — | — | — | — | — | — |
|  |  | Carbon [phr] | — | — | — | — | — | — |
|  |  | Thickness of SIBS layer [mm] | 0.25 | 0.25 | 0.25 | 0.25 | 0.25 | 0.25 |
|  | Second layer | SIS [phr] | 100 | — | 100 | 100 | — | 100 |
|  |  | SIB [phr] | — | 100 | — | — | 100 | — |
|  |  | Thickness of SIS layer [mm] | 0.05 | — | 0.05 | 0.05 | — | 0.05 |
|  |  | Thickness of SIB layer [mm] | — | 0.05 | — | — | 0.05 | — |
|  |  | Inner liner dimension [mm] | 1300 | 1300 | 1300 | 1300 | 1300 | 1300 |
|  | Carcass ply | Ply dimension [mm] | 1250 | 800 | 800 | 1250 | 800 | 800 |
|  |  | Displaced amount between inner liner and carcass ply in width direction [mm] | 50 | 500 | 250 | 50 | 500 | 250 |
| Evaluation |  | Presence/absence of air-in portions | A | A | A | A | A | A |
|  |  | Flex crack growth index | 135 | 133 | 134 | 122 | 121 | 123 |
|  |  | Rolling resistance index | 116 | 115 | 115 | 114 | 115 | 115 |
|  |  | Static air pressure drop rate (%) | 1.7 | 1.6 | 1.5 | 1.9 | 1.8 | 1.8 |
|  |  | Overall judgment | A | A | A | A | A | A |
|  |  | Uniformity | 122 | 123 | 122 | 121 | 122 | 123 |

TABLE 2

|  |  |  | Comp. ex.* 1-1 | Comp. ex. 1-2 | Comp. ex. 1-3 | Comp. ex. 1-4 | Comp. ex. 1-5 | Comp. ex. 1-6 | Comp. ex. 1-7 | Comp. ex. 1-8 | Comp. ex. 1-9 | Comp. ex. 1-10 |
|---|---|---|---|---|---|---|---|---|---|---|---|---|
| Laminate structure/ Formulation | First layer | SIBS [phr] | — | 90 | 90 | 90 | 50 | 100 | — | — | 90 | 90 |
|  |  | Polyamide-based polymer [phr] | — | 10 | 10 | 10 | 50 | — | 100 | — | 10 | 10 |
|  |  | Ethylene-vinyl alcohol copolymer [phr] | — | — | — | — | — | — | — | 100 | — | — |
|  |  | Chlorobutyl [phr] | 80 | — | — | — | — | — | — | — | — | — |
|  |  | NR [phr] | 20 | — | — | — | — | — | — | — | — | — |
|  |  | Organic derivative of a clay mineral [phr] | — | — | — | — | 30 | 30 | 30 | 30 | — | — |
|  |  | Inorganic clay mineral [phr] | — | 0.1 | 0.1 | 0.1 | — | — | — | — | — | — |
|  |  | Carbon [phr] | 60 | — | — | — | — | — | — | — | — | — |
|  |  | Thickness of SIBS layer [mm] | 0.25 | 0.25 | 0.25 | 0.25 | 0.25 | 0.25 | 0.25 | 0.25 | 0.25 | 0.25 |
|  | Second layer | SIS [phr] | 100 | 100 | — | 100 | 100 | 100 | 100 | 100 | 100 | 100 |
|  |  | SIB [phr] | — | — | 100 | — | — | — | — | — | — | — |
|  |  | Thickness of SIS layer [mm] | 0.05 | 0.05 | — | 0.05 | 0.05 | 0.05 | 0.05 | 0.05 | 0.05 | 0.05 |
|  |  | Thickness of SIB layer [mm] | — | — | 0.05 | — | — | — | — | — | — | — |
|  |  | Inner liner dimension [mm] | 1300 | 1300 | 1300 | 1300 | 1300 | 1300 | 1300 | 1300 | 1300 | 1300 |
|  | Carcass ply | Ply dimension [mm] | 1250 | 1300 | 1260 | 700 | 1250 | 1250 | 1250 | 1250 | 1250 | 1250 |
|  |  | Displaced amount between inner liner and carcass ply in width direction [mm] | 50 | 0 | 49 | 600 | 50 | 50 | 50 | 50 | 50 | 50 |
| Evaluation |  | Presence/absence of air-in portions | C | C | C | C | C | C | C | C | C | C |
|  |  | Flex crack growth index | 100 | 102 | 100 | 99 | 98 | 99 | 99 | 99 | 89 | 88 |
|  |  | Rolling resistance index | 100 | 99 | 99 | 98 | 99 | 99 | 98 | 99 | 99 | 99 |
|  |  | Static air pressure drop rate (%) | 2.9 | 2.9 | 2.8 | 2.9 | 2.7 | 2.7 | 2.8 | 2.9 | 3.1 | 3.2 |
|  |  | Overall judgment | B | B | B | B | B | B | B | B | B | B |
|  |  | Uniformity | 100 | 97 | 97 | 98 | 96 | 99 | 98 | 97 | 99 | 98 |

*Comp. ex.: Comparative example

Various compounding agents were added to the polymer component to prepare a composition. The following compounding agents were used. For the first layer and the second layer, common compounding agents shown in Table 3 were used.

TABLE 3

| Compounding agents | phr. |
| --- | --- |
| Stearic acid | 3 |
| Zinc oxide | 5 |
| Age inhibitor | 1 |
| Vulcanization accelerator | 1 |
| Sulfur | 0.5 | stearic acid: "Stearic Acid Lunac S30" manufactured by Kao Corporation zinc oxide (ZnO): "Zinc White No. 1" manufactured by Mitsui Mining & Smelting Co., Ltd.

age inhibitor: "Noclac 6C" manufactured by Ouchi Shinko Chemical Industrial Co., Ltd.

vulcanization accelerator: "Nocceler DM" manufactured by Ouchi Shinko Chemical Industrial Co., Ltd.

sulfur: "Sulfur Powder" manufactured by Tsurumi Chemical Industry Co., Ltd.

<Unvulcanized Rubber Sheet>

In the present invention, a carcass ply was used as an unvulcanized rubber sheet, and its topping rubber had a formulation described below.

<Formulation A of Topping Rubber>

| natural rubber (*1) | 100 parts by mass |
| --- | --- |
| carbon black (*2) | 50 parts by mass |
| zinc white (*3) | 3 parts by mass |
| age inhibitor (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, N$_2$SA: 27 m$^2$/g) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step described above. Pneumatic tires of examples and comparative examples as indicated in detail in Tables 1 and 2 were manufactured. A green tire was subjected to press molding at 170° C. for 20 minutes for vulcanization, the vulcanized tire was cooled at 100° C. for 3 minutes without being taken out of a vulcanization mold, and thereafter taken out from the vulcanized tire to manufacture a pneumatic tire of 195/65R15 size having a basic structure shown in FIG. 8.

In Examples 1-1 to 1-3, the inner liner had a first layer which was a mixed system of the SIBS and a polyamide-based polymer blended with 0.1 parts by mass of the organic derivative of a clay mineral, and a second layer made of the SIS or the SIB, and a displaced distance between the inner liner and the carcass was 50 mm, 500 mm, and 250 mm, respectively.

In Examples 1-4 to 1-6, the inner liner had a first layer which was a mixed system of the SIBS and the polyamide-based polymer blended with 30 parts by mass of the organic derivative of a clay mineral, and a second layer made of the SIS or the SIB, and the displaced distance between the inner liner and the carcass was 50 mm, 500 mm, and 250 mm, respectively.

In Examples 1-7 to 1-9, the inner liner had a first layer which was a mixed system of the SIBS and the polyamide-based polymer blended with 50 parts by mass of the organic derivative of a clay mineral, and a second layer made of the SIS or the SIB, and the displaced distance between the inner liner and the carcass was 50 mm, 500 mm, and 250 mm, respectively.

In Examples 1-10 to 1-12, the inner liner has a first layer which was a mixed system of the SIBS, the polyamide-based polymer, and an ethylene-vinyl alcohol copolymer blended with 30 parts by mass of the organic derivative of a clay mineral, and a second layer made of the SIS or the SIB, and the displaced distance between the inner liner and the carcass was 50 mm, 500 mm, and 250 mm, respectively.

In Comparative Example 1-1, the inner liner had a first layer which was a mixed system of chlorobutyl and NR. Comparative Examples 1-2 to 1-4 are cases where the first layer of the inner liner was blended with an inorganic clay mineral, and the displaced distance was varied. Comparative Examples 1-6 to 1-8 are cases where formulations of the polymers in the first layer were outside the scope of present invention. Comparative Examples 1-9, 1-10 are cases where the first layer was not blended with the organic derivative of a clay mineral.

Examples 1-1 to 1-12 are all excellent in overall judgment on air-in performance, flex crack growth, rolling resistance properties, and static air pressure drop rate, as well as tire uniformity.

<Performance Test>

Performance evaluation was performed on the pneumatic tires manufactured as described above, in the following manner.

<Air-in Performance>

The inside of each vulcanized tire was examined by appearance, and evaluated as follows:

A: In appearance, per tire, the number of air-in portions with a diameter of 5 mm or less and the number of air-in portions with a diameter of more than 5 mm were both 0.

B: In appearance, per tire, the number of air-in portions with a diameter of 5 mm or less was one to three, and the number of air-in portions with a diameter of more than 5 mm was 0.

C: In appearance, per tire, the number of air-in portions with a diameter of 5 mm or less was four or more, and the number of air-in portions with a diameter of more than 5 mm was one or more.

<Flex Crack Growth Test>

A flex crack growth test was performed to make an evaluation based on whether the inner liner was broken or peeled off. Each prototype tire was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. The obtained value was expressed as an index by the following equation, for flex crack growth in each example and comparative example, using the value in Comparative Example 1-1 as a reference value. It shows that the greater the value, the smaller the flex crack growth.

flex crack growth index=(the number of cracked portions in Comparative Example 1-1)/(the number of cracked portions in each example and comparative example)×100

<Rolling Resistance Index>

Each prototype tire was mounted on a JIS standard rim 15×6JJ, and rolling resistance was measured while driving the tire at room temperature (30° C.) under the conditions of a load of 3.4 kN, an air pressure of 230 kPa, and a speed of 80 km/hour, using a rolling resistance tester manufactured by KOBE STEEL, LTD. Based on the following calculation equation, a rolling resistance change rate (%) in each example and comparative example was expressed as an index, using the value in Comparative Example 1-1 as a reference value 100. It shows that the greater the rolling resistance change rate, the smaller the rolling resistance.

rolling resistance index=(rolling resistance in Comparative Example 1-1)/(rolling resistance in each example and comparative example)×100

<Static Air Pressure Drop Rate>

Each prototype tire was mounted on a JIS standard rim 15×6JJ, and air was sealed therein at an initial air pressure of 300 kPa. Then, the tire was left at room temperature for 90 days and thereafter an air pressure drop rate was calculated. The smaller the value, the less likely the air pressure is to be reduced, which is preferable.

<Uniformity (RFV)>

In conformity with the "Method for Testing Uniformity of Automobile Tire" of JASOC607:2000, radial force variation (RFV) was measured. A relative value obtained by assuming the value in Comparative Example 1-1 as 100 was expressed as an index. The greater the index, the more excellent the uniformity. Measurement was performed under the conditions of a rim of 8.0×17, a tire rotation speed of 60 rpm, an air pressure of 200 kPa, and a longitudinal load of 4000 kN.

<Overall Judgment>

Judgment A is made when all of the following conditions are satisfied:
(a) Air-in performance is evaluated as A
(b) Flex crack growth is evaluated as 100 or more
(c) Rolling resistance change rate is 100 or more
(d) Static air pressure drop rate (%/month) is 2.6 or less Judgment B is made when one of the following conditions is satisfied. If a plurality of judgments were made, a judgment with lower evaluation was adopted.
(a) Air-in performance is evaluated as B or C
(b) Flex crack growth is evaluated as being less than 100
(c) Rolling resistance change rate is less than 100
(d) Static air pressure drop rate (%/month) is 2.7 or more Example 2

Manufacturing of Inner Liner

Various compounding agents were charged into a twin-screw extruder (screw diameter: ϕ50 mm; L/D: 30; cylinder temperature: 220° C.) in accordance with formulations shown in Tables 4 and 5 to obtain pellets. The pellets were extruded as a sheet using an extruder (screw diameter: ϕ80 mm; L/D: 50; die gap width: 40 mm; cylinder temperature: 220° C.), at a screw rotation number of 80 RPM and an extrusion speed of about 9 m/minute.

TABLE 4

| | | | Example 2-1 | Example 2-2 | Example 2-3 | Example 2-4 | Example 2-5 | Example 2-6 |
|---|---|---|---|---|---|---|---|---|
| Laminate structure/ Formulation | First layer | IIR/NR (*1) | — | — | — | — | — | — |
| | | Filler (*2) | — | — | — | — | — | — |
| | | SIBS (*3) | 99.5 | 99.5 | 99.5 | 99.5 | 99.5 | 99.5 |
| | | Polybutene (*4) | 0.5 | 0.5 | 0.5 | 0.5 | 0.5 | 0.5 |
| | | Naphthenic oil (*5) | — | — | — | — | — | — |
| | | Layer thickness [mm] | 0.2 | 0.2 | 0.2 | 0.2 | 0.2 | 0.2 |
| | Second-a layer | SIS [phr](*6) | 100 | 100 | 100 | 99.5 | 99.5 | 99.5 |
| | | SIB [phr](*7) | — | — | — | — | — | — |
| | | Polybutene (*4) | — | — | — | 0.5 | 0.5 | 0.5 |
| | | Naphthenic oil (*5) | — | — | — | — | — | — |
| | | Layer thickness [mm] | 0.05 | 0.05 | 0.05 | 0.05 | 0.05 | 0.05 |
| | Second-b layer | SIS [phr](*6) | — | — | — | — | — | — |
| | | SIB [phr](*7) | 100 | 100 | 100 | 99.5 | 99.5 | 99.5 |
| | | Polybutene (*4) | — | — | — | 0.5 | 0.5 | 0.5 |
| | | Naphthenic oil (*5) | — | — | — | — | — | — |
| | | Layer thickness [mm] | 0.05 | 0.05 | 0.05 | 0.05 | 0.05 | 0.05 |
| | | Inner liner dimension [mm] | 1300 | 1300 | 1300 | 1300 | 1300 | 1300 |
| | Carcass ply | Ply dimension [mm] | 1250 | 800 | 800 | 1250 | 800 | 800 |
| | | Displaced amount between inner liner and carcass ply in width direction [mm] | 50 | 500 | 250 | 50 | 500 | 250 |
| Evaluation | | Vulcanization adhesive strength index | 115 | 116 | 115 | 121 | 122 | 123 |
| | | Presence/absence of air-in portions | A | A | A | A | A | A |
| | | Flex crack growth index | 129 | 128 | 129 | 133 | 135 | 133 |
| | | Rolling resistance index | 117 | 117 | 118 | 116 | 115 | 117 |
| | | Static air pressure drop rate (%) | 1.9 | 1.8 | 1.9 | 1.9 | 1.8 | 1.9 |
| | | Uniformity | 108 | 110 | 110 | 111 | 114 | 115 |

| | | | Example 2-7 | Example 2-8 | Example 2-9 | Example 2-10 | Example 2-11 | Example 2-12 |
|---|---|---|---|---|---|---|---|---|
| Laminate structure/ Formulation | First layer | IIR/NR (*1) | — | — | — | — | — | — |
| | | Filler (*2) | — | — | — | — | — | — |
| | | SIBS (*3) | 60 | 60 | 60 | 100 | 100 | 100 |
| | | Polybutene (*4) | 40 | 40 | 40 | — | — | — |
| | | Naphthenic oil (*5) | — | — | — | — | — | — |
| | | Layer thickness [mm] | 0.2 | 0.2 | 0.2 | 0.2 | 0.2 | 0.2 |
| | Second-a layer | SIS [phr](*6) | 100 | 100 | 100 | 60 | 60 | 60 |

TABLE 4-continued

|  |  |  |  |  |  |  |  |  |
|---|---|---|---|---|---|---|---|---|
|  |  | SIB [phr](*7) | — | — | — | — | — | — |
|  |  | Polybutene (*4) | — | — | — | 40 | 40 | 40 |
|  |  | Naphthenic oil (*5) | — | — | — | — | — | — |
|  |  | Layer thickness [mm] | 0.05 | 0.05 | 0.05 | 0.05 | 0.05 | 0.05 |
|  | Second-b layer | SIS [phr](*6) | — | — | — | — | — | — |
|  |  | SIB [phr](*7) | 100 | 100 | 100 | 60 | 60 | 60 |
|  |  | Polybutene (*4) | — | — | — | 40 | 40 | 40 |
|  |  | Naphthenic oil (*5) | — | — | — | — | — | — |
|  |  | Layer thickness [mm] | 0.05 | 0.05 | 0.05 | 0.05 | 0.05 | 0.05 |
|  | Inner liner dimension [mm] |  | 1300 | 1300 | 1300 | 1300 | 1300 | 1300 |
|  | Carcass ply | Ply dimension [mm] | 1250 | 800 | 800 | 1250 | 800 | 800 |
|  | Displaced amount between inner liner and carcass ply in width direction [mm] |  | 50 | 500 | 250 | 50 | 500 | 250 |
| Evaluation | Vulcanization adhesive strength index |  | 122 | 121 | 122 | 111 | 112 | 112 |
|  | Presence/absence of air-in portions |  | CA | A | A | A | A | A |
|  | Flex crack growth index |  | 130 | 131 | 134 | 130 | 129 | 129 |
|  | Rolling resistance index |  | 116 | 115 | 115 | 114 | 115 | 115 |
|  | Static air pressure drop rate (%) |  | 2.4 | 2.4 | 2.3 | 2.4 | 2.4 | 2.4 |
|  | Uniformity |  | 118 | 115 | 115 | 114 | 115 | 115 |

TABLE 5

|  |  |  | Comp. ex.* 2-1 | Comp. ex. 2-2 | Comp. ex. 2-3 | Comp. ex. 2-4 | Comp. ex. 2-5 | Comp. ex. 2-6 |
|---|---|---|---|---|---|---|---|---|
| Laminate structure/ Formulation | First layer | IIR/NR (*1) | 95 | — | — | — | — | — |
|  |  | Filler (*2) | 60 | — | — | — | — | — |
|  |  | SIBS (*3) | — | 99.5 | 99.5 | 99.5 | 100 | 100 |
|  |  | Polybutene (*4) | — | 0.5 | 0.5 | 0.5 | — | — |
|  |  | Naphthenic oil (*5) | 5 | — | — | — | — | — |
|  |  | Layer thickness [mm] | 0.5 | 0.2 | 0.2 | 0.2 | 0.2 | 0.2 |
|  | Second-a layer | SIS [phr](*6) | — | 99.5 | 99.5 | 99.5 | 100 | — |
|  |  | SIB [phr](*7) | — | — | — | — | — | 100 |
|  |  | Polybutene (*4) | — | 0.5 | 0.5 | 0.5 | — | — |
|  |  | Naphthenic oil (*5) | — | — | — | — | — | — |
|  |  | Layer thickness [mm] | — | 0.05 | 0.05 | 0.05 | 0.05 | 0.05 |
|  | Second-b layer | SIS [phr] (*6) | — | — | — | — | — | — |
|  |  | SIB [phr](*7) | — | 99.5 | 99.5 | 99.5 | 100 | 100 |
|  |  | Polybutene (*4) | — | 0.5 | 0.5 | 0.5 | — | — |
|  |  | Naphthenic oil (*5) | — | — | — | — | — | — |
|  |  | Layer thickness [mm] | — | 0.05 | 0.05 | 0.05 | 0.05 | 0.05 |
|  | Inner liner dimension [mm] |  | 1300 | 1300 | 1300 | 1300 | 1300 | 1300 |
|  | Carcass ply | Ply dimension [mm] | 1250 | 1300 | 1260 | 700 | 1250 | 1250 |
|  | Displaced amount between inner liner and carcass ply in width direction [mm] |  | 50 | 0 | 49 | 600 | 50 | 50 |
| Evaluation | Vulcanization adhesive strength index |  | 100 | 109 | 108 | 107 | 50 | 55 |
|  | Presence/absence of air-in portions |  | B | C | C | C | C | C |
|  | Flex crack growth index |  | 100 | 101 | 99 | 95 | 100 | 102 |
|  | Rolling resistance index |  | 100 | 101 | 102 | 102 | 99 | 100 |
|  | Static air pressure drop rate (%) |  | 4.3 | 2.6 | 2.6 | 2.5 | 2.7 | 2.6 |
|  | Uniformity |  | 100 | 96 | 98 | 96 | 96 | 95 |

|  |  |  | Comp. ex. 2-7 | Comp. ex. 2-8 | Comp. ex. 2-9 | Comp. ex. 2-10 | Comp. ex. 2-11 |
|---|---|---|---|---|---|---|---|
| Laminate structure/ Formulation | First layer | IIR/NR (*1) | — | — | — | — | — |
|  |  | Filler (*2) | — | — | — | — | — |
|  |  | SIBS (*3) | 95 | 95 | 99.5 | 60 | 100 |
|  |  | Polybutene (*4) | — | — | 0.5 | 40 | — |
|  |  | Naphthenic oil (*5) | 5 | 5 | — | — | — |
|  |  | Layer thickness [mm] | 0.2 | 0.2 | 0.5 | 0.5 | 0.5 |
|  | Second-a layer | SIS [phr](*6) | 95 | — | — | — | — |
|  |  | SIB [phr](*7) | — | 95 | — | — | — |
|  |  | Polybutene (*4) | — | — | — | — | — |
|  |  | Naphthenic oil (*5) | 5 | 5 | — | — | — |
|  |  | Layer thickness [mm] | 0.05 | 0.05 | — | — | — |
|  | Second-b layer | SIS [phr] (*6) | — | — | — | — | — |
|  |  | SIB [phr](*7) | 95 | 95 | — | — | — |
|  |  | Polybutene (*4) | — | — | — | — | — |
|  |  | Naphthenic oil (*5) | 5 | 5 | — | — | — |
|  |  | Layer thickness [mm] | 0.05 | 0.05 | 0.05 | 0.05 | 0.05 |
|  | Inner liner dimension [mm] |  | 1300 | 1300 | 1300 | 1300 | 1300 |
|  | Carcass ply | Ply dimension [mm] | 1250 | 1250 | 1250 | 1250 | 1250 |
|  | Displaced amount between inner liner and carcass ply in width direction [mm] |  | 50 | 50 | 50 | 50 | 50 |
| Evaluation | Vulcanization adhesive strength index |  | 36 | 35 | 40 | 40 | 41 |
|  | Presence/absence of air-in portions |  | C | C | C | C | C |

TABLE 5-continued

| | | | | | |
|---|---|---|---|---|---|
| Flex crack growth index | 101 | 102 | 102 | 101 | 102 |
| Rolling resistance index | 100 | 101 | 98 | 97 | 96 |
| Static air pressure drop rate (%) | 2.6 | 2.7 | 3.2 | 3.2 | 3.2 |
| Uniformity | 97 | 98 | 95 | 94 | 96 |

*Comp. ex.: Comparative example (*1) IIR: "Exxon Chlorobutyl 1068" manufactured by Exxon Mobil Corporation (*2) carbon: "SEAST V" (N660, $N_2SA$: 27 $m^2/g$) manufactured by Tokai Carbon Co., Ltd.

(*3) SIBS: "SIBSTAR 102T (having a Shore A hardness of 25 and a styrene content of 25% by mass)" manufactured by Kaneka Corporation (*4) polybutene: "Nisseki Polybutene Grade HV300" (having a number-average molecular weight of 300) manufactured by Nippon Oil Corporation (*5) naphthenic oil: "Diana Process Oil NM280" manufactured by Idemitsu Kosan Co., Ltd.

(*6) SIS: "D1161JP" (a styrene-isoprene-styrene triblock copolymer having a weight-average molecular weight of 150,000 and a styrene unit content of 15% by mass) manufactured by Kraton Performance Polymers Inc.

(*7) SIB:

In a 2 L reaction vessel equipped with a stirrer, 589 mL of methylcyclohexane (dried with molecular sieves), 613 ml of n-butyl chloride (dried with molecular sieves), and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for another 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating the polymer, and the resultant polymer was dried at 60° C. for 24 hours to obtain a styrene-isobutylene diblock copolymer.

Styrene component content: 15% by mass

Weight-average molecular weight: 70,000

It is noted that the formulations shown in Tables 4 and 5 are expressed assuming the sum of the IIR/NR, the SIBS, polybutene, and naphthenic oil as 100 parts by mass. The blending quantity of the filler is expressed by a blending part in a case where the sum of the polymer components is assumed as 100 parts by mass.

<Unvulcanized Rubber Sheet>

In the present invention, a carcass ply was used as an unvulcanized rubber sheet, and its topping rubber had a formulation described below.

<Formulation A of Topping Rubber>

| | |
|---|---|
| natural rubber (*1) | 100 parts by mass |
| carbon black (*2) | 50 parts by mass |
| zinc white (*3) | 3 parts by mass |
| age inhibitor (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, $N_2SA$: 27 $m^2/g$) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step described above. Pneumatic tires of examples and comparative examples as indicated in detail in Tables 4 and 5 were manufactured. A green tire was subjected to press molding at 170° C. for 20 minutes for vulcanization, the vulcanized tire was cooled at 100° C. for 3 minutes without being taken out of a vulcanization mold, and thereafter taken out from the vulcanized tire to manufacture a pneumatic tire of 195/65R15 size having a basic structure shown in FIG. 8.

In the examples, a displaced distance (amount) L was changed to 50 mm, 500 mm, or 250 mm by setting the dimension of the inner liner to 1300 mm and changing the dimension of the carcass ply, with reference to FIG. 5.

<Performance Test>

Performance evaluation was performed on the pneumatic tires manufactured as described above, in the following manner.

(a) Vulcanization Adhesive Strength of First Layer

The first layer and the unvulcanized rubber sheet were bonded together, and were heated at 170° C. for 20 minutes to fabricate a sample for measuring vulcanization adhesive strength. A peel-off strength was measured by a tensile peel test as vulcanization adhesive strength. The obtained value was expressed as an index by the following equation, for vulcanization adhesive strength of the first layer in each example and each comparative example, using the value in Comparative Example 2-1 as a reference value (100). It shows that the greater the value, the greater the vulcanization adhesive strength, which is preferable.

(vulcanization adhesive strength index)=(vulcanization adhesive strength in each example and each comparative example)/(vulcanization adhesive strength in Comparative Example 2-1)×100

(b) Presence or Absence of Air-in Portions

The inside of each vulcanized tire was examined, and evaluated on the following criteria:

A: In appearance, per tire, the number of air-in portions with a diameter of 5 mm or less and the number of air-in portions with a diameter of more than 5 mm were both 0.

B: In appearance, per tire, the number of air-in portions with a diameter of 5 mm or less was one to three, and the number of air-in portions with a diameter of more than 5 mm was 0.

C: In appearance, per tire, the number of air-in portions with a diameter of 5 mm or less was four or more, or the number of air-in portions with a diameter of more than 5 mm was one or more.

(c) Flex Crack Growth Test

A flex crack growth test was performed to make an evaluation based on whether the inner liner was broken or peeled off. Each prototype tire was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. The obtained value was expressed as an index by the following equation, for flex crack growth in each example and comparative example, using the value in Comparative Example 2-1 as a reference value. It shows that the greater the value, the smaller the flex crack growth.

flex crack growth index=(the number of cracked portions in Comparative Example 2-1)/(the number of cracked portions in each example and each comparative example)×100

(d) Rolling Resistance Index

Each prototype tire was mounted on a JIS standard rim 15×6JJ, and rolling resistance was measured while driving the tire at room temperature (30° C.) under the conditions of a load of 3.4 kN, an air pressure of 230 kPa, and a speed of 80 km/hour, using a rolling resistance tester manufactured by KOBE STEEL, LTD. Based on the following calculation equation, a rolling resistance change rate (%) in each example was expressed as an index, using the value in Comparative Example 2-1 as a reference value (100). It shows that the greater the rolling resistance change rate, the smaller the rolling resistance.

rolling resistance index=(rolling resistance in Comparative Example 2-1)/(rolling resistance in each example and each comparative example)×100

(e) Static Air Pressure Drop Rate

Each prototype tire was mounted on a JIS standard rim 15×6JJ, and air was sealed therein at an initial air pressure of 300 kPa. Then, the tire was left at room temperature for 90 days and thereafter an air pressure drop rate was calculated. The smaller the value, the less likely the air pressure is to be reduced, which is preferable.

(f) Uniformity

In conformity with the "Method for Testing Uniformity of Automobile Tire" of JASOC607:2000, radial force variation (RFV) was measured using a tire uniformity tester. A relative value obtained by assuming the value in Comparative Example 2-1 as 100 was expressed as an index. The greater the index, the more excellent the uniformity.

Measurement was performed under the conditions of a rim of 8.0×17, a tire rotation speed of 60 rpm, an air pressure of 200 kPa, and a longitudinal load of 4000 kN.

<Evaluation Results>

Examples 2-1 to 2-3 are cases where the SIBS of the first layer was blended with 0.5% by mass of a C4 polymer (polybutene), and Examples 2-4 to 2-6 are cases where the SIBS of the first layer, a second-a layer, and a second-b layer were blended with 0.5% by mass of the C4 polymer (polybutene).

Examples 2-7 to 2-9 are cases where the SIBS of the first layer was blended with 40% by mass of the C4 polymer (polybutene), and Examples 2-10 to 2-12 are cases where the second-a layer and the second-b layer were blended with 40% by mass of the C4 polymer (polybutene).

Comparative Example 2-1 is a case where IIR was used for the first layer Comparative Examples 2-2 to 2-4 are cases where the first layer, the second-a layer, and the second-b layer were blended with the C4 polymer (polybutene). However, in these comparative examples, the displaced amount between the width of the inner liner and the width of the carcass ply was outside the scope of the present invention.

Comparative Examples 2-5 to 2-8 are cases where the first layer, the second-a layer, and the second-b layer were not blended with the C4 polymer (polybutene). Comparative Examples 2-9 to 2-11 are cases where only the first layer was used.

The examples of the present invention are all excellent in overall judgment on air-in performance, flex crack growth, rolling resistance properties, and static air pressure drop rate.

Example 3

Hereinafter, a method for manufacturing a pneumatic tire in accordance with the present invention will be described based on examples.

<Manufacturing of Inner Liner>

Various compounding agents were charged into a twin-screw extruder (screw diameter: ϕ50 mm; L/D: 30; cylinder temperature: 220° C.) in accordance with formulations shown in Tables 6 and 7 to obtain pellets. The pellets were extruded as a sheet using an extruder (screw diameter: ϕ80 mm; L/D: 50; die gap width: 40 mm; cylinder temperature: 220° C.), at a screw rotation number of 80 RPM and an extrusion speed of about 9 m/minute.

TABLE 6

| Polymer sheet (first layer) formulation | | Examples | | | | | | Comparative examples | | | | | | |
|---|---|---|---|---|---|---|---|---|---|---|---|---|---|---|
| | | 3-1 | 3-2 | 3-3 | 3-4 | 3-5 | 3-6 | 3-1 | 3-2 | 3-3 | 3-4 | 3-5 | 3-6 | 3-7 |
| Formulation (parts by mass) | IIR (*1) | 60 | — | 77.5 | — | 95 | — | 100 | — | — | 50 | — | 98 | — |
| | NR (*2) | — | 60 | — | 77.5 | — | 95 | — | — | — | — | 50 | 0 | 98 |
| | SIBS (*3) | 40 | 40 | 22.5 | 22.5 | 5 | 5 | — | 100 | 100 | 50 | 50 | 2 | 2 |
| | Carbon black (*4) | — | — | — | — | — | — | 50 | — | — | — | — | — | — |
| | Stearic acid (*5) | 3 | 3 | 3 | 3 | 3 | 3 | 3 | — | 3 | 3 | 3 | 3 | 3 |
| | Zinc oxide (*6) | 5 | 5 | 5 | 5 | 5 | 5 | 5 | — | 5 | 5 | 5 | 5 | 5 |
| | Age inhibitor (*7) | 1 | 1 | 1 | 1 | 1 | 1 | 1 | — | 1 | 1 | 1 | 1 | 1 |
| | Vulcanization accelerator (*8) | 1 | 1 | 1 | 1 | 1 | 1 | 1 | — | 1 | 1 | 1 | 1 | 1 |
| | Sulfur (*9) | 0.5 | 0.5 | 0.5 | 0.5 | 0.5 | 0.5 | 0.5 | — | 0.5 | 0.5 | 0.5 | 0.5 | 0.5 |
| Evaluation | Mooney viscosity (ML$_{1+4}$, 130° C.) | 28 | 29 | 31 | 31 | 44 | 45 | 50 | 8 | 11 | 25 | 25 | 45 | 46 |
| | Index of unvulcanization tack strength with carcass layer | 60 | 66 | 76 | 83 | 96 | 102 | 100 | 10 | 10 | 50 | 54 | 99 | 102 |

TABLE 6-continued

| Polymer sheet (first layer) formulation | Examples | | | | | | Comparative examples | | | | | | |
|---|---|---|---|---|---|---|---|---|---|---|---|---|---|
| | 3-1 | 3-2 | 3-3 | 3-4 | 3-5 | 3-6 | 3-1 | 3-2 | 3-3 | 3-4 | 3-5 | 3-6 | 3-7 |
| Index of vulcanization adhesive strength with carcass layer | 80 | 86 | 93 | 97 | 99 | 101 | 100 | 10 | 10 | 51 | 54 | 100 | 100 |
| Index of weight saving effect | 140 | 140 | 125 | 125 | 110 | 110 | 100 | 210 | 210 | 150 | 150 | 101 | 101 |
| Rolling resistance index | 106 | 106 | 105 | 105 | 103 | 102 | 100 | 110 | 110 | 105 | 105 | 100 | 101 |
| Static air pressure drop rate (%/month) | 2.2 | 2.2 | 2.2 | 2.2 | 2.5 | 2.5 | 4 | 2.4 | 2.3 | 2.7 | 3.1 | 3.8 | 4 |
| Overall judgment | A | A | A | A | A | A | C | C | C | C | C | B | B |
| Uniformity | 110 | 110 | 109 | 113 | 113 | 115 | 100 | 95 | 90 | 95 | 95 | 95 | 95 |

TABLE 7

| | Second layer formulation | Manufacturing examples | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Formulation (parts by mass) | SIS (*10) | 100 | 100 | — | — | — | — | 10 | — | — | 10 | — | — | 80 | 80 | 5 | 85 |
| | SIB (*11) | — | — | 100 | 100 | — | — | — | 10 | — | — | 10 | — | — | — | — | — |
| | Epoxidized SBS (*12) | — | — | — | — | 100 | 100 | — | — | 10 | — | — | 10 | — | — | — | — |
| | Natural rubber (*2) | — | — | — | — | — | — | 90 | 90 | 90 | — | — | — | 20 | — | 95 | — |
| | Butyl rubber (*1) | — | — | — | — | — | — | — | — | — | 90 | 90 | 90 | — | 20 | — | 15 |
| | Stearic acid (*5) | — | 3 | — | 3 | — | 3 | 3 | 3 | 3 | 3 | 3 | 3 | 3 | 3 | 3 | 3 |
| | Zinc oxide (*6) | — | 5 | — | 5 | — | 5 | 5 | 5 | 5 | 5 | 5 | 5 | 5 | 5 | 5 | 5 |
| | Age inhibitor (*7) | — | 1 | — | 1 | — | 1 | 1 | 1 | 1 | 1 | 1 | 1 | 1 | 1 | 1 | 1 |
| | Vulcanization accelerator (*8) | — | 1 | — | 1 | — | 1 | 1 | 1 | 1 | 1 | 1 | 1 | 1 | 1 | 1 | 1 |
| | Sulfur (*9) | — | 0.5 | — | 0.5 | — | 0.5 | 0.5 | 0.5 | 0.5 | 0.5 | 0.5 | 0.5 | 0.5 | 0.5 | 0.5 | 0.5 |
| Evaluation | Index of unvulcanization tack strength with carcass layer | A | A | A | A | A | A | A | A | A | A | A | A | A | A | A | A |
| | Index of vulcanization adhesive strength with carcass layer | B | A | B | A | B | A | A | A | A | A | A | A | A | A | B | B |

(*1) IIR: "Exxon Chlorobutyl 1066" manufactured by Exxon Mobil Corporation (*2) NR: natural rubber TSR20

(*3) SIBS: "SIBSTAR 102T" (a styrene-isobutylene-styrene triblock copolymer having a weight-average molecular weight of 100,000, a styrene unit content of 15% by mass, and a Shore A hardness of 25) manufactured by Kaneka Corporation (*4) carbon black: "SEAST V" (N660, nitrogen-adsorption specific surface area: 27 m²/g) manufactured by Tokai Carbon Co., Ltd.

(*5) stearic acid: "Stearic Acid Lunac S30" manufactured by Kao Corporation (*6) zinc oxide: "Zinc White No. 1" manufactured by Mitsui Mining & Smelting Co., Ltd.

(*7) age inhibitor: "Noclac 6C" (N-(1,3-dimethylbutyl)-N'-phenyl-p-phenylenediamine) manufactured by Ouchi Shinko Chemical Industrial Co., Ltd.

(*8) vulcanization accelerator: "Nocceler DM" (di-2-benzothiazolyldisulfide) manufactured by Ouchi Shinko Chemical Industrial Co., Ltd.

(*9) sulfur: "Sulfur Powder" manufactured by Tsurumi Chemical Industry Co., Ltd.

(*10) SIS: "D1161JP" (a styrene-isoprene-styrene triblock copolymer having a weight-average molecular weight of 150,000 and a styrene unit content of 15% by mass) manufactured by Kraton Performance Polymers Inc.

(*11) SIB: the SIB obtained by the (Manufacturing of SIB) described above (a styrene-isobutylene diblock copolymer having a weight-average molecular weight of 70,000 and a styrene unit content of 15% by mass)

(*12) epoxidized SBS: "Epofriend A1020" (an epoxy-modified styrene-butadiene-styrene copolymer having a weight-average molecular weight of 100,000 and an epoxy equivalent of 500) manufactured by Daicel Chemical Industries, Ltd.

It is noted that the formulations shown in Tables 6 and 7 are expressed assuming the sum of the IIR/NR, the SIBS, the SIS, the SIB, and the epoxidized SBS as 100 parts by mass. The blending quantity of the filler is expressed by a blending part in a case where the sum of the polymer components is assumed as 100 parts by mass.

<Unvulcanized Rubber Sheet>

In the present invention, a carcass ply was used as an unvulcanized rubber sheet, and its topping rubber had a formulation described below.

<Formulation A of Topping Rubber>

| natural rubber (*1) | 100 parts by mass |
| carbon black (*2) | 50 parts by mass |
| zinc white (*3) | 3 parts by mass |
| age inhibitor (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, N₂SA: 27 m²/g) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step described above.

Pneumatic tires of examples and comparative examples as indicated in detail in Table 6 were manufactured. A green tire was subjected to press molding at 170° C. for 20 minutes for vulcanization, the vulcanized tire was cooled at 100° C. for 3 minutes without being taken out of a vulcanization mold, and thereafter taken out from the vulcanized tire to manufacture a pneumatic tire of 195/65R15 size having a basic structure shown in FIG. 8. Tables 6 to 10 show formulations of the inner liner and methods of molding tires, together with evaluation results on the tires. In the examples, displaced distance (amount) L was changed to 50 mm, 500 mm, or 250 mm by setting the length of the inner liner to 1300 mm and changing the dimension of the carcass ply, with reference to FIG. 5.

Examples 3-1 to 3-6, Comparative Examples 3-1 to 3-7

Examples 3-1 to 3-6 and Comparative Examples 3-1 to 3-7 are cases where a sheet of a polymer composition made of a mixture of the SIBS and a rubber component (the first layer only) was used as an inner liner. In each of the examples and comparative examples, a tire was molded under the following conditions:
thickness of the inner liner: 0.25 mm
length of the inner liner: 1300 mm
length of the carcass ply: 800 mm
displaced amount between the inner liner and the carcass ply in the width direction (mm): 250 mm It is recognized that Examples 3-1 to 3-6 of the present invention are more excellent in overall judgment on unvulcanization tack strength index, vulcanization adhesive strength index, rolling resistance properties, and static air pressure drop rate, as well as uniformity, than Comparative Example 3-1.

Examples 3-7 to 3-30, Comparative Examples 3-8 to 3-17

Examples 3-7 to 3-30 and Comparative Examples 3-8 to 3-17 are cases where a composite body of a polymer sheet (the first layer) and the second layer was used as an inner liner. In the row of the "First Layer" in Tables 8 to 10, "Example 3-1" indicates that the inner liner used in Example 3-1 was used as the first layer, and "Comparative Example 3-1" indicates that the inner liner used in "Comparative Example 3-1" was used as the first layer. The same applies to other examples and comparative examples.

The examples of the present invention are all excellent in overall judgment on unvulcanization tack strength index, vulcanization adhesive strength index, rolling resistance properties, and static air pressure drop rate, as well as uniformity.

TABLE 8

| | | Examples | | | | | |
|---|---|---|---|---|---|---|---|
| | | 3-7 | 3-8 | 3-9 | 3-10 | 3-11 | 3-12 |
| Laminated structure | First layer | Example 3-1 | Example 3-1 | Example 3-1 | Example 3-2 | Example 3-2 | Example 3-2 |
| | Second layer | Mfg ex.*2 | Mfg. ex. 2 | Mfg. ex. 2 | Mfg. ex. 2 | Mfg. ex. 2 | Mfg. ex. 2 |
| Evaluation | Thickness of first layer [mm] | 0.25 | 0.25 | 0.25 | 0.25 | 0.25 | 0.25 |
| | Thickness of second layer [mm] | 0.05 | 0.05 | 0.05 | 0.05 | 0.05 | 0.05 |
| | Inner liner dimension length [mm] | 1300 | 1300 | 1300 | 1300 | 1300 | 1300 |
| | Ply dimension length [mm] | 1250 | 800 | 800 | 1250 | 800 | 800 |
| | Displaced amount between inner liner and carcass ply in width direction [mm] | 50 | 500 | 250 | 50 | 500 | 250 |
| | Mooney viscosity ($ML_{1+4}$, 130° C.) | 28 | 28 | 28 | 29 | 28 | 29 |
| | Index of unvulcanization tack strength between first and second layers | 75 | 74 | 75 | 78 | 80 | 85 |
| | Index of vulcanization adhesive strength between first and second layers | 85 | 86 | 84 | 81 | 82 | 95 |
| | Index of weight saving effect | 141 | 143 | 140 | 140 | 139 | 140 |
| | Rolling resistance index | 105 | 103 | 104 | 104 | 103 | 106 |
| | Static air pressure drop rate (%/month) | 2.1 | 2.1 | 2.2 | 2.1 | 2.1 | 2.2 |
| | Overall judgment | A | A | A | A | A | A |
| | Uniformity | 118 | 120 | 125 | 120 | 123 | 125 |

| | | Examples | | | | | |
|---|---|---|---|---|---|---|---|
| | | 3-13 | 3-14 | 3-15 | 3-16 | 3-17 | 3-18 |
| Laminated structure | First layer | Example 3-3 | Example 3-4 | Example 3-5 | Example 3-6 | Example 3-1 | Example 3-1 |
| | Second layer | Mfg. ex. 2 | Mfg. ex. 2 | Mfg. ex. 2 | Mfg. ex. 2 | Mfg. ex. 7 | Mfg. ex. 10 |
| Evaluation | Thickness of first layer [mm] | | | | 0.25 | | |
| | Thickness of second layer [mm] | | | | 0.05 | | |
| | Inner liner dimension length [mm] | | | | 1300 | | |
| | Ply dimension length [mm] | | | | 800 | | |
| | Displaced amount between inner liner and carcass ply in width direction [mm] | | | | 250 | | |
| | Mooney viscosity ($ML_{1+4}$, 130° C.) | 34 | 38 | 44 | 45 | 39 | 37 |
| | Index of unvulcanization tack strength between first and second layers | 80 | 85 | 83 | 93 | 78 | 88 |
| | Index of vulcanization adhesive strength between first and second layers | 88 | 101 | 95 | 105 | 100 | 110 |
| | Index of weight saving effect | 125 | 125 | 110 | 110 | 140 | 140 |
| | Rolling resistance index | 105 | 105 | 103 | 102 | 104 | 105 |

TABLE 8-continued

|  |  |  |  |  |  |  |
|---|---|---|---|---|---|---|
| Static air pressure drop rate (%/month) | 2.2 | 2.2 | 2.5 | 2.5 | 2 | 1.9 |
| Overall judgment | A | A | A | A | A | A |
| Uniformity | 128 | 125 | 127 | 125 | 125 | 127 |

*Mfg. ex.: Manufacturing example

TABLE 9

|  |  | Examples |  |  |  |  |  |
|---|---|---|---|---|---|---|---|
|  |  | 3-19 | 3-20 | 3-21 | 3-22 | 3-23 | 3-24 |
| Laminated structure | First layer | Example 3-2 | Example 3-2 | Example 3-3 | Example 3-3 | Example 3-4 | Example 3-4 |
|  | Second layer | Mfg. ex.*7 | Mfg. ex. 10 | Mfg. ex. 7 | Mfg. ex. 10 | Mfg. ex. 7 | Mfg. ex. 10 |
| Evaluation | Thickness of first layer [mm] | | | | 0.25 | | |
|  | Thickness of second layer [mm] | | | | 0.05 | | |
|  | Inner liner dimension length [mm] | | | | 1300 | | |
|  | Ply dimension length [mm] | | | | 800 | | |
|  | Displaced amount between inner liner and carcass ply in width direction [mm] | | | | 250 | | |
|  | Mooney viscosity ($ML_{1+4}$, 130° C.) | 39 | 37 | 42 | 41 | 42 | 41 |
|  | Index of unvulcanization tack strength between first and second layers | 85 | 75 | 70 | 85 | 82 | 70 |
|  | Index of vulcanization adhesive strength between first and second layers | 107 | 97 | 95 | 105 | 102 | 93 |
|  | Index of weight saving effect | 140 | 140 | 110 | 110 | 110 | 110 |
|  | Rolling resistance index | 103 | 104 | 103 | 104 | 102 | 103 |
|  | Static air pressure drop rate (%/month) | 2.2 | 2 | 2.1 | 2 | 2.2 | 2 |
|  | Overall judgment | A | A | A | A | A | A |
|  | Uniformity | 128 | 130 | 131 | 130 | 128 | 121 |

|  |  | Examples |  |  |  |  |  |
|---|---|---|---|---|---|---|---|
|  |  | 3-25 | 3-26 | 3-27 | 3-28 | 3-29 | 3-30 |
| Laminated structure | First layer | Example 3-5 | Example 3-5 | Example 3-6 | Example 3-6 | Example 3-1 | Example 3-1 |
|  | Second layer | Mfg. ex. 7 | Mfg. ex. 10 | Mfg. ex. 7 | Mfg. ex. 10 | Mfg. ex. 13 | Mfg. ex. 14 |
| Evaluation | Thickness of first layer [mm] | | | | 0.25 | | |
|  | Thickness of second layer [mm] | | | | 0.05 | | |
|  | Inner liner dimension length [mm] | | | | 1300 | | |
|  | Ply dimension length [mm] | | | | 800 | | |
|  | Displaced amount between inner liner and carcass ply in width direction [mm] | | | | 250 | | |
|  | Mooney viscosity ($ML_{1+4}$, 130° C.) | 44 | 46 | 45 | 45 | 37 | 35 |
|  | Index of unvulcanization tack strength between first and second layers | 98 | 97 | 102 | 102 | 75 | 85 |
|  | Index of vulcanization adhesive strength between first and second layers | 99 | 99 | 101 | 101 | 92 | 102 |
|  | Index of weight saving effect | 110 | 109 | 110 | 110 | 110 | 110 |
|  | Rolling resistance index | 103 | 104 | 102 | 103 | 105 | 106 |
|  | Static air pressure drop rate (%/month) | 2.5 | 2.5 | 2.5 | 2.4 | 1.9 | 1.8 |
|  | Overall judgment | A | A | A | A | A | A |
|  | Uniformity | 129 | 128 | 129 | 129 | 128 | 128 |

*Mfg. ex.: Manufacturing example

TABLE 10

|  |  | Comparative examples |  |  |  |  |
|---|---|---|---|---|---|---|
|  |  | 3-8 | 3-9 | 3-10 | 3-11 | 3-12 |
| Laminated structure | First layer | Comp. ex.* 3-1 | Comp. ex. 3-2 | Comp. ex. 3-3 | Comp. ex. 3-4 | Comp. ex. 3-5 |
|  | Second layer | Mfg. ex.**2 | Mfg. ex. 2 | Mfg. ex. 2 | Mfg. ex. 2 | Mfg. ex. 2 |
| Evaluation | Thickness of first layer [mm] | | | 0.25 | | |
|  | Thickness of second layer [mm] | | | 0.05 | | |
|  | Inner liner dimension length [mm] | | | 1300 | | |
|  | Ply dimension length [mm] | | | 1250 | | |
|  | Displaced amount between inner liner and carcass ply in width direction [mm] | | | 50 | | |

TABLE 10-continued

|  |  |  |  |  |  |
|---|---|---|---|---|---|
| Mooney viscosity (ML$_{1+4}$, 130° C.) | 50 | 10 | 15 | 25 | 26 |
| Index of unvulcanization tack strength between first and second layers | 100 | 20 | 20 | 45 | 45 |
| Index of vulcanization adhesive strength between first and second layers | 100 | 20 | 20 | 45 | 50 |
| Index of weight saving effect | 100 | 111 | 112 | 112 | 114 |
| Rolling resistance index | 100 | 99 | 98 | 98 | 99 |
| Static air pressure drop rate (%/month) | 4 | 2.5 | 2 | 3 | 3 |
| Overall judgment | C | C | C | C | C |
| Uniformity | 90 | 90 | 91 | 89 | 85 |

|  |  | Comparative examples | | | | |
|---|---|---|---|---|---|---|
|  |  | 3-13 | 3-14 | 3-15 | 3-16 | 3-17 |
| Laminated structure | First layer | Comp. ex. 3-6 | Comp. ex. 3-7 | Comp. ex. 3-1 | Comp. ex. 3-1 | Comp. ex. 3-1 |
|  | Second layer | Mfg. ex. 7 | Mfg. ex. 2 | Mfg. ex. 2 | Mfg. ex. 2 | Mfg. ex. 2 |
| Evaluation | Thickness of first layer [mm] | 0.25 | 0.25 | 0.25 | 0.25 | 0.25 |
|  | Thickness of second layer [mm] | 0.05 | 0.05 | 0.05 | 0.05 | 0.05 |
|  | Inner liner dimension length [mm] | 1300 | 1300 | 1300 | 1300 | 1300 |
|  | Ply dimension length [mm] | 1250 | 1300 | 1300 | 1260 | 700 |
|  | Displaced amount between inner liner and carcass ply in width direction [mm] | 50 |  | 0 | 40 | 600 |
|  | Mooney viscosity (ML$_{1+4}$, 130° C.) | 48 | 49 | 50 | 50 | 50 |
|  | Index of unvulcanization tack strength between first and second layers | 95 | 105 | 100 | 111 | 112 |
|  | Index of vulcanization adhesive strength between first and second layers | 99 | 109 | 100 | 98 | 100 |
|  | Index of weight saving effect | 116 | 117 | 100 | 100 | 100 |
|  | Rolling resistance index | 99 | 99 | 96 | 96 | 96 |
|  | Static air pressure drop rate (%/month) | 3.9 | 3.9 | 4.5 | 4.5 | 4.5 |
|  | Overall judgment | B | B | C | C | C |
|  | Uniformity | 84 | 90 | 80 | 85 | 85 |

*Comp. ex.: Comparative example
**Mfg. ex.: Manufacturing example

In Tables 6 to 10, a method for evaluating each inner liner (polymer sheet) and pneumatic tire will be described below.

(a) Mooney Viscosity of the First Layer

In conformity with JISK 6300 "Method for Testing Unvulcanized Rubber", a Mooney viscosity tester "Mooney Viscometer SMV-202" manufactured by Shimadzu Corporation was used, and a small rotor was rotated under the temperature condition of 130° C. preheated for 1 minute, then, the Mooney viscosity of the polymer composition after the lapse of 4 minutes (ML$_{1+4}$, 130° C.) was measured. It shows that the smaller the Mooney viscosity, the more excellent the workability.

(b1) Index of Unvulcanization Tack Strength with Carcass Layer

A sheet of a carcass layer (formulation: 100 parts by mass of a styrene-butadiene rubber, 50 parts by mass of carbon black, 2 parts by mass of sulfur, thickness: 2.0 mm) was prepared. The polymer sheet and the sheet of the carcass layer were bonded together and held at 100 gf for 30 seconds, and a peel-off strength required to separate them was measured as tack strength before vulcanization. For the first layer, the tack strength before vulcanization in each example and comparative example was expressed as an index by the following calculation equation, using the value in Comparative Example 3-1 as a reference value (100). It shows that the greater the index of tack strength before vulcanization, the stronger the tack strength before vulcanization, which is preferable.

(index of tack strength before vulcanization)=(tack strength before vulcanization in each example and comparative example)÷(tack strength before vulcanization in Comparative Example 3-1)× 100

For the second layer, a case where the second layer had a sufficient tack strength was evaluated as "A", and a case where the second layer had an insufficient tack strength was evaluated as "B".

(b2) Index of Unvulcanization Tack Strength Between First and Second Layers

The polymer sheets of the first and second layers were bonded together and held at 100 gf for 30 seconds. Then, a peel-off strength required to separate them was measured as tack strength before vulcanization. The tack strength before vulcanization in each example and comparative example was expressed as an index by the following calculation equation, using the value in Comparative Example 3-8 as a reference value (100). It shows that the greater the index of tack strength before vulcanization, the stronger the tack strength before vulcanization, which is preferable.

(index of tack strength before vulcanization)=(tack strength before vulcanization in each example and comparative example)÷(tack strength before vulcanization in Comparative Example 3-8)× 100

(c1) Vulcanization adhesive strength with carcass layer

The polymer sheet and the sheet of the carcass layer were bonded together and heated at 170° C. for 20 minutes to fabricate a sample for measuring vulcanization adhesive strength. A peel-off strength was measured by a tensile peel test as vulcanization adhesive strength. The vulcanization adhesive strength in each example and comparative example was expressed as an index by the following calculation equation, using the value in Comparative Example 3-1 as a reference value (100). It shows that the greater the index of vulcanization adhesive strength, the stronger the vulcanization adhesive strength, which is preferable.

(index of vulcanization adhesive strength)=(vulcanization adhesive strength in each example and comparative example)÷(vulcanization adhesive strength in Comparative Example 3-1)×100

For the second layer, a case where the second layer had a sufficient adhesive strength was evaluated as "A", and a case where the second layer had an insufficient adhesive strength was evaluated as "B".

(c2) Vulcanization Adhesive Strength Between First and Second Layers

The polymer sheets of the first and second layers were bonded together and heated at 170° C. for 20 minutes to fabricate a sample for measuring vulcanization adhesive strength. A peel-off strength was measured by a tensile peel test as vulcanization adhesive strength. The vulcanization adhesive strength in each example and comparative example was expressed as an index by the following calculation equation, using the value in Comparative Example 3-8 as a reference value (100). It shows that the greater the index of vulcanization adhesive strength, the stronger the vulcanization adhesive strength, which is preferable.

(index of vulcanization adhesive strength)=(vulcanization adhesive strength in each example and comparative example)÷(vulcanization adhesive strength in Comparative Example 3-8)×100

Further, evaluation of each pneumatic tire was performed based on the following method.

(d) Index of Weight Saving Effect

The weight of a pneumatic tire in each example and comparative example was expressed as an index by the following calculation equation, using the value in Comparative Example 3-1 as a reference value (100) for the pneumatic tires in Examples 3-1 to 3-6 and Comparative Examples 3-1 to 3-7, and using the value in Comparative Example 3-8 as a reference value (100) for the pneumatic tires in Examples 3-7 to 3-30 and Comparative Examples 3-8 to 3-17. It shows that the greater the index of weight saving effect, the lighter the tire weight, which is preferable.

(index of weight saving effect)=(tire weight in Comparative Example 3-1 or Comparative Example 3-8)÷(tire weight in each example and comparative example)×100

(e) Rolling Resistance Index

Each manufactured pneumatic tire of 195/65R15 size was mounted on a JIS standard rim 15×6JJ, and rolling resistance was measured while driving the tire at room temperature (38° C.) under the conditions of a load of 3.4 kN, an air pressure of 230 kPa, and a speed of 80 km/hour, using a rolling resistance tester manufactured by KOBE STEEL, LTD. Based on the following calculation equation, rolling resistance in each example and comparative example was expressed as an index, using the value in Comparative Example 3-1 as a reference value (100) for the pneumatic tires in Examples 3-1 to 3-6 and Comparative Examples 3-1 to 3-7, and using the value in Comparative Example 3-8 as a reference value (100) for the pneumatic tires in Examples 3-7 to 3-30 and Comparative Examples 3-8 to 3-17. It shows that the greater the rolling resistance index, the smaller the rolling resistance, which is preferable.

(rolling resistance index)=(rolling resistance in Comparative Example 3-1 or Comparative Example 3-8)÷(rolling resistance in each example and comparative example)×100

(f) Static Air Pressure Drop Rate

Each manufactured tire of 195/65R15 size was mounted on a JIS standard rim 15×6JJ, and air was sealed therein at an initial air pressure of 300 kPa. Then, the tire was left at room temperature for 90 days and thereafter an air pressure drop rate (%/month) was calculated.

(g) Uniformity

In conformity with the "Method for Testing Uniformity of Automobile Tire" of JASO-C607:2000, radial force variation (RFV) was measured using a tire uniformity tester. A relative value obtained by assuming the value in Comparative Example 3-1 as 100 was expressed as an index. The greater the index, the more excellent the uniformity. Measurement was performed under the conditions of a rim of 8.0×17, a tire rotation speed of 60 rpm, an air pressure of 200 kPa, and a longitudinal load of 4000 kN.

(Overall Judgment)

Criteria for overall judgment are as shown in Table 11.

TABLE 11

| Overall Judgment | Judgment Criteria | (a) Mooney viscosity of first layer | (b1) Index of unvulcanization tack strength with carcass layer (b2) Index of unvulcanization tack strength between first and second layers | (c1) Index of vulcanization adhesive strength with carcass layer (c2) Index of vulcanization adhesive strength between first and second layers | (c) Index of weight saving effect | (d) Rolling resistance index | (f) Static air pressure drop rate (%/month) |
|---|---|---|---|---|---|---|---|
| A | All of (a) to (f) satisfy conditions on the right. | 45 or less | 60 or more | 80 or more | 110 or more | 100 or more | 2.5 or less |
| B | Any one of (a) to (f) satisfies a corresponding condition on the right. If a plurality of judgments are made, a judgment with lower evaluation is adopted. | 46 to 50 | 40 to 59 | 60 to 79 | 100 to 109 | 90 to 99 | 2.6 to 3.9 |
| C | Any one of (a) to (f) satisfies a corresponding condition on the right. If a plurality of judgments are made, a judgment with lower evaluation is adopted. | 51 or more | 39 or less | 59 or less | 99 or less | 89 or less | 4.0 or more |

Example 4

Hereinafter, a method for manufacturing a pneumatic tire in accordance with the present invention will be described based on examples.

<Composite Body>

The thermoplastic elastomers (SIB, SIBS, and SIS) used to manufacture a composite body formed of a first layer and a second layer in accordance with the present invention were prepared as described below.

[SIB]

In a 2 L reaction vessel equipped with a stirrer, 589 mL of methylcyclohexane (dried with molecular sieves), 613 ml of n-butyl chloride (dried with molecular sieves), and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for another 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating the polymer, and the resultant polymer was dried at 60° C. for 24 hours to obtain a styrene-isobutylene diblock copolymer (having a styrene component content of 15% by mass and a weight-average molecular weight of 70,000).

[SIBS]

"SIBSTAR 102 (having a Shore A hardness of 25, a styrene component content of 15% by mass, and a weight-average molecular weight of 100,000)" manufactured by Kaneka Corporation was used.

[SIS]

D1161JP (having a styrene component content of 15% by mass and a weight-average molecular weight of 150,000) manufactured by Kraton Performance Polymers Inc. was used.

<Method for Manufacturing Inner Liner>

The styrene-based thermoplastic elastomer such as the SIBS, SIS, SIB, or the like described above was charged into a twin-screw extruder (screw diameter: φ50 mm; L/D: 30; cylinder temperature: 220° C.) to obtain pellets. Thereafter, the pellets were blended with various compounding agents in a T-die extruder (screw diameter: φ80 mm; L/D: 50; die gap width: 500 mm; cylinder temperature: 220° C., film gauge: 0.3 mm) to fabricate an inner liner.

<Unvulcanized Rubber Sheet>

In the present invention, a carcass ply was used as an unvulcanized rubber sheet, and its topping rubber had a formulation described below.

<Formulation A of Topping Rubber>

| | |
|---|---|
| natural rubber (*1) | 100 parts by mass |
| carbon black (*2) | 50 parts by mass |
| zinc white (*3) | 3 parts by mass |
| age inhibitor (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, N$_2$SA: 27 m$^2$/g) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step described above. Pneumatic tires of examples and comparative examples having specifications shown in Tables 12 to 17 were manufactured. A green tire was subjected to press molding at 170° C. for 20 minutes for vulcanization, the vulcanized tire was cooled at 100° C. for 3 minutes without being taken out of a vulcanization mold, and thereafter taken out from the vulcanized tire to manufacture a pneumatic tire of 195/65R15 size having a basic structure shown in FIG. 8. Tables 12 to 17 show formulations of the inner liner and methods of molding tires, together with evaluation results on the tires.

In the examples, displaced distance (amount) L was changed to 50 mm, 500 mm, or 250 mm by setting the length of the inner liner to 1300 mm and changing the dimension of the carcass ply, with reference to FIG. 5. In addition, the width (W1) of the carcass ply was set to 800 mm, and the width (W2) of the inner liner was set to 1300 mm.

TABLE 12

| | | Comp. ex.* 4-1 | Comp. ex. 4-2 | Comp. ex. 4-3 | Comp. ex. 4-4 | Comp. ex. 4-5 | Comp. ex. 4-6 |
|---|---|---|---|---|---|---|---|
| First layer | SIBS (% by mass) | 100 | 100 | 100 | 100 | 100 | 100 |
| | Tackifier A | — | — | — | — | 0.05 | 200 |
| | Tackifier B | — | — | — | — | — | — |
| | Tackifier C | — | — | — | — | — | — |
| | Stearic acid | 3 | 3 | 3 | 3 | 3 | 3 |
| | Zinc oxide | 5 | 5 | 5 | 5 | 5 | 5 |
| | Age inhibitor | 1 | 1 | 1 | 1 | 1 | 1 |
| | Vulcanization accelerator | 1 | 1 | 1 | 1 | 1 | 1 |
| | Sulfur | 0.5 | 0.5 | 0.5 | 0.5 | 0.5 | 0.5 |
| | Thickness of SIBS layer [mm] | 0.25 | 0.25 | 0.25 | 0.25 | 0.25 | 0.25 |
| Second layer | Second-a layer: SIS | 100 | 100 | — | 100 | 100 | 100 |
| | Second-b layer: SIB | — | — | 100 | — | — | — |
| | SIBS | — | — | — | — | — | — |
| | Tackifier A | — | — | — | — | — | — |
| | Tackifier B | — | — | — | — | — | — |
| | Tackifier C | — | — | — | — | — | — |
| | Stearic acid | 3 | 3 | 3 | 3 | 3 | 3 |
| | Zinc oxide | 5 | 5 | 5 | 5 | 5 | 5 |

TABLE 12-continued

|  |  |  |  |  |  |  |  |
|---|---|---|---|---|---|---|---|
|  | Age inhibitor | 1 | 1 | 1 | 1 | 1 | 1 |
|  | Vulcanization accelerator | 1 | 1 | 1 | 1 | 1 | 1 |
|  | Sulfur | 0.5 | 0.5 | 0.5 | 0.5 | 0.5 | 0.5 |
|  | Thickness of second-a layer: SIS [mm] | 0.05 | 0.05 | — | 0.05 | 0.05 | 0.05 |
|  | Thickness of second-b layer: SIB [mm] | — | — | 0.05 | — | — | — |
|  | Inner liner dimension [mm] | 1300 | 1300 | 1260 | 700 | 1300 | 1300 |
|  | Carcass ply dimension [mm] | 1250 | 1260 | 700 | 600 | 1250 | 1250 |
|  | Displaced amount between inner liner and carcass ply in width direction [mm] | 50 | 0 | 40 | 600 | 50 | 50 |
| Tire Test | Vulcanization adhesion (index) | 100 | 99 | 95 | 94 | 91 | 106 |
|  | Flex crack growth (index) | 100 | 95 | 94 | 92 | 90 | 75 |
|  | Rolling resistance change rate (index) | 100 | 99 | 97 | 98 | 89 | 70 |
|  | Static air pressure drop rate (%/month) | 2.9 | 2.8 | 2.8 | 2.8 | 2.9 | 3.3 |
|  | Uniformity (index) | 100 | 89 | 88 | 87 | 84 | 78 |

|  |  |  | Comp. ex. 4-7 | Comp. ex. 4-8 | Comp. ex. 4-9 | Comp. ex. 4-10 |
|---|---|---|---|---|---|---|
| First layer |  | SIBS (% by mass) | 100 | 100 | 100 | 100 |
|  |  | Tackifier A | — | — | — | — |
|  |  | Tackifier B | — | — | — | — |
|  |  | Tackifier C | — | — | — | — |
|  |  | Stearic acid | 3 | 3 | 3 | 3 |
|  |  | Zinc oxide | 5 | 5 | 5 | 5 |
|  |  | Age inhibitor | 1 | 1 | 1 | 1 |
|  |  | Vulcanization accelerator | 1 | 1 | 1 | 1 |
|  |  | Sulfur | 0.5 | 0.5 | 0.5 | 0.5 |
|  |  | Thickness of SIBS layer [mm] | 0.03 | 0.7 | 0.25 | 0.25 |
| Second layer |  | Second-a layer: SIS | 100 | 100 | 100 | 100 |
|  |  | Second-b layer: SIB | — | — | — | — |
|  |  | SIBS | — | — | — | — |
|  |  | Tackifier A | — | — | 1 | 1 |
|  |  | Tackifier B | — | — | — | — |
|  |  | Tackifier C | — | — | — | — |
|  |  | Stearic acid | 3 | 3 | 3 | 3 |
|  |  | Zinc oxide | 5 | 5 | 5 | 5 |
|  |  | Age inhibitor | 1 | 1 | 1 | 1 |
|  |  | Vulcanization accelerator | 1 | 1 | 1 | 1 |
|  |  | Sulfur | 0.5 | 0.5 | 0.5 | 0.5 |
|  |  | Thickness of second-a layer: SIS [mm] | 0.05 | 0.05 | 0.05 | — |
|  |  | Thickness of second-b layer: SIB [mm] | — | — | — | 0.05 |
|  |  | Inner liner dimension [mm] | 1300 | 1300 | 1300 | 1260 |
|  |  | Carcass ply dimension [mm] | 1250 | 1250 | 1260 | 700 |
|  |  | Displaced amount between inner liner and carcass ply in width direction [mm] | 50 | 50 | 0 | 40 |
| Tire Test |  | Vulcanization adhesion (index) | 92 | 95 | 98 | 95 |
|  |  | Flex crack growth (index) | 91 | 93 | 93 | 94 |
|  |  | Rolling resistance change rate (index) | 99 | 99 | 96 | 97 |
|  |  | Static air pressure drop rate (%/month) | 2.9 | 2.8 | 2.9 | 2.8 |
|  |  | Uniformity (index) | 98 | 93 | 94 | 93 |

*Comp. ex.: Comparative example

TABLE 13

|  |  | Comp. ex.* 4-11 | Comp. ex. 4-12 | Comp. ex. 4-13 | Comp. ex. 4-14 | Comp. ex. 4-15 | Comp. ex. 4-16 |
|---|---|---|---|---|---|---|---|
| First layer | SIBS (% by mass) | 100 | 100 | 100 | 100 | 100 | 100 |
|  | Tackifier A | — | — | — | — | — | — |
|  | Tackifier B | — | — | — | — | — | — |
|  | Tackifier C | — | — | — | — | — | — |
|  | Stearic acid | 3 | 3 | 3 | 3 | 3 | 3 |
|  | Zinc oxide | 5 | 5 | 5 | 5 | 5 | 5 |
|  | Age inhibitor | 1 | 1 | 1 | 1 | 1 | 1 |
|  | Vulcanization accelerator | 1 | 1 | 1 | 1 | 1 | 1 |
|  | Sulfur | 0.5 | 0.5 | 0.5 | 0.5 | 0.5 | 0.5 |
|  | Thickness of SIBS layer [mm] | 0.25 | 0.25 | 0.25 | 0.25 | 0.25 | 0.25 |
| Second layer | Second-a layer: SIS | 100 | 100 | 100 | 100 | 100 | 100 |
|  | Second-b layer: SIB | — | — | — | — | — | — |
|  | SIBS | — | — | — | — | — | — |
|  | Tackifier A | 1 | — | — | — | — | — |
|  | Tackifier B | — | 1 | 1 | 1 | — | — |
|  | Tackifier C | — | — | — | — | 1 | 1 |
|  | Stearic acid | 3 | 3 | 3 | 3 | 3 | 3 |
|  | Zinc oxide | 5 | 5 | 5 | 5 | 5 | 5 |
|  | Age inhibitor | 1 | 1 | 1 | 1 | 1 | 1 |
|  | Vulcanization accelerator | 1 | 1 | 1 | 1 | 1 | 1 |

TABLE 13-continued

|  |  |  |  |  |  |  |  |
|---|---|---|---|---|---|---|---|
|  | Sulfur | 0.5 | 0.5 | 0.5 | 0.5 | 0.5 | 0.5 |
|  | Thickness of second-a layer: SIS [mm] | 0.05 | 0.05 | — | 0.05 | 0.05 | — |
|  | Thickness of second-b layer: SIB [mm] | — | — | 0.05 | — | — | 0.05 |
|  | Inner liner dimension [mm] | 700 | 1300 | 1260 | 700 | 1300 | 1260 |
|  | Carcass ply dimension [mm] | 600 | 1260 | 700 | 600 | 1260 | 700 |
|  | Displaced amount between inner liner and carcass ply in width direction [mm] | 600 | 0 | 40 | 600 | 0 | 40 |
| Tire Test | Vulcanization adhesion (index) | 95 | 95 | 95 | 95 | 95 | 96 |
|  | Flex crack growth (index) | 94 | 92 | 95 | 94 | 94 | 95 |
|  | Rolling resistance change rate (index) | 95 | 95 | 97 | 95 | 95 | 97 |
|  | Static air pressure drop rate (%/month) | 2.7 | 2.9 | 2.8 | 2.7 | 2.9 | 2.8 |
|  | Uniformity (index) | 93 | 94 | 93 | 94 | 94 | 93 |

|  |  |  | Comp. ex. 4-17 | Comp. ex. 4-18 | Comp. ex. 4-19 | Comp. ex. 4-20 |
|---|---|---|---|---|---|---|
| First layer | SIBS (% by mass) |  | 100 | 100 | 100 | 100 |
|  | Tackifier A |  | — | 1 | 1 | 1 |
|  | Tackifier B |  | — | — | — | — |
|  | Tackifier C |  | — | — | — | — |
|  | Stearic acid |  | 3 | 3 | 3 | 3 |
|  | Zinc oxide |  | 5 | 5 | 5 | 5 |
|  | Age inhibitor |  | 1 | 1 | 1 | 1 |
|  | Vulcanization accelerator |  | 1 | 1 | 1 | 1 |
|  | Sulfur |  | 0.5 | 0.5 | 0.5 | 0.5 |
|  | Thickness of SIBS layer [mm] |  | 0.25 | 0.25 | 0.25 | 0.25 |
| Second layer | Second-a layer: SIS |  | 100 | 90 | 90 | 90 |
|  | Second-b layer: SIB |  | — | — | — | — |
|  | SIBS |  | — | 10 | 10 | 10 |
|  | Tackifier A |  | — | — | — | — |
|  | Tackifier B |  | — | — | — | — |
|  | Tackifier C |  | 1 | 1 | 1 | 1 |
|  | Stearic acid |  | 3 | 3 | 3 | 3 |
|  | Zinc oxide |  | 5 | 5 | 5 | 5 |
|  | Age inhibitor |  | 1 | 1 | 1 | 1 |
|  | Vulcanization accelerator |  | 1 | 1 | 1 | 1 |
|  | Sulfur |  | 0.5 | 0.5 | 0.5 | 0.5 |
|  | Thickness of second-a layer: SIS [mm] |  | 0.05 | 0.05 | — | 0.05 |
|  | Thickness of second-b layer: SIB [mm] |  | — | — | 0.05 | — |
|  | Inner liner dimension [mm] |  | 700 | 1300 | 1260 | 700 |
|  | Carcass ply dimension [mm] |  | 600 | 1260 | 700 | 600 |
|  | Displaced amount between inner liner and carcass ply in width direction [mm] |  | 600 | 0 | 40 | 600 |
| Tire Test | Vulcanization adhesion (index) |  | 96 | 98 | 99 | 97 |
|  | Flex crack growth (index) |  | 95 | 94 | 95 | 95 |
|  | Rolling resistance change rate (index) |  | 95 | 95 | 97 | 95 |
|  | Static air pressure drop rate (%/month) |  | 2.9 | 2.9 | 2.8 | 2.9 |
|  | Uniformity (index) |  | 94 | 94 | 93 | 94 |

*Comp. ex.: Comparative example

TABLE 14

|  |  | Example 4-1 | Example 4-2 | Example 4-3 | Example 4-4 |
|---|---|---|---|---|---|
| First layer | SIBS (% by mass) | 100 | 100 | 100 | 100 |
|  | Tackifier A | — | — | — | — |
|  | Tackifier B | — | — | — | — |
|  | Tackifier C | — | — | — | — |
|  | Stearic acid | 3 | 3 | 3 | 3 |
|  | Zinc oxide | 5 | 5 | 5 | 5 |
|  | Age inhibitor | 1 | 1 | 1 | 1 |
|  | Vulcanization accelerator | 1 | 1 | 1 | 1 |
|  | Sulfur | 0.5 | 0.5 | 0.5 | 0.5 |
|  | Thickness of SIBS layer [mm] | 0.25 | 0.25 | 0.25 | 0.25 |
| Second layer | Second-a layer: SIS | 90 | — | 20 | — |
|  | Second-b layer: SIB | — | 90 | — | 20 |
|  | SIBS | 10 | 10 | 80 | 80 |
|  | Tackifier A | — | — | — | — |
|  | Tackifier B | — | — | — | — |
|  | Tackifier C | — | — | — | — |
|  | Stearic acid | 3 | 3 | 3 | 3 |
|  | Zinc oxide | 5 | 5 | 5 | 5 |
|  | Age inhibitor | 1 | 1 | 1 | 1 |
|  | Vulcanization accelerator | 1 | 1 | 1 | 1 |
|  | Sulfur | 0.5 | 0.5 | 0.5 | 0.5 |
|  | Thickness of second-a layer: SIS [mm] | 0.05 | 0.05 | 0.05 | 0.05 |
|  | Thickness of second-b layer: SIB [mm] | — | — | — | — |

TABLE 14-continued

|  |  |  |  |  |  |
|---|---|---|---|---|---|
| Tire Test | Inner liner dimension [mm] | 1300 | 1300 | 1300 | 1300 |
|  | Carcass ply dimension [mm] | 1250 | 1250 | 1250 | 1250 |
|  | Displaced amount between inner liner and carcass ply in width direction [mm] | 50 | 50 | 50 | 50 |
|  | Vulcanization adhesion (index) | 172 | 172 | 252 | 255 |
|  | Flex crack growth (index) | 130 | 130 | 150 | 150 |
|  | Rolling resistance change rate (index) | 105 | 105 | 106 | 106 |
|  | Static air pressure drop rate (%/month) | 1.7 | 1.7 | 1.5 | 1.5 |
|  | Uniformity (index) | 105 | 104 | 104 | 104 |

|  |  | Example 4-5 | Example 4-6 | Example 4-7 | Example 4-8 |
|---|---|---|---|---|---|
| First layer | SIBS (% by mass) | 100 | 100 | 100 | 100 |
|  | Tackifier A | — | — | — | — |
|  | Tackifier B | — | — | — | — |
|  | Tackifier C | — | — | — | — |
|  | Stearic acid | 3 | 3 | 3 | 3 |
|  | Zinc oxide | 5 | 5 | 5 | 5 |
|  | Age inhibitor | 1 | 1 | 1 | 1 |
|  | Vulcanization accelerator | 1 | 1 | 1 | 1 |
|  | Sulfur | 0.5 | 0.5 | 0.5 | 0.5 |
|  | Thickness of SIBS layer [mm] | 0.25 | 0.25 | 0.25 | 0.25 |
| Second layer | Second-a layer: SIS | 100 | 100 | 100 | 100 |
|  | Second-b layer: SIB | — | — | — | — |
|  | SIBS | — | — | — | — |
|  | Tackifier A | 1 | 1 | 1 | — |
|  | Tackifier B | — | — | — | 1 |
|  | Tackifier C | — | — | — | — |
|  | Stearic acid | 3 | 3 | 3 | 3 |
|  | Zinc oxide | 5 | 5 | 5 | 5 |
|  | Age inhibitor | 1 | 1 | 1 | 1 |
|  | Vulcanization accelerator | 1 | 1 | 1 | 1 |
|  | Sulfur | 0.5 | 0.5 | 0.5 | 0.5 |
|  | Thickness of second-a layer: SIS [mm] | 0.05 | — | 0.05 | 0.05 |
|  | Thickness of second-b layer: SIB [mm] | — | 0.05 | — | — |
|  | Inner liner dimension [mm] | 1300 | 1300 | 1300 | 1300 |
|  | Carcass ply dimension [mm] | 1250 | 800 | 800 | 1250 |
|  | Displaced amount between inner liner and carcass ply in width direction [mm] | 50 | 500 | 250 | 50 |
| Tire Test | Vulcanization adhesion (index) | 253 | 251 | 240 | 254 |
|  | Flex crack growth (index) | 151 | 150 | 149 | 149 |
|  | Rolling resistance change rate (index) | 107 | 106 | 105 | 108 |
|  | Static air pressure drop rate (%/month) | 1.9 | 1.8 | 1.9 | 1.9 |
|  | Uniformity (index) | 110 | 108 | 109 | 109 |

TABLE 15

|  |  | Example 4-9 | Example 4-10 | Example 4-11 | Example 4-12 | Example 4-13 |
|---|---|---|---|---|---|---|
| First layer | SIBS (% by mass) | 100 | 100 | 100 | 100 | 100 |
|  | Tackifier A | — | — | — | — | — |
|  | Tackifier B | — | — | — | — | — |
|  | Tackifier C | — | — | — | — | — |
|  | Stearic acid | 3 | 3 | 3 | 3 | 3 |
|  | Zinc oxide | 5 | 5 | 5 | 5 | 5 |
|  | Age inhibitor | 1 | 1 | 1 | 1 | 1 |
|  | Vulcanization accelerator | 1 | 1 | 1 | 1 | 1 |
|  | Sulfur | 0.5 | 0.5 | 0.5 | 0.5 | 0.5 |
|  | Thickness of SIBS layer [mm] | 0.25 | 0.25 | 0.25 | 0.25 | 0.25 |
| Second layer | Second-a layer: SIS | 100 | 100 | 100 | 100 | 100 |
|  | Second-b layer: SIB | — | — | — | — | — |
|  | SIBS | — | — | — | — | — |
|  | Tackifier A | — | — | — | — | — |
|  | Tackifier B | 1 | 1 | — | — | — |
|  | Tackifier C | — | — | 1 | 1 | 1 |
|  | Stearic acid | 3 | 3 | 3 | 3 | 3 |
|  | Zinc oxide | 5 | 5 | 5 | 5 | 5 |
|  | Age inhibitor | 1 | 1 | 1 | 1 | 1 |
|  | Vulcanization accelerator | 1 | 1 | 1 | 1 | 1 |
|  | Sulfur | 0.5 | 0.5 | 0.5 | 0.5 | 0.5 |
|  | Thickness of second-a layer: SIS [mm] | — | 0.05 | 0.05 | — | 0.05 |
|  | Thickness of second-b layer: SIB [mm] | — | — | — | — | — |
|  | Inner liner dimension [mm] | 1300 | 1300 | 1300 | 1300 | 1300 |
|  | Carcass ply dimension [mm] | 1250 | 1250 | 1250 | 1250 | 1250 |
|  | Displaced amount between inner liner and carcass ply in width direction [mm] | 50 | 50 | 50 | 50 | 50 |

TABLE 15-continued

| | | | | | | |
|---|---|---|---|---|---|---|
| Tire Test | Vulcanization adhesion (index) | 211 | 233 | 230 | 221 | 219 |
| | Flex crack growth (index) | 149 | 148 | 140 | 140 | 140 |
| | Rolling resistance change rate (index) | 108 | 106 | 103 | 103 | 103 |
| | Static air pressure drop rate (%/month) | 2 | 2.1 | 1.9 | 1.8 | 2 |
| | Uniformity (index) | 109 | 109 | 109 | 109 | 109 |

| | | Example 4-14 | Example 4-15 | Example 4-16 | Example 4-17 |
|---|---|---|---|---|---|
| First layer | SIBS (% by mass) | 100 | 100 | 100 | 100 |
| | Tackifier A | — | — | — | — |
| | Tackifier B | — | — | — | — |
| | Tackifier C | — | — | — | — |
| | Stearic acid | 3 | 3 | 3 | 3 |
| | Zinc oxide | 5 | 5 | 5 | 5 |
| | Age inhibitor | 1 | 1 | 1 | 1 |
| | Vulcanization accelerator | 1 | 1 | 1 | 1 |
| | Sulfur | 0.5 | 0.5 | 0.5 | 0.5 |
| | Thickness of SIBS layer [mm] | 0.25 | 0.25 | 0.25 | 0.25 |
| Second layer | Second-a layer: SIS | — | 100 | — | 90 |
| | Second-b layer: SIB | 100 | — | 100 | — |
| | SIBS | — | — | — | 10 |
| | Tackifier A | 1 | 100 | — | 1 |
| | Tackifier B | — | — | — | — |
| | Tackifier C | — | — | — | — |
| | Stearic acid | 3 | 3 | 3 | 3 |
| | Zinc oxide | 5 | 5 | 5 | 5 |
| | Age inhibitor | 1 | 1 | 1 | 1 |
| | Vulcanization accelerator | 1 | 1 | 1 | 1 |
| | Sulfur | 0.5 | 0.5 | 0.5 | 0.5 |
| | Thickness of second-a layer: SIS [mm] | 0.05 | 0.05 | 0.05 | 0.05 |
| | Thickness of second-b layer: SIB [mm] | — | — | — | — |
| | Inner liner dimension [mm] | 1300 | 1300 | 1300 | 1300 |
| | Carcass ply dimension [mm] | 1250 | 1250 | 1250 | 1250 |
| | Displaced amount between inner liner and carcass ply in width direction [mm] | 50 | 50 | 50 | 50 |
| Tire Test | Vulcanization adhesion (index) | 153 | 254 | 255 | 210 |
| | Flex crack growth (index) | 140 | 170 | 170 | 160 |
| | Rolling resistance change rate (index) | 103 | 101 | 101 | 105 |
| | Static air pressure drop rate (%/month) | 1.9 | 2 | 2 | 1.7 |
| | Uniformity (index) | 104 | 110 | 109 | 104 |

TABLE 16

| | | Example 4-18 | Example 4-19 | Example 4-20 | Example 4-21 | Example 4-22 |
|---|---|---|---|---|---|---|
| First layer | SIBS (% by mass) | 100 | 100 | 100 | 100 | 100 |
| | Tackifier A | — | — | — | — | — |
| | Tackifier B | — | — | — | — | — |
| | Tackifier C | — | — | — | — | — |
| | Stearic acid | 3 | 3 | 3 | 3 | 3 |
| | Zinc oxide | 5 | 5 | 5 | 5 | 5 |
| | Age inhibitor | 1 | 1 | 1 | 1 | 1 |
| | Vulcanization accelerator | 1 | 1 | 1 | 1 | 1 |
| | Sulfur | 0.5 | 0.5 | 0.5 | 0.5 | 0.5 |
| | Thickness of SIBS layer [mm] | 0.25 | 0.25 | 0.25 | 0.25 | 0.25 |
| Second layer | Second-a layer: SIS | — | — | — | 90 | 20 |
| | Second-b layer: SIB | 90 | 20 | 20 | — | — |
| | SIBS | 10 | 80 | 80 | 10 | 80 |
| | Tackifier A | 1 | 1 | 1 | 100 | 100 |
| | Tackifier B | — | — | — | — | — |
| | Tackifier C | — | — | — | — | — |
| | Stearic acid | 3 | 3 | 3 | 3 | 3 |
| | Zinc oxide | 5 | 5 | 5 | 5 | 5 |
| | Age inhibitor | 1 | 1 | 1 | 1 | 1 |
| | Vulcanization accelerator | 1 | 1 | 1 | 1 | 1 |
| | Sulfur | 0.5 | 0.5 | 0.5 | 0.5 | 0.5 |
| | Thickness of second-a layer: SIS [mm] | 0.05 | 0.05 | 0.05 | 0.05 | 0.05 |
| | Thickness of second-b layer: SIB [mm] | — | — | — | — | — |
| | Inner liner dimension [mm] | 1300 | 1300 | 1300 | 1300 | 1300 |
| | Carcass ply dimension [mm] | 1250 | 1250 | 1250 | 1250 | 1250 |
| | Displaced amount between inner liner and carcass ply in width direction [mm] | 50 | 50 | 50 | 50 | 50 |

TABLE 16-continued

| | | | | | | |
|---|---|---|---|---|---|---|
| Tire Test | Vulcanization adhesion (index) | 209 | 289 | 288 | 310 | 391 |
| | Flex crack growth (index) | 160 | 180 | 180 | 190 | 200 |
| | Rolling resistance change rate (index) | 105 | 106 | 105 | 106 | 105 |
| | Static air pressure drop rate (%/month) | 1.7 | 1.5 | 1.5 | 1.7 | 1.5 |
| | Uniformity (index) | 105 | 110 | 109 | 110 | 109 |

| | | Example 4-23 | Example 4-24 | Example 4-25 | Example 4-26 | Example 4-27 |
|---|---|---|---|---|---|---|
| First layer | SIBS (% by mass) | 100 | 100 | 100 | 100 | 100 |
| | Tackifier A | 1 | 1 | 1 | 1 | 1 |
| | Tackifier B | — | — | — | — | — |
| | Tackifier C | — | — | — | — | — |
| | Stearic acid | 3 | 3 | 3 | 3 | 3 |
| | Zinc oxide | 5 | 5 | 5 | 5 | 5 |
| | Age inhibitor | 1 | 1 | 1 | 1 | 1 |
| | Vulcanization accelerator | 1 | 1 | 1 | 1 | 1 |
| | Sulfur | 0.5 | 0.5 | 0.5 | 0.5 | 0.5 |
| | Thickness of SIBS layer [mm] | 0.25 | 0.25 | 0.25 | 0.25 | 0.25 |
| Second layer | Second-a layer: SIS | 90 | 20 | 100 | 100 | 100 |
| | Second-b layer: SIB | — | — | — | — | — |
| | SIBS | 10 | 80 | 1 | 100 | — |
| | Tackifier A | — | — | — | — | 1 |
| | Tackifier B | — | — | — | — | — |
| | Tackifier C | — | — | — | — | — |
| | Stearic acid | 3 | 3 | 3 | 3 | 3 |
| | Zinc oxide | 5 | 5 | 5 | 5 | 5 |
| | Age inhibitor | 1 | 1 | 1 | 1 | 1 |
| | Vulcanization accelerator | 1 | 1 | 1 | 1 | 1 |
| | Sulfur | 0.5 | 0.5 | 0.5 | 0.5 | 0.5 |
| | Thickness of second-a layer: SIS [mm] | 0.05 | 0.05 | 0.05 | 0.05 | 0.05 |
| | Thickness of second-b layer: SIB [mm] | — | — | — | — | — |
| | Inner liner dimension [mm] | 1300 | 1300 | 1300 | 1300 | 1300 |
| | Carcass ply dimension [mm] | 1250 | 1250 | 1250 | 1250 | 1250 |
| | Displaced amount between inner liner and carcass ply in width direction [mm] | 50 | 50 | 50 | 50 | 50 |
| Tire Test | Vulcanization adhesion (index) | 224 | 322 | 210 | 311 | 200 |
| | Flex crack growth (index) | 170 | 170 | 160 | 110 | 160 |
| | Rolling resistance change rate (index) | 106 | 110 | 106 | 108 | 107 |
| | Static air pressure drop rate (%/month) | 1.7 | 1.5 | 1.8 | 1.9 | 1.9 |
| | Uniformity (index) | 104 | 104 | 108 | 109 | 108 |

TABLE 17

| | | Example 4-28 | Example 4-29 | Example 4-30 | Example 4-31 | Example 4-32 | Example 4-33 | Example 4-34 | Example 4-35 | Example 4-36 |
|---|---|---|---|---|---|---|---|---|---|---|
| First layer | SIBS (% by mass) | 100 | 100 | 100 | 100 | 100 | 100 | 100 | 100 | 100 |
| | Tackifier A | 1 | 1 | 1 | 1 | 100 | — | — | — | — |
| | Tackifier B | — | — | — | — | — | 1 | 100 | — | — |
| | Tackifier C | — | — | — | — | — | — | — | 1 | 100 |
| | Stearic acid | 3 | 3 | 3 | 3 | 3 | 3 | 3 | 3 | 3 |
| | Zinc oxide | 5 | 5 | 5 | 5 | 5 | 5 | 5 | 5 | 5 |
| | Age inhibitor | 1 | 1 | 1 | 1 | 1 | 1 | 1 | 1 | 1 |
| | Vulcanization accelerator | 1 | 1 | 1 | 1 | 1 | 1 | 1 | 1 | 1 |
| | Sulfur | 0.5 | 0.5 | 0.5 | 0.5 | 0.5 | 0.5 | 0.5 | 0.5 | 0.5 |
| | Thickness of SIBS layer [mm] | 0.25 | 0.25 | 0.25 | 0.25 | 0.25 | 0.25 | 0.25 | 0.25 | 0.25 |
| Second layer | Second-a layer: SIS | 100 | 100 | 100 | 90 | 90 | 90 | 90 | 90 | 90 |
| | Second-b layer: SIB | — | — | — | — | — | — | — | — | — |
| | SIBS | — | — | — | 10 | 10 | 10 | 10 | 10 | 10 |
| | Tackifier A | 100 | — | — | 1 | 1 | 1 | 1 | 1 | 1 |
| | Tackifier B | — | — | — | — | — | — | — | — | — |
| | Tackifier C | — | 1 | 100 | — | — | — | — | — | — |
| | Stearic acid | 3 | 3 | 3 | 3 | 3 | 3 | 3 | 3 | 3 |
| | Zinc oxide | 5 | 5 | 5 | 5 | 5 | 5 | 5 | 5 | 5 |
| | Age inhibitor | 1 | 1 | 1 | 1 | 1 | 1 | 1 | 1 | 1 |
| | Vulcanization accelerator | 1 | 1 | 1 | 1 | 1 | 1 | 1 | 1 | 1 |
| | Sulfur | 0.5 | 0.5 | 0.5 | 0.5 | 0.5 | 0.5 | 0.5 | 0.5 | 0.5 |
| | Thickness of second-a layer: SIS [mm] | 0.05 | 0.05 | 0.05 | 0.05 | 0.05 | 0.05 | 0.05 | 0.05 | 0.05 |
| | Thickness of second-b layer: SIB [mm] | — | — | — | — | — | — | — | — | — |
| | Inner liner dimension [mm] | 1300 | 1300 | 1300 | 1300 | 1300 | 1300 | 1300 | 1300 | 1300 |
| | Carcass ply dimension [mm] | 1250 | 1250 | 1250 | 1250 | 1250 | 1250 | 1250 | 1250 | 1250 |
| | Displaced amount between inner liner and carcass ply in width direction [mm] | 50 | 50 | 50 | 50 | 50 | 50 | 50 | 50 | 50 |
| Tire Test | Vulcanization adhesion (index) | 300 | 200 | 300 | 250 | 350 | 330 | 230 | 230 | 300 |
| | Flex crack growth (index) | 116 | 165 | 116 | 200 | 150 | 140 | 190 | 190 | 140 |
| | Rolling resistance change rate (index) | 109 | 108 | 110 | 110 | 101 | 101 | 108 | 108 | 101 |

TABLE 17-continued

|  | Example 4-28 | Example 4-29 | Example 4-30 | Example 4-31 | Example 4-32 | Example 4-33 | Example 4-34 | Example 4-35 | Example 4-36 |
|---|---|---|---|---|---|---|---|---|---|
| Static air pressure drop rate (%/month) | 1.9 | 2.1 | 1.7 | 1.7 | 1.7 | 1.7 | 1.7 | 1.7 | 1.9 |
| Uniformity (index) | 109 | 104 | 108 | 107 | 108 | 110 | 106 | 107 | 108 |

(*1) tackifier A: C9 petroleum resin, ARKON P140 (manufactured by Arakawa Chemical Industries Co., Ltd, and having a softening point of 140° C. and a weight-average molecular weight Mw of 900)

(*2) tackifier B: terpene resin, YS Resin PX1250 (manufactured by Yasuhara Chemical Co., Ltd, and having a softening point of 125° C. and a weight-average molecular weight Mw of 700)

(*3) tackifier C: hydrogenated rosin ester, Super Ester A125 (manufactured by Arakawa Chemical Industries Co., Ltd, and having a softening point of 125° C. and a weight-average molecular weight Mw of 700)

(*4) stearic acid: "Stearic Acid Lunac S30" manufactured by Kao Corporation (*5) zinc oxide (ZnO): "Zinc White No. 1" manufactured by Mitsui Mining & Smelting Co., Ltd.

(*6) age inhibitor: "Noclac 6C" manufactured by Ouchi Shinko Chemical Industrial Co., Ltd.

(*7) vulcanization accelerator: "Nocceler DM" manufactured by Ouchi Shinko Chemical Industrial Co., Ltd.

(*8) sulfur: "Sulfur Powder" manufactured by Tsurumi Chemical Industry Co., Ltd.

Comparative Examples 4-1 to 4-20

Comparative Examples 4-1 to 4-4 and Comparative Examples 4-7, 4-8 are cases where neither of the first layer and the second layer is blended with a tackifier, Comparative Examples 4-5, 4-6 are cases where the first layer is blended with a tackifier, and Comparative Examples 4-9 to 4-20 are cases where the second layer is blended with a tackifier. Comparative Examples 4-18 to 4-20 are cases where the first layer is blended with a tackifier and the second layer is blended with a tackifier and the SIBS.

Examples 4-1 to 4-36

Examples 4-1 to 4-22 are cases where the first layer is not blended with a tackifier and the second layer is blended with the SIBS or a tackifier. Examples 4-23 to 4-36 are cases where the first layer and the second layer are blended with the SIBS or a tackifier.

Since the first layer or the second layer is blended with a predetermined amount of the SIBS or tackifier in Examples 4-1 to 4-36, Examples 4-1 to 4-36 are comprehensively more excellent in vulcanization adhesive strength, flex crack growth, rolling resistance change rate, static air pressure drop rate, and uniformity, than Comparative Example 4-1.

The following performance evaluation was performed on the pneumatic tires manufactured as described above.

<Vulcanization Adhesive Strength>

The first layer and a carcass ply layer or the unvulcanized rubber sheet of the first layer and the second layer and a carcass ply layer were bonded together, and were vulcanized at 170° C. for 20 minutes to fabricate a sample for measuring vulcanization adhesive strength. A peel-off strength was measured by a tensile tester as vulcanization adhesive strength. The vulcanization adhesive strength in each example and comparative example was expressed as an index by the following calculation equation, using the value in Comparative Example 4-1 as a reference value. It shows that the greater the index of the vulcanization adhesive strength, the higher the vulcanization adhesive strength.

vulcanization adhesive strength index=(vulcanization adhesive strength in each example and comparative example)/(vulcanization adhesive strength in Comparative Example 4-1)×100

<Flex Crack Growth>

A flex crack growth test was performed to make an evaluation based on whether the inner liner was broken or peeled off. Each prototype tire was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. A relative value in each example and comparative example was calculated using the value in Comparative Example 4-1 as a reference value, to express flex crack growth as an index. It shows that the greater the value of the index, the smaller the flex crack growth.

flex crack growth index=(the number of cracked portions in Comparative Example 4-1)/(the number of cracked portions in each example and comparative example)×100

<Rolling Resistance>

Each prototype tire was mounted on a JIS standard rim 15×6JJ, and rolling resistance was measured while driving the tire at room temperature (30° C.) under the conditions of a load of 3.4 kN, an air pressure of 230 kPa, and a speed of 80 km/hour, using a rolling resistance tester manufactured by KOBE STEEL, LTD. Based on the following calculation equation, a rolling resistance change rate (%) in each example and comparative example was expressed as an index, using the value in Comparative Example 4-1 as a reference value 100. It shows that the greater the rolling resistance change rate, the smaller the rolling resistance.

rolling resistance change rate index=(rolling resistance in Comparative Example 4-1)/(rolling resistance in each example and comparative example)×100

<Static Air Pressure Drop Rate>

Each prototype tire was mounted on a JIS standard rim 15×6JJ, and air was sealed therein at an initial air pressure of 300 kPa. Then, the tire was left at room temperature for 90 days and thereafter an air pressure drop rate was calculated. The smaller the value, the less likely the air pressure is to be reduced.

<Uniformity>

In conformity with the "Method for Testing Uniformity of Automobile Tire" of JASO-C607:2000, radial force variation (RFV) was measured using a tire uniformity tester. A relative value obtained by assuming the value in Comparative Example 4-1 as 100 was expressed as an index. The greater the index, the more excellent the uniformity. Measurement was performed under the conditions of a rim of 8.0×17, a tire rotation speed of 60 rpm, an air pressure of 200 kPa, and a longitudinal load of 4000 kN.

Example 5

Hereinafter, a method for manufacturing a pneumatic tire in accordance with the present invention will be described based on examples.

<Preparation of Elastomer Components>

Elastomers used for a first layer and a second layer in accordance with the present invention were prepared as described below.

(1) Isobutylene-Based Modified Copolymer (1-1) Component A-1: (styrene/β-pinene)-isobutylene-(styrene/β-pinene) block copolymer (β-pinene content: 9.7% by mass, number-average molecular weight (Mn): 103,000).

A method for manufacturing component A-1 is as follows.

Air inside a container of a 2 L-separable flask was substituted by nitrogen, and 31.0 mL of n-hexane dried with molecular sieves and 294.6 mL of similarly dried butyl chloride were added using a syringe. The polymerization container was immersed and cooled in a mixture bath of dry ice and methanol of −70° C. Then, a liquid feed tube made of Teflon (registered trademark) was connected to a liquefaction and collection tube made of a pressure-resistant glass with a three-way stop cock containing 88.9 mL (941.6 mmol) of isobutylene monomer, and the isobutylene monomer was fed into the polymerization container by means of nitrogen pressure. Then, 0.148 g (0.6 mmol) of p-dicumylchloride and 0.07 g (0.8 mmol) of α-picoline were added. Furthermore, 0.87 mL (7.9 mmol) of titanium tetrachloride was added to start polymerization. The polymerized solution was agitated at a similar temperature for 1.5 hours from the start of polymerization, and then, 1 mL of the polymerized solution was extracted from the polymerized solution as a sample. Then, 10.4 g (99.4 mmol) of styrene monomer and 6.8 g (49.7 mmol) of β-pinene which had been cooled to −70° C. were uniformly agitated and added into the polymerization container. After 45 minutes since the addition of styrene and β-pinene, approximately 40 mL of methanol was added to terminate the reaction. After evaporating the solvent and the like from the reaction solution, a polymer was dissolved in toluene and washed twice with water. The toluene solution was added to a large amount of methanol to precipitate the polymer.

The resultant product was vacuum dried at 60° C. for 24 hours. The molecular weight of the block copolymer obtained by the GPC method was measured. The number-average molecular weight (Mn) is 103,000, and Mw/Mn is 1.21.

(1-2) Component A-2: (styrene/β-pinene)-isobutylene-(styrene/β-pinene) block copolymer (β-pinene content: 5.3% by mass, number-average molecular weight: 10,7000).

A method for manufacturing component A-2 is as follows.

Air inside a container of a 2 L-separable flask was substituted by nitrogen, and 31.0 mL of n-hexane dried with molecular sieves and 294.6 mL of similarly dried butyl chloride were added using a syringe. The polymerization container was immersed and cooled in a mixture bath of dry ice and methanol of −70° C. Then, a liquid feed tube made of Teflon (registered trademark) was connected to a liquefaction and collection tube made of a pressure-resistant glass with a three-way stop cock containing 88.9 mL (941.6 mmol) of isobutylene monomer, and the isobutylene monomer was fed into the polymerization container by means of nitrogen pressure. Then, 0.148 g (0.6 mmol) of p-dicumylchloride and 0.07 g (0.8 mmol) of α-picoline were added.

Next, 0.87 mL (7.9 mmol) of titanium tetrachloride was added to start polymerization. The polymerized solution was agitated at the same temperature for 1.5 hours from the start of polymerization, and then, 1 mL of the polymerized solution was extracted from the polymerized solution as a sample. Then, 10.4 g (99.4 mmol) of styrene monomer and 3.6 g (26.3 mmol) of β-pinene which had been cooled to −70° C. were uniformly agitated and added into the polymerization container. After 45 minutes since the addition of styrene and β-pinene, approximately 40 mL of methanol was added to terminate the reaction. After evaporating the solvent and the like from the reaction solution, the reaction solution was dissolved in toluene and washed twice with water. Further, the toluene solution was added to a large amount of methanol to precipitate a polymer. The resultant polymer was vacuum dried at 60° C. for 24 hours. The molecular weight of the block polymer obtained by the GPC method was measured. The number-average molecular weight (Mn) of the block copolymer is 107,000, and Mw/Mn is 1.23.

(1-3) Component A-3: styrene-(isobutylene/β-pinene)-styrene block copolymer (β-pinene content: 5.3% by mass, number-average molecular weight: 10,9000).

A method for manufacturing component A-3 is as follows.

Air inside a polymerization container of a 2 L-separable flask was substituted by nitrogen, and 31.0 mL of n-hexane dried with molecular sieves and 294.6 mL of butyl chloride dried with molecular sieves were added using a syringe. The polymerization container was immersed and cooled in a mixture bath of dry ice and methanol of −70° C., and 3.6 g (26.3 mmol) of β-pinene was added.

Next, a liquid feed tube made of Teflon (registered trademark) was connected to a liquefaction and collection tube made of a pressure-resistant glass with a three-way stop cock containing 88.9 mL (941.6 mmol) of isobutylene monomer, and the isobutylene monomer was fed into the polymerization container by means of nitrogen pressure. Further, 0.148 g (0.6 mmol) of p-dicumylchloride and 0.07 g (0.8 mmol) of α-picoline were added. Next, 0.87 mL (7.9 mmol) of titanium tetrachloride was further added to start polymerization. After 45 minutes since the start of polymerization, 10.4 g (99.4 mmol) of styrene monomer which had been cooled to −70° C. was added in the polymerization container. After 45 minutes since the addition of styrene, approximately 40 mL of methanol was added to terminate the reaction. After evaporating the solvent and the like from the reaction solution, a polymer was dissolved in toluene and washed twice with water. The toluene solution was added to a large amount of methanol to precipitate the polymer. The resultant polymer was vacuum dried at 60° C. for 24 hours. The molecular weight of the block copolymer obtained by the GPC method was measured. The number-average molecular weight (Mn) of the block copolymer is 109,000, and Mw/Mn is 1.21.

(2) SIB (styrene-isobutylene block copolymer)

In a 2 L reaction vessel equipped with a stirrer, 589 mL of methylcyclohexane (dried with molecular sieves), 613 ml of n-butyl chloride (dried with molecular sieves), and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for another 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating the polymer, and the resultant polymer was dried at 60° C. for 24 hours to obtain a styrene-isobutylene diblock copolymer (having a styrene component content of 15% by mass and a weight-average molecular weight of 70,000).

(3) SIBS (styrene-isobutylene-styrene block copolymer)

"SIBSTAR 102T (having a Shore A hardness of 25, a styrene component content of 25% by mass, and a weight-average molecular weight of 100,000)" manufactured by Kaneka Corporation was used.

(4) SIS (styrene-isoprene-styrene block copolymer)

D1161JP (having a styrene component content of 15% by mass, and a weight-average molecular weight of 150,000) manufactured by Kraton Performance Polymers Inc. was used.

(5) As the IIR, "Exxon Chlorobutyl 1066" manufactured by Exxon Mobil Corporation was used.

<Preparation of Elastomer Compositions of First Layer and Second Layer>

As shown in Tables 18 and 19, additives were blended into the above-described elastomer components, and the elastomer compositions of the first and second layers were prepared.

TABLE 18

| First layer formulation | | Formulations | | | | | | | | | |
|---|---|---|---|---|---|---|---|---|---|---|---|
| | | 5-1 | 5-2 | 5-3 | 5-4 | 5-5 | 5-6 | 5-7 | 5-8 | 5-9 | 5-10 |
| Formulation (parts by mass) | Component A-1 | 100 | — | — | 100 | 100 | 100 | 30 | 70 | 30 | 50 |
| | Component A-2 | — | 100 | — | — | — | — | — | — | — | — |
| | Component A-3 | — | — | 100 | — | — | — | — | — | — | — |
| | SIBS | — | — | — | — | — | — | — | — | — | 50 |
| | IIR | — | — | — | — | — | — | 70 | 30 | 70 | — |
| | CB | — | — | — | — | — | — | 60 | 60 | 60 | — |
| | ZnO | — | — | — | 4.0 | — | — | 4.0 | 4.0 | 4.0 | — |
| | Stearic acid | — | — | — | 2.0 | — | — | 2.0 | 2.0 | 2.0 | — |
| | Age inhibitor | — | — | — | 0.2 | — | — | 0.2 | 0.2 | 0.2 | — |
| | Vulcanization accelerator | — | — | — | 2.0 | — | — | 2.0 | 2.0 | 2.0 | — |
| | Sulfur | — | — | — | 1.0 | — | — | 1.0 | 1.0 | 1.0 | — |
| | Tackifier | — | — | — | — | 10 | — | — | — | 10 | — |
| | Polyisobutylene | — | — | — | — | — | 10 | — | — | 10 | — |

| First layer formulation | | Formulations | | | | | Comparative formulations | | | |
|---|---|---|---|---|---|---|---|---|---|---|
| | | 5-11 | 5-12 | 5-13 | 5-14 | 5-15 | 5-1 | 5-2 | 5-3 | 5-4 |
| Formulation (parts by mass) | Component A-1 | 50 | 50 | 15 | — | — | — | — | — | — |
| | Component A-2 | — | — | — | 50 | — | — | — | — | — |
| | Component A-3 | — | — | — | — | 50 | — | — | — | — |
| | SIBS | 50 | 50 | 15 | 50 | 50 | 100 | 100 | 100 | 100 |
| | IIR | — | — | 70 | — | — | — | — | — | — |
| | CB | — | — | 60 | — | — | — | — | — | — |
| | ZnO | — | — | 4.0 | — | — | — | — | — | 4.0 |
| | Stearic acid | — | — | 2.0 | — | — | — | — | — | 2.0 |
| | Age inhibitor | — | — | 0.2 | — | — | — | — | — | 0.2 |
| | Vulcanization accelerator | — | — | 2.0 | — | — | — | — | — | 2.0 |
| | Sulfur | — | — | 1.0 | — | — | — | — | — | 1.0 |
| | Tackifier | 10 | — | — | — | — | — | 10 | — | — |
| | Polyisobutylene | — | 10 | — | — | — | — | — | 10 | — |

TABLE 19

| Second layer formulation | | Formulations | | | | | | | | | Comparative formulations | | | | |
|---|---|---|---|---|---|---|---|---|---|---|---|---|---|---|---|
| | | 5-16 | 5-17 | 5-18 | 5-19 | 5-20 | 5-21 | 5-22 | 5-23 | 5-24 | 5-5 | 5-6 | 5-7 | 5-8 | 5-10 |
| Formulation (parts by mass) | SIS | 50 | 50 | 50 | — | 50 | 50 | 50 | — | 25 | 100 | — | 50 | 100 | 100 |
| | SIB | — | — | — | 50 | — | — | — | 50 | — | — | 100 | — | — | — |
| | SIBS | — | — | — | — | — | — | — | — | — | — | — | 50 | — | — |
| | Component A-1 | 50 | — | — | 50 | 50 | 50 | 50 | 50 | 25 | — | — | — | — | — |
| | Component A-2 | — | 50 | — | — | — | — | — | — | — | — | — | — | — | — |
| | Component A-3 | — | — | 50 | — | — | — | — | — | — | — | — | — | — | — |
| | IIR | — | — | — | — | — | — | — | — | 50 | — | — | — | — | — |
| | CB | — | — | — | — | — | — | — | — | 60 | — | — | — | — | — |
| | ZnO | — | — | — | — | 4.0 | — | — | 4.0 | 4.0 | — | — | — | 4.0 | — |
| | Stearic acid | — | — | — | — | 2.0 | — | — | 2.0 | 2.0 | — | — | — | 2.0 | — |
| | Age inhibitor | — | — | — | — | 0.2 | — | — | 0.2 | 0.2 | — | — | — | 0.2 | — |

TABLE 19-continued

| | Formulations | | | | | | | | | Comparative formulations | | | | |
|---|---|---|---|---|---|---|---|---|---|---|---|---|---|---|
| Second layer formulation | 5-16 | 5-17 | 5-18 | 5-19 | 5-20 | 5-21 | 5-22 | 5-23 | 5-24 | 5-5 | 5-6 | 5-7 | 5-8 | 5-10 |
| Vulcanization accelerator | — | — | — | — | 2.0 | — | — | 2.0 | 2.0 | — | — | — | 2.0 | — |
| Sulfur | — | — | — | — | 1.0 | — | — | 1.0 | 1.0 | — | — | — | 1.0 | — |
| Tackifier | — | — | — | — | — | 10 | — | 10 | 10 | — | — | — | — | — |
| Polyisobutylene | — | — | — | — | — | — | 10 | 10 | 10 | — | — | — | — | 10 |

(*1) IIR: "Exxon Chlorobutyl 1066" manufactured by Exxon Mobil Corporation (*2) carbon black (CB): "SEAST V" (N660, $N_2SA$: 27 $m^2/g$) manufactured by Tokai Carbon Co., Ltd.

(*3) zinc oxide (ZnO): "Zinc White No. 1" manufactured by Mitsui Mining & Smelting Co., Ltd.

(*4) stearic acid: "Stearic Acid Lunac S30" manufactured by Kao Corporation (*5) age inhibitor: "Noclac 6C" manufactured by Ouchi Shinko Chemical Industrial Co., Ltd.

(*6) vulcanization accelerator: "Nocceler DM" manufactured by Ouchi Shinko Chemical Industrial Co., Ltd.

(*7) sulfur: "Sulfur Powder" manufactured by Tsurumi Chemical Industry Co., Ltd.

(*8) tackifier: C9 petroleum resin, ARKON P140 (manufactured by Arakawa Chemical Industries Co., Ltd, and having a softening point of 140° C. and a weight-average molecular weight Mw of 900)

(*9) polyisobutylene: "TETRAX 3T" (having a viscosity-average molecular weight of 30,000 and a weight-average molecular weight of 49,000) manufactured by Nippon Oil Corporation <Method for Manufacturing Inner Liner>

Based on the formulations in Tables 18 and 19, additives were added to thermoplastic elastomers such as an isoprene-based modified copolymer, SIBS, SIS, and SIB, and blended with a Banbury mixer, a kneader, and a twin-screw extruder (screw diameter: φ50 mm; L/D: 30; cylinder temperature: 220° C.), thereby obtaining elastomer compositions. Thereafter, an inner liner was fabricated with a T-die extruder (screw diameter: φ80 mm; L/D: 50; die gap width: 500 mm; cylinder temperature: 220° C.). It is noted that the inner liner has a thickness of 0.3 mm (first layer: 0.25 mm, second layer: 0.05 mm).

<Unvulcanized Rubber Sheet>

In the present invention, a carcass ply was used as an unvulcanized rubber sheet, and its topping rubber had a formulation described below.

<Formulation A of Topping Rubber>

| natural rubber (*1) | 100 parts by mass |
|---|---|
| carbon black (*2) | 50 parts by mass |
| zinc white (*3) | 3 parts by mass |
| age inhibitor (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, $N_2SA$: 27 $m^2/g$) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step shown in FIGS. 5 and 6. Pneumatic tires of examples and comparative examples as indicated in detail in Tables 20 to 23 were manufactured. A green tire was subjected to press molding at 170° C. for 20 minutes for vulcanization, the vulcanized tire was cooled at 100° C. for 3 minutes without being taken out of a vulcanization mold, and thereafter taken out from the vulcanized tire to manufacture a pneumatic tire of 195/65R15 size having a basic structure shown in FIG. 8. Tables 20 to 23 show formulations of the inner liner and methods of molding tires, together with evaluation results on the tires. In the examples, displaced distance (amount) L was changed to 50 mm, 500 mm, or 250 mm by setting the length of the inner liner to 1300 mm and changing the dimension of the carcass ply, with reference to FIG. 5. In addition, width W2 of the inner liner was set to 1300 mm, and width W1 of the carcass ply was set to 800 mm.

TABLE 20

| | Example 5-1 | Example 5-2 | Example 5-3 |
|---|---|---|---|
| First layer | Formulation 1 | Formulation 1 | Formulation 1 |
| Second layer | Formulation 16 | Formulation 16 | Formulation 16 |
| Thickness of first layer [mm] | 0.25 | 0.25 | 0.25 |
| Thickness of second-a layer: SIS [mm] | 0.05 | — | 0.05 |
| Thickness of second-b layer: SIB [mm] | — | 0.05 | — |
| Inner liner dimension [mm] | 1300 | 1300 | 1300 |
| Carcass ply dimension [mm] | 1250 | 800 | 800 |
| Displaced amount between inner liner and carcass ply in width direction [mm] | 50 | 500 | 250 |
| Vulcanization adhesive strength | 110 | 109 | 110 |
| Flex crack growth | 110 | 107 | 106 |
| Rolling resistance change rate | 109 | 108 | 108 |
| Static air pressure drop rate (%/month) | 2.0 | 2.2 | 2.2 |
| Uniformity | 109 | 105 | 105 |

TABLE 21

|  | Example 5-4 | Example 5-5 | Example 5-6 | Example 5-7 | Example 5-8 | Example 5-9 | Example 5-10 | Example 5-11 |
|---|---|---|---|---|---|---|---|---|
| First layer | F.* 2 | F. 3 | F. 4 | F. 5 | F. 6 | F. 7 | F. 8 | F. 9 |
| Second layer | F. 16 | F. 16 | F. 16 | F. 16 | F. 16 | F. 16 | F. 16 | F. 16 |
| Thickness of first layer [mm] | 0.25 | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 | 0.05 |
| Thickness of second-b layer: SIB [mm] | — | — | — | — | — | — | — | — |
| Inner liner dimension [mm] | 1300 | 1300 | 1300 | 1300 | 1300 | 1300 | 1300 | 1300 |
| Carcass ply dimension [mm] | 1250 | 1250 | 1250 | 1250 | 1250 | 1250 | 1250 | 1250 |
| Displaced amount between inner liner and carcass ply in width direction [mm] | 50 | 50 | 50 | 50 | 50 | 50 | 50 | 50 |
| Vulcanization adhesive strength | 114 | 109 | 116 | 114 | 119 | 107 | 109 | 107 |
| Flex crack growth | 102 | 103 | 107 | 107 | 107 | 103 | 103 | 103 |
| Rolling resistance change rate | 104 | 104 | 103 | 103 | 103 | 103 | 103 | 103 |
| Static air pressure drop rate (%/month) | 2.2 | 2.2 | 2 | 2 | 2 | 2.2 | 2.2 | 2.2 |
| Uniformity | 105 | 105 | 104 | 105 | 104 | 104 | 103 | 104 |

|  | Example 5-12 | Example 5-13 | Example 5-14 | Example 5-15 | Example 5-16 | Example 5-17 | Example 5-18 |
|---|---|---|---|---|---|---|---|
| First layer | F. 10 | F. 11 | F. 12 | F. 13 | F. 14 | F. 15 | F. 16 |
| Second layer | F. 16 | F. 16 | F. 16 | F. 16 | F. 16 | F. 16 | F. 16 |
| Thickness of first layer [mm] | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 |
| Thickness of second-b layer: SIB [mm] | — | — | — | — | — | — | — |
| Inner liner dimension [mm] | 1300 | 1300 | 1300 | 1300 | 1300 | 1300 | 1300 |
| Carcass ply dimension [mm] | 1250 | 1250 | 1250 | 1250 | 1250 | 1250 | 1250 |
| Displaced amount between inner liner and carcass ply in width direction [mm] | 50 | 50 | 50 | 50 | 50 | 50 | 50 |
| Vulcanization adhesive strength | 113 | 109 | 107 | 107 | 107 | 107 | 107 |
| Flex crack growth | 104 | 103 | 103 | 103 | 103 | 103 | 103 |
| Rolling resistance change rate | 103 | 103 | 103 | 103 | 103 | 103 | 103 |
| Static air pressure drop rate (%/month) | 2.5 | 2.2 | 2.2 | 2.2 | 2.2 | 2.2 | 2.2 |
| Uniformity | 104 | 104 | 103 | 104 | 105 | 105 | 104 |

*F.: Formulation

TABLE 22

|  | Example 5-19 | Example 5-20 | Example 5-21 | Example 5-22 | Example 5-23 | Example 5-24 | Example 5-25 |
|---|---|---|---|---|---|---|---|
| First layer | F.* 5 | F. 6 | F. 7 | F. 8 | F. 9 | F. 10 | F. 11 |
| Second-a layer | F. 16 | F. 16 | F. 16 | F. 16 | F. 16 | F. 16 | F. 16 |
| Second-b layer | — | — | — | — | — | — | — |
| Thickness of first layer [mm] | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 |
| Thickness of second-b layer: SIB [mm] | — | — | — | — | — | — | — |
| Inner liner dimension [mm] | 1300 | 1300 | 1300 | 1300 | 1300 | 1300 | 1300 |
| Carcass ply dimension [mm] | 800 | 800 | 800 | 800 | 800 | 800 | 800 |
| Displaced amount between inner liner and carcass ply in width direction [mm] | 500 | 500 | 500 | 500 | 500 | 500 | 500 |
| Vulcanization adhesive strength | 117 | 115 | 117 | 117 | 115 | 117 | 117 |
| Flex crack growth | 107 | 107 | 107 | 107 | 108 | 106 | 107 |
| Rolling resistance change rate | 104 | 104 | 104 | 103 | 105 | 103 | 104 |
| Static air pressure drop rate (%/month) | 1.8 | 1.8 | 1.8 | 1.8 | 1.8 | 1.8 | 1.9 |
| Uniformity | 104 | 104 | 105 | 105 | 104 | 104 | 105 |

|  | Example 5-26 | Example 5-27 | Example 5-28 | Example 5-29 | Example 5-30 | Example 5-31 | Example 5-32 |
|---|---|---|---|---|---|---|---|
| First layer | F. 12 | F. 13 | F. 14 | F. 15 | F. 1 | F. 1 | F. 1 |
| Second-a layer | F. 16 | F. 16 | F. 16 | F. 16 | F. 22 | — | F. 24 |
| Second-b layer | — | — | — | — | — | F. 23 | — |
| Thickness of first layer [mm] | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | — | 0.05 |
| Thickness of second-b layer: SIB [mm] | — | — | — | — | — | 0.05 | — |
| Inner liner dimension [mm] | 1300 | 1300 | 1300 | 1300 | 1300 | 1300 | 1300 |
| Carcass ply dimension [mm] | 800 | 800 | 800 | 800 | 1250 | 1250 | 1250 |
| Displaced amount between inner liner and carcass ply in width direction [mm] | 500 | 500 | 500 | 500 | 50 | 50 | 50 |

TABLE 22-continued

| | | | | | | | |
|---|---|---|---|---|---|---|---|
| Vulcanization adhesive strength | 117 | 117 | 122 | 120 | 119 | 127 | 132 |
| Flex crack growth | 108 | 108 | 112 | 110 | 111 | 110 | 111 |
| Rolling resistance change rate | 103 | 105 | 106 | 106 | 106 | 107 | 106 |
| Static air pressure drop rate (%/month) | 2 | 1.9 | 1.9 | 1.9 | 1.9 | 1.9 | 1.8 |
| Uniformity | 105 | 105 | 105 | 104 | 105 | 105 | 106 |

*F.: Formulation

TABLE 23

| | Comp. ex.* 5-1 | Comp. ex. 5-2 | Comp. ex. 5-3 | Comp. ex. 5-4 | Comp. ex. 5-5 | Comp. ex. 5-6 | Comp. ex. 5-7 |
|---|---|---|---|---|---|---|---|
| First layer | Comp. F.*** 1 | Comp. F. 1 | | F.** 1 | | Comp. F. 1 | Comp. F. 1 |
| Second-a layer | Comp. F. 5 | Comp. F. 5 | | F. 16 | | — | Comp. F. 5 |
| Second-b layer | — | — | | — | | Comp. F. 6 | Comp. F. 6 |
| Thickness of first layer [mm] | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | — | 0.05 |
| Thickness of second-b layer: SIB [mm] | — | — | — | — | — | 0.05 | 0.05 |
| Inner liner dimension [mm] | 1300 | 1300 | 1300 | 1300 | 1300 | 1300 | 1300 |
| Carcass ply dimension [mm] | 1250 | 800 | 1300 | 1260 | 700 | 1250 | 1250 |
| Displaced amount between inner liner and carcass ply in width direction [mm] | 50 | 500 | 0 | 40 | 600 | 50 | 50 |
| Vulcanization adhesive strength | 100 | 100 | 97 | 97 | 95 | 101 | 100 |
| Flex crack growth | 100 | 98 | 96 | 95 | 91 | 102 | 101 |
| Rolling resistance change rate | 100 | 97 | 95 | 93 | 93 | 101 | 99 |
| Static air pressure drop rate (%/month) | 3.8 | 3.2 | 3.8 | 3.8 | 3.9 | 2.6 | 2.7 |
| Uniformity | 100 | 98 | 97 | 95 | 95 | 95 | 96 |

| | Comp. ex. 5-8 | Comp. ex. 5-9 | Comp. ex. 5-10 | Comp. ex. 5-11 | Comp. ex. 5-12 | Comp. ex. 5-13 | Comp. ex. 5-14 |
|---|---|---|---|---|---|---|---|
| First layer | Comp. F. 3 | Comp. F. 4 | Comp. F. 1 | Comp. F. 1 | Comp. F. 1 | Comp. F. 1 | F. 1 |
| Second-a layer | Comp. F. 5 | Comp. F. 5 | Comp. F. 7 | Comp. F. 8 | Comp. F. 9 | Comp. F. 10 | F. 24 |
| Second-b layer | — | — | — | — | — | — | — |
| Thickness of first layer [mm] | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 |
| Thickness of second-b layer: SIB [mm] | — | — | — | — | — | — | — |
| Inner liner dimension [mm] | 1300 | 1300 | 1300 | 1300 | 1300 | 1300 | 1300 |
| Carcass ply dimension [mm] | 1250 | 1250 | 1250 | 1250 | 1250 | 1250 | 1250 |
| Displaced amount between inner liner and carcass ply in width direction [mm] | 50 | 50 | 50 | 50 | 50 | 50 | 50 |
| Vulcanization adhesive strength | 100 | 100 | 97 | 100 | 100 | 100 | 112 |
| Flex crack growth | 99 | 101 | 101 | 99 | 98 | 100 | 102 |
| Rolling resistance change rate | 101 | 100 | 100 | 100 | 100 | 99 | 101 |
| Static air pressure drop rate (%/month) | 2.7 | 2.8 | 2.8 | 2.8 | 2.9 | 3.0 | 2.7 |
| Uniformity | 96 | 96 | 96 | 96 | 96 | 96 | 96 |

*Comp. ex.: Comparative example
**F.: formulation
***Comp. F.: Comparative formulation Examples 5-1 to 5-3

In Table 20, Examples 5-1 to 5-3 are cases where only an isobutylene-based modified copolymer (component A-1) was used as an elastomer component for the first layer, and the SIS and an isobutylene-based modified copolymer (component A-1) were used for the second layer.

Examples 5-4 to 5-18

In Table 21, Examples 5-4 to 5-18 are cases where formulations containing an isobutylene-based modified copolymer as an elastomer component (formulations 5-2 to 5-16) were used for the first layer, and a formulation having the SIS and an isobutylene-based modified copolymer (component A-1) mixed therein (formulation 5-16) was used for the second layer.

Examples 5-19 to 5-32

In Table 22, Examples 5-19 to 5-29 are cases where the formulations containing an isobutylene-based modified copolymer as an elastomer component (formulations 5 to 15) were used for the first layer, and the formulation having the SIS and an isobutylene-based modified copolymer (component A-1) mixed therein (formulation 16) was used for the second layer.

Example 5-30 is a case where a formulation made of an isobutylene-based modified copolymer (component A-1) (a formulation 1) was used for the first layer, and a formulation having the SIS and an isobutylene-based modified copolymer (component A-1) mixed therein (a formulation 22) was used for the second layer.

Example 5-31 is a case where the formulation made of an isobutylene-based modified copolymer (component A-1) (formulation 1) was used for the first layer, and a formulation having the SIB and an isobutylene-based modified copolymer (component A-1) mixed therein (a formulation 23) was used for the second layer.

Example 5-32 is a case where the formulation made of an isobutylene-based modified copolymer (component A-1) (formulation 1) was used for the first layer, and a formulation having the SIS, an isobutylene-based modified copolymer (component A-1), and the IIR mixed therein (a formulation 24) was used for the second layer.

It is recognized that the examples of the present invention are comprehensively more excellent in vulcanization adhesive strength, flex crack growth, rolling resistance index, static air pressure drop rate, and uniformity, than Comparative Example 1 described later.

Comparative Examples 5-1 to 5-14

In Table 23, Comparative Examples 5-1, 5-2, 5-6, 5-7, and 5-10 to 5-13 are cases where the SIBS (comparative formation 1) was used for the first layer, and the SIS or the SIB was used for the second layer.

Comparative Examples 5-3 to 5-5 are cases where an isobutylene-based modified copolymer (component A-1) was used for the first layer, and the SIS and an isobutylene-based modified copolymer (component A-1) (formation 16) were used for the second layer. However, the displaced distance (amount) is outside the scope of the present invention.

Comparative Example 5-14 is a case where an isobutylene-based modified copolymer (component A-1) (formulation 1) was used for the first layer, and a mixture of the SIS, an isobutylene-based modified copolymer (component A-1), and the IIR (formulation 24) was used for the second layer.

<Performance Test>

Performance evaluation was performed on the pneumatic tires manufactured as described above, in the following manner.

<Vulcanization Adhesive Strength>

A carcass ply was bonded to a composite layer of the first layer and the second layer, and vulcanized at 170° C. for 20 minutes to fabricate a sample for measuring vulcanization adhesive strength. A peel-off strength was measured by a tensile tester as vulcanization adhesive strength. The vulcanization adhesive strength in each example and comparative example was expressed as an index by the following calculation equation, using the value in Comparative Example 5-1 as a reference value. It shows that the greater the index of the vulcanization adhesive strength, the higher the vulcanization adhesive strength.

vulcanization adhesive strength index=(vulcanization adhesive strength in each example and comparative example)/(vulcanization adhesive strength in Comparative Example 5-1)×100

<Flex Crack Growth>

A durability driving test was performed to make an evaluation based on whether the inner liner was broken or peeled off. Each prototype tire was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. Flex crack growth in each example and comparative example was expressed as an index, using the value in Comparative Example 5-1 as a reference value. It shows that the greater the value of the index, the smaller the flex crack growth.

flex crack growth index=(the number of cracked portions in Comparative Example 5-1)/(the number of cracked portions in each example and comparative example)×100

<Rolling Resistance>

Each prototype tire was mounted on a JIS standard rim 15×6JJ, and rolling resistance was measured while driving the tire at room temperature (30° C.) under the conditions of a load of 3.4 kN, an air pressure of 230 kPa, and a speed of 80 km/hour, using a rolling resistance tester manufactured by KOBE STEEL, LTD. Based on the following calculation equation, a rolling resistance change rate (%) in each example and comparative example was expressed as an index, using the value in Comparative Example 5-1 as a reference value 100. It shows that the greater the rolling resistance change rate, the smaller the rolling resistance.

rolling resistance index=(rolling resistance in Comparative Example 5-1)/(rolling resistance in each example and comparative example)×100

<Static Air Pressure Drop Rate Test>

Each prototype tire was mounted on a JIS standard rim 15×6JJ, and air was sealed therein at an initial air pressure of 300 kPa. Then, the tire was left at room temperature for 90 days and thereafter an air pressure drop rate was calculated. The smaller the value, the less likely the air pressure is to be reduced, which is preferable.

<Uniformity>

In conformity with the "Method for Testing Tire Uniformity of Automobile Tire" of JASO-C607:2000, RFV was measured using a tire uniformity tester, and evaluated based on an index obtained by assuming the value in Comparative Example 1 as 100. The greater the value, the more excellent the uniformity. Measurement was performed under the conditions of a rim of 8.0×17, a tire rotation speed of 60 rpm, an air pressure of 200 kPa, and a longitudinal load of 4000 kN.

Example 6

Hereinafter, a method for manufacturing a pneumatic tire in accordance with the present invention will be described based on examples.

<Composite Layer for Inner Liner>

As thermoplastic elastomer components used to manufacture a polymer laminate made of a first layer and a second layer in accordance with the present invention, an SIB, an SIS, an SIBS, and an SIBS modified copolymer were prepared as described below.

[SIB]

In a 2 L reaction vessel equipped with a stirrer, 589 mL of methylcyclohexane (dried with molecular sieves), 613 ml of n-butyl chloride (dried with molecular sieves), and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for another 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating the polymer, and the resultant polymer was dried at 60° C. for 24 hours to obtain a styrene-isobutylene diblock copolymer (having a styrene component content of 15% by mass and a weight-average molecular weight of 70,000).

a reaction. After the reaction for 30 minutes, about 1000 ml of water was added to the reaction solution, which was stirred vigorously to terminate the reaction. The reaction solution was washed with a large amount of water several times, and further slowly dropped into a large amount of a methanol-acetone mixed solvent (1:1) to precipitate a reaction product. Then, the reaction product was vacuum dried at 60° C. for 24 hours to obtain an SIBS modified copolymer (weight-average molecular weight: 150,000, styrene content: 20% by mass, acid chloride: 1.0% by weight).

TABLE 24

| First layer formulation | | Formulations | | | | | | | | | | | Comparative formulations | | | |
|---|---|---|---|---|---|---|---|---|---|---|---|---|---|---|---|---|
| | | 6-1 | 6-2 | 6-3 | 6-4 | 6-5 | 6-6 | 6-7 | 6-8 | 6-9 | 6-10 | 6-11 | 6-1 | 6-2 | 6-3 | 6-4 |
| Formulation (parts by mass) | SIBS modified copolymer | 100 | 100 | 30 | 70 | 90 | 10 | 90 | 10 | 15 | 35 | 35 | — | — | — | — |
| | SIBS | — | — | — | — | 10 | 90 | 10 | 90 | 15 | 35 | 35 | 100 | 100 | 100 | 100 |
| | IIR | — | — | 70 | 30 | — | — | — | — | 70 | 30 | 30 | — | — | — | — |
| | CB | — | — | 60 | 60 | — | — | — | — | 60 | 30 | 30 | — | — | — | — |
| | ZnO | — | 4.0 | 4.0 | 4.0 | — | — | 4.0 | 4.0 | 4.0 | 4.0 | 4.0 | — | — | — | 4.0 |
| | Stearic acid | — | 2.0 | 2.0 | 2.0 | — | — | 2.0 | 2.0 | 2.0 | 2.0 | 2.0 | — | — | — | 2.0 |
| | Age inhibitor | — | 0.2 | 0.2 | 0.2 | — | — | 0.2 | 0.2 | 0.2 | 0.2 | 0.2 | — | — | — | 0.2 |
| | Vulcanization accelerator | — | 2.0 | 2.0 | 2.0 | — | — | 2.0 | 2.0 | 2.0 | 2.0 | 2.0 | — | — | — | 2.0 |
| | Sulfur | — | 1.0 | 1.0 | 1.0 | — | — | 1.0 | 1.0 | 1.0 | 1.0 | 1.0 | — | — | — | 1.0 |
| | Tackifier | — | — | — | — | — | — | — | — | — | — | 10 | — | 10 | — | — |
| | Polyisobutylene | — | — | — | — | — | — | — | — | — | — | 10 | — | — | 10 | — |

TABLE 25

| Second layer formulation | | Formulations | | | | | | | Comparative formulations | | | | | |
|---|---|---|---|---|---|---|---|---|---|---|---|---|---|---|
| | | 6-2A | 6-2B | 6-2C | 6-2D | 6-2E | 6-2F | 6-2G | 6-5 | 6-6 | 6-7 | 6-8 | 6-9 | 6-10 |
| Formulation (parts by mass) | SIS | 20 | 20 | 15 | 10 | 10 | — | — | 100 | — | 50 | 100 | 100 | 100 |
| | SIB | — | — | — | — | — | 10 | 10 | — | 100 | — | — | — | — |
| | SIBS | — | — | — | — | — | 10 | 10 | — | — | 50 | — | — | — |
| | SIBS modified copolymer | 80 | 80 | 15 | 80 | 80 | 10 | 10 | — | — | — | — | — | — |
| | IIR | — | — | 70 | — | — | 70 | 70 | — | — | — | — | — | — |
| | CB | — | — | 6.0 | — | — | 60 | 60 | — | — | — | — | — | — |
| | ZnO | — | 4.0 | 4.0 | — | 4.0 | 4.0 | 4.0 | — | — | — | 4.0 | — | — |
| | Stearic acid | — | 2.0 | 2.0 | — | 2.0 | 2.0 | 2.0 | — | — | — | 2.0 | — | — |
| | Age inhibitor | — | 0.2 | 0.2 | — | 0.2 | 0.2 | 0.2 | — | — | — | 0.2 | — | — |
| | Vulcanization accelerator | — | 2.0 | 2.0 | — | 2.0 | 2.0 | 2.0 | — | — | — | 2.0 | — | — |
| | Sulfur | — | 1.0 | 1.0 | — | 1.0 | 1.0 | 1.0 | — | — | — | 1.0 | — | — |
| | Tackifier | — | — | — | — | — | — | 10 | — | — | — | — | 10 | — |
| | Polyisobutylene | — | — | — | — | — | — | 10 | — | — | — | — | — | 10 |

[SIS]

D1161JP (having a styrene component content of 15% by mass and a weight-average molecular weight of 150,000) manufactured by Kraton Performance Polymers Inc. was used.

[SIBS]

"SIBSTAR 102T (having a Shore A hardness of 25, a styrene component content of 15% by mass, and a weight-average molecular weight of 100,000)" manufactured by Kaneka Corporation was used.

[Manufacturing of SIBS Modified Copolymer]

Into a 2-liter separable flask, 75 g of a styrene-isobutylene block copolymer (styrene content: 30% by mass, the number of moles of the styrene unit: 0.216 mol) was charged, and the inside of the container was substituted by nitrogen. Using a syringe, 1200 mL of n-hexane dried with molecular sieves and 1800 ml of n-butyl chloride dried with molecular sieves were added.

Next, 30 g (0.291 mol) of methacrylic acid chloride was added using a syringe. Then, 39.4 g (0.295 mol) of aluminum trichloride was added while stirring the solution to start (*1) IIR: "Exxon Chlorobutyl 1066" manufactured by Exxon Mobil Corporation (*2) carbon black (CB): "SEAST V" (N660, $N_2SA$: 27 $m^2/g$) manufactured by Tokai Carbon Co., Ltd.

(*3) zinc oxide (ZnO): "Zinc White No. 1" manufactured by Mitsui Mining & Smelting Co., Ltd.

(*4) stearic acid: "Stearic Acid Lunac S30" manufactured by Kao Corporation (*5) age inhibitor: "Noclac 6C" manufactured by Ouchi Shinko Chemical Industrial Co., Ltd.

(*6) vulcanization accelerator: "Nocceler DM" manufactured by Ouchi Shinko Chemical Industrial Co., Ltd.

(*7) sulfur: "Sulfur Powder" manufactured by Tsurumi Chemical Industry Co., Ltd.

(*8) tackifier: C9 petroleum resin, ARKON P140 (manufactured by Arakawa Chemical Industries Co., Ltd, and having a softening point of 140° C. and a weight-average molecular weight Mw of 900)

(*9) polyisobutylene: "TETRAX 3T" (having a viscosity-average molecular weight of 30,000 and a weight-average molecular weight of 49,000) manufactured by Nippon Oil Corporation <Method for Manufacturing Inner Liner>

Based on the formulations and comparative formulations in Tables 24 and 25, elastomer compositions such as the SIBS modified copolymer, the SIBS, the SIS, and the SIB were formed into pellets using a twin-screw extruder (screw diameter: ϕ50 mm; L/D: 30; cylinder temperature: 220° C.). Thereafter, an inner liner was fabricated using a T-die extruder (screw diameter: ϕ80 mm; L/D: 50; die gap width: 500 mm; cylinder temperature: 220° C.; film gauge for the first layer: 0.25 mm; film gauge for the second layer: 0.05 mm).

<Unvulcanized Rubber Sheet>

In the present invention, a carcass ply was used as an unvulcanized rubber sheet, and its topping rubber had a formulation described below.

<Formulation A of Topping Rubber>

| | |
|---|---|
| natural rubber (*1) | 100 parts by mass |
| carbon black (*2) | 50 parts by mass |
| zinc white (*3) | 3 parts by mass |
| age inhibitor (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, $N_2SA$: 27 $m^2/g$) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step described above. Pneumatic tires of examples and comparative examples as indicated in detail in Tables 26 to 29 were manufactured. A green tire was subjected to press molding at 170° C. for 20 minutes for vulcanization, the vulcanized tire was cooled at 100° C. for 3 minutes without being taken out of a vulcanization mold, and thereafter taken out from the vulcanized tire to manufacture a pneumatic tire of 195/65R15 size having a basic structure shown in FIG. 8. Tables 26 to 29 show formulations of the inner liner and methods of molding tires, together with evaluation results on the tires. In the examples, displaced distance (amount) L was changed to 50 mm, 500 mm, or 250 mm by setting the length of the inner liner to 1300 mm and changing the dimension of the carcass ply, with reference to FIG. 5. In addition, the width (W1) of the carcass ply was set to 800 mm, and the width (W2) of the inner liner was set to 1300 mm.

TABLE 26

| | Example 6-1 | Example 6-2 | Example 6-3 |
|---|---|---|---|
| First layer | Formulation 6-1 | Formulation 6-1 | Formulation 6-1 |
| Second layer | Formulation 6-2A | Formulation 6-2A | Formulation 6-2A |
| Thickness of first layer [mm] | 0.25 | 0.25 | 0.25 |
| Thickness of second-a layer: SIS [mm] | 0.05 | 0.05 | 0.05 |
| Thickness of second-b layer: SIB [mm] | — | — | — |
| Inner liner dimension [mm] | 1300 | 1300 | 1300 |
| Carcass ply dimension [mm] | 1250 | 800 | 800 |
| Displaced amount between inner liner and carcass ply in width direction [mm] | 50 | 500 | 250 |
| Vulcanization adhesive strength | 108 | 107 | 107 |
| Flex crack growth | 103 | 102 | 103 |
| Rolling resistance change rate | 104 | 102 | 103 |
| Static air pressure drop rate (%/month) | 2.1 | 2.3 | 2.2 |
| Uniformity | 107 | 108 | 108 |

TABLE 27

| | Example 6-4 | Example 6-5 | Example 6-6 | Example 6-7 | Example 6-8 | Example 6-9 | Example 6-10 | Example 6-11 | Example 6-12 | Example 6-13 |
|---|---|---|---|---|---|---|---|---|---|---|
| First layer | F.* 6-2 | F. 6-3 | F. 6-4 | F. 6-5 | F. 6-6 | F. 6-7 | F. 6-8 | F. 6-9 | F. 6-10 | F. 6-11 |
| Second layer | F. 6-2A | F. 6-2A | F. 6-2A | F. 6-2A | F. 6-2A | F. 6-2A | F. 6-2A | F. 6-2A | F. 6-2A | F. 6-2A |
| Thickness of first layer [mm] | 0.25 | 0.25 | 0.25 | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 | 0.05 | 0.05 | 0.05 |
| Thickness of second-b layer: SIB [mm] | — | — | — | — | — | — | — | — | — | — |
| Inner liner dimension [mm] | 1300 | 1300 | 1300 | 1300 | 1300 | 1300 | 1300 | 1300 | 1300 | 1300 |
| Carcass ply dimension [mm] | 1250 | 1250 | 1250 | 1250 | 1250 | 1250 | 1250 | 1250 | 1250 | 1250 |
| Displaced amount between inner liner and carcass ply in width direction [mm] | 50 | 50 | 50 | 50 | 50 | 50 | 50 | 50 | 50 | 50 |
| Vulcanization adhesive strength | 108 | 106 | 107 | 107 | 106 | 108 | 106 | 107 | 116 | 118 |
| Flex crack growth | 102 | 103 | 102 | 102 | 102 | 102 | 103 | 102 | 103 | 104 |
| Rolling resistance change rate | 103 | 101 | 102 | 102 | 102 | 103 | 101 | 102 | 103 | 103 |
| Static air pressure drop rate (%/month) | 2.1 | 2.2 | 2.2 | 2.1 | 2.1 | 2.1 | 2.2 | 2.2 | 2.2 | 2.2 |
| Uniformity | 108 | 107 | 108 | 108 | 108 | 110 | 105 | 106 | 115 | 115 |

*F.: Formulation

TABLE 28

|  | Example 6-14 | Example 6-15 | Example 6-16 | Example 6-17 | Example 6-18 | Example 6-19 | Example 6-20 | Example 6-21 | Example 6-22 | Example 6-23 | Example 6-24 |
|---|---|---|---|---|---|---|---|---|---|---|---|
| First layer | F.* 6-1 | F. 6-1 | F. 6-1 | F. 6-1 | F. 6-1 | F. 6-2 | F. 6-3 | F. 6-5 | F. 6-7 | F. 6-9 | F. 6-1 |
| Second-a layer | F. 6-2A | F. 6-2B | F. 6-2C | F. 6-2D | F. 6-2D | F. 6-2A | F. 6-2A | F. 6-2A | F. 6-2A | F. 6-2A | F. 6-2G |
| Second-b layer | — | — | — | — | F. 6-2F | — | — | — | — | — | — |
| Thickness of first layer [mm] | 0.25 | 0.25 | 0.25 | 0.25 | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 | 0.05 | 0.05 | 0.05 | 0.05 |
| Thickness of second-b layer: SIB [mm] | — | — | — | — | — | — | — | — | — | — | — |
| Inner liner dimension [mm] | 1300 | 1300 | 1300 | 1300 | 1300 | 1300 | 1300 | 1300 | 1300 | 1300 | 1300 |
| Carcass ply dimension [mm] | 1250 | 1250 | 1250 | 1250 | 1250 | 1250 | 1250 | 1250 | 1250 | 1250 | 1250 |
| Displaced amount between inner liner and carcass ply in width direction [mm] | 50 | 50 | 50 | 50 | 50 | 50 | 50 | 50 | 50 | 50 | 50 |
| Vulcanization adhesive strength | 116 | 117 | 115 | 116 | 116 | 116 | 116 | 116 | 116 | 116 | 118 |
| Flex crack growth | 106 | 107 | 105 | 106 | 106 | 106 | 106 | 106 | 107 | 107 | 107 |
| Rolling resistance change rate | 103 | 103 | 103 | 103 | 102 | 103 | 103 | 103 | 103 | 103 | 103 |
| Static air pressure drop rate (%/month) | 1.9 | 1.9 | 2 | 1.9 | 1.9 | 1.9 | 2 | 1.9 | 1.9 | 2 | 1.9 |
| Uniformity | 116 | 116 | 115 | 115 | 115 | 115 | 116 | 116 | 117 | 117 | 117 |

*F.: Formulation

TABLE 29

|  | Comp. ex.* 6-1 | Comp. ex. 6-2 | Comp. ex. 6-3 | Comp. ex. 6-4 | Comp. ex. 6-5 | Comp. ex. 6-6 | Comp. ex. 6-7 | Comp. ex. 6-8 | Comp. ex. 6-9 | Comp. ex. 6-10 | Comp. ex. 6-11 |
|---|---|---|---|---|---|---|---|---|---|---|---|
| First layer | Comp. F.** 6-1 | Comp. F. 6-1 | Comp. F. 6-1 | Comp. F. 6-1 | Comp. F. 6-2 | Comp. F. 6-3 | Comp. F. 6-4 | Comp. F. 6-1 | Comp. F. 6-1 | Comp. F. 6-1 | Comp. F. 6-1 |
| Second-a layer | Comp. F. 6-5 | Comp. F. 6-5 | — | Comp. F. 6-5 | Comp. F. 6-5 | Comp. F. 6-5 | Comp. F. 6-5 | Comp. F. 6-7 | Comp. F. 6-8 | Comp. F. 6-9 | Comp. F. 6-10 |
| Second-b layer | — | — | Comp. F. 6-6 | Comp. F. 6-6 | — | — | — | — | — | — | — |
| Thickness of first layer [mm] | 0.25 | 0.25 | 0.25 | 0.25 | 0.25 | 0.25 | 0.25 | 0.25 | 0.25 | 0.25 | 0.25 |
| Thickness of second-a layer: SIS [mm] | 0.05 | 0.05 | 0.05 | 0.05 | 0.05 | 0.05 | 0.05 | 0.05 | 0.05 | 0.05 | 0.05 |
| Thickness of second-b layer: SIB [mm] | — | — | — | — | — | — | — | — | — | — | — |
| Inner liner dimension [mm] | 1300 | 1300 | 1300 | 1300 | 1300 | 1300 | 1300 | 1300 | 1300 | 1300 | 1300 |
| Carcass ply dimension [mm] | 1250 | 800 | 1250 | 1250 | 1250 | 1250 | 1250 | 1250 | 1250 | 1250 | 1250 |
| Displaced amount between inner liner and carcass ply in width direction [mm] | 50 | 500 | 50 | 50 | 50 | 50 | 50 | 50 | 50 | 50 | 50 |
| Vulcanization adhesive strength | 100 | 100 | 101 | 100 | 100 | 100 | 100 | 97 | 100 | 100 | 100 |
| Flex crack growth | 100 | 98 | 102 | 101 | 99 | 99 | 101 | 101 | 99 | 98 | 100 |
| Rolling resistance change rate | 100 | 97 | 101 | 99 | 101 | 101 | 100 | 100 | 100 | 100 | 99 |
| Static air pressure drop rate (%/month) | 3.8 | 3.2 | 2.6 | 2.7 | 2.7 | 2.7 | 2.8 | 2.8 | 2.8 | 2.9 | 3.0 |
| Uniformity | 100 | 98 | 95 | 96 | 96 | 96 | 96 | 96 | 96 | 96 | 96 |

*Comp. ex.: Comparative example
**Comp. F.: Comparative formulation

<Performance Test>

The following performance evaluation was performed on the pneumatic tires manufactured as described above.

<Vulcanization Adhesive Strength>

The inner liner and the unvulcanized sheet were bonded together such that the second layer of the inner liner was brought into contact with the unvulcanized sheet, and vulcanized at 170° C. for 20 minutes to fabricate a sample for measuring vulcanization adhesive strength. A peel-off strength was measured by a tensile tester as vulcanization adhesive strength. The vulcanization adhesive strength in each example and comparative example was expressed as an index by the following calculation equation, using the value in Comparative Example 6-1 as a reference value. It shows that the greater the index of the vulcanization adhesive strength, the higher the vulcanization adhesive strength.

vulcanization adhesive strength index=(vulcanization adhesive strength in each example and comparative example)/(vulcanization adhesive strength in Comparative Example 6-1)×100

<Flex Crack Growth>

A durability driving test was performed to make an evaluation based on whether the inner liner was broken or peeled off. Each prototype tire was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. Flex crack growth in each example and comparative example was expressed as an index, using the value in Comparative Example 6-1 as a reference value. It shows that the greater the index, the smaller the flex crack growth.

flex crack growth index=(the number of cracked portions in Comparative Example 6-1)/(the number of cracked portions in each example and comparative example)×100

<Rolling Resistance>

Each prototype tire was mounted on a JIS standard rim 15×6JJ, and rolling resistance was measured while driving the tire at room temperature (30° C.) under the conditions of a load of 3.4 kN, an air pressure of 230 kPa, and a speed of 80 km/hour, using a rolling resistance tester manufactured by KOBE STEEL, LTD. Based on the following calculation equation, a rolling resistance change rate (%) in each example and comparative example was expressed as an index, using the value in Comparative Example 6-1 as a reference value 100. It shows that the greater the rolling resistance change rate, the smaller the rolling resistance.

rolling resistance index=(rolling resistance in Comparative Example 6-1)/(rolling resistance in each example and comparative example)×100

<Static Air Pressure Drop Rate Test>

Each prototype tire was mounted on a JIS standard rim 15×6JJ, and air was sealed therein at an initial air pressure of 300 kPa. Then, the tire was left at room temperature for 90 days and thereafter an air pressure drop rate was calculated. The smaller the value, the less likely the air pressure is to be reduced, which is preferable.

<Uniformity>

In conformity with the "Method for Testing Uniformity of Automobile Tire" of JASO-C607:2000, radial force variation (RFV) was measured using a tire uniformity tester. A relative value obtained by assuming the value in Comparative Example 6-1 as 100 was expressed as an index. The greater the index, the more excellent the uniformity. Measurement was performed under the conditions of a rim of 8.0×17, a tire rotation speed of 60 rpm, an air pressure of 200 kPa, and a longitudinal load of 4000 kN.

Examples 6-1 to 6-24

Tables 26 to 28 show test results of Examples 6-1 to 6-24. Here, Examples 6-1 to 6-3 are cases where a formulation 6-1 was used for the first layer, a formulation 6-2A was used for the second layer, and the displaced amount was changed. Examples 6-4 to 6-13 are cases where formulations 6-2 to 6-11 were used for the first layer, formulation 6-2A was used for the second layer, and the displaced amount was set constant to 50 mm.

Examples 6-14 to 6-17 are cases where formulation 1 was used for the first layer, formulations 2A to 2D were used for the second layer, and the displaced amount was set constant to 50 mm. Example 6-18 is a case where formulation 1 was used for the first layer, a plurality of layers having formulations 2D and 2F were used for the second layer, and the displaced amount was set to 50 mm.

Examples 6-19 to 6-23 are cases where formulations 2 to 9 were used for the first layer, formulation 2A was used for the second layer, and the displaced amount was set constant to 50 mm. Example 6-24 is a case where formulation 1 was used for the first layer, a formulation 2G was used for the second layer, and the displaced amount was set to 50 mm.

It is recognized that the examples of the present invention are comprehensively more excellent in vulcanization adhesive strength, flex crack growth, rolling resistance, static air pressure drop rate, and uniformity, than Comparative Example 6-1 described later.

Comparative Examples 6-1 to 6-11

Table 29 shows test results of Comparative Examples 6-1 to 6-11. Here, Comparative Examples 6-1, 6-2 are cases where a comparative formulation 1 was used for the first layer, a comparative formulation 5 was used for the second layer, and the displaced amount was changed to 50 mm or 500 mm.

Comparative Examples 6-3 and 6-8 to 6-11 are cases where comparative formulation 6-1 was used for the first layer, comparative formulation 6-6 to 6-10 were used for the second layer, and the displaced amount was set constant to 50 mm.

Comparative Example 6-4 is a case where comparative formulation 1 was used for the first layer, a plurality of layers having comparative formulations 5 and 6 were used for the second layer, and the displaced amount was set to 50 mm.

Examples 6-25 to 6-36

Blended with Ultraviolet Absorber/Antioxidant

In Examples 6-25 to 6-36, pneumatic tires were manufactured as in Examples 6-1 to 6-24 described above, using the first layer formulations shown in Table 30 and the second layer formulations shown in Table 31. Table 32 shows test results thereof.

TABLE 30

| | | Comparative formulations | | | | | | Example formulations | | | | | | | |
|---|---|---|---|---|---|---|---|---|---|---|---|---|---|---|---|
| First layer formulation | | 1X | 2X | 3X | 4X | 5X | 6X | 1X | 2X | 3X | 4X | 5X | 6X | 7X | 8X |
| Formulation (parts by mass) | SIBS | 100 | 100 | 100 | — | 50 | 50 | — | — | — | — | — | — | 50 | 50 |
| | SIBS modified copolymer | — | — | — | 100 | 50 | 50 | 100 | 100 | 100 | 100 | 100 | 100 | 50 | 50 |
| | Tackifier | — | — | — | — | — | — | — | — | — | — | — | — | 10 | 10 |
| | Polyisobutylene | — | — | — | — | — | — | — | — | — | — | — | — | 10 | 10 |
| | Antioxidant | 0.4 | — | 0.2 | 0.2 | 0.2 | 45 | 0.5 | 40 | — | — | 0.5 | 0.5 | 0.5 | 20 |
| | Ultraviolet absorber | — | 0.4 | 0.2 | 0.2 | 0.2 | 45 | — | — | 0.5 | 40 | 0.5 | 0.5 | 0.5 | 20 |

TABLE 31

| | | Comparative formulations | | | | | | | Example formulations | | | | | | | | |
|---|---|---|---|---|---|---|---|---|---|---|---|---|---|---|---|---|
| Second layer formulation | | 7X | 8X | 9X | 10X | 11X | 12X | 13X | 9X | 10X | 11X | 12X | 13X | 14X | 15X | 16X | 17X |
| Formulation (parts by mass) | SIS | 100 | 100 | 100 | — | 50 | 50 | 35 | — | — | — | — | — | — | 50 | 50 | 35 |
| | SIB | — | — | — | 100 | — | — | — | 100 | 100 | 100 | 100 | 100 | 100 | — | — | — |
| | SIBS | — | — | — | — | 50 | 50 | 35 | — | — | — | — | — | — | 50 | 50 | 35 |
| | SIBS modified copolymer | — | — | — | — | — | — | 30 | — | — | — | — | — | — | — | — | 30 |

TABLE 31-continued

|  | Comparative formulations | | | | | | | Example formulations | | | | | | | | |
|---|---|---|---|---|---|---|---|---|---|---|---|---|---|---|---|---|
| Second layer formulation | 7X | 8X | 9X | 10X | 11X | 12X | 13X | 9X | 10X | 11X | 12X | 13X | 14X | 15X | 16X | 17X |
| Tackifier | — | — | — | — | — | — | — | — | — | — | — | — | — | — | 10 | 10 |
| Polyisobutylene | — | — | — | — | — | — | — | — | — | — | — | — | — | — | 10 | 10 |
| Antioxidant | 0.4 | — | 0.2 | 0.2 | 0.2 | 45 | 45 | 0.5 | 40 | — | — | 0.5 | 0.5 | 0.5 | 20 | 20 |
| Ultraviolet absorber | — | 0.4 | 0.2 | 0.2 | 0.2 | 45 | 45 | — | — | 0.5 | 40 | 0.5 | 0.5 | 0.5 | 20 | 20 |

TABLE 32

| | | Examples | | | | | | |
|---|---|---|---|---|---|---|---|---|
| | Laminated structure | 6-25 | 6-26 | 6-27 | 6-28 | 6-29 | 6-30 | 6-31 |
| Laminated structure | First layer | Ex. F.* 5X | Ex. F. 5X | Ex. F. 5X | Ex. F. 5X | Ex. F. 1X | Ex. F. 2X | Ex. F. 3X |
| | Second layer | Ex. F. 16X | Ex. F. 16X | Ex. F. 16X | Ex. F. 17X | Ex. F. 13X | Ex. F. 13X | Ex. F. 13X |
| | Thickness of first layer [mm] | 0.25 | 0.25 | 0.25 | 0.25 | 0.25 | 0.25 | 0.25 |
| | Thickness of second layer [mm] | 0.05 | 0.05 | 0.05 | 0.05 | 0.05 | 0.05 | 0.05 |
| | Inner liner dimension length [mm] | 1300 | 1300 | 1300 | 1300 | 1300 | 1300 | 1300 |
| | Ply dimension length [mm] | 1250 | 800 | 800 | 1250 | 800 | 800 | 800 |
| | Displaced amount between inner liner and carcass ply in width direction [mm] | 50 | 500 | 250 | 50 | 250 | 250 | 250 |
| Evaluation | Weather resistance index | 119 | 120 | 125 | 123 | 118 | 119 | 118 |
| | Flex crack growth index | 118 | 120 | 120 | 121 | 119 | 119 | 120 |
| | Elasticity change index | 121 | 119 | 123 | 122 | 120 | 120 | 120 |
| | Durability driving index | 121 | 121 | 123 | 126 | 121 | 120 | 121 |
| | Uniformity | 118 | 118 | 126 | 120 | 119 | 118 | 119 |

| | | Examples | | | | |
|---|---|---|---|---|---|---|
| | Laminated structure | 6-32 | 6-33 | 6-34 | 6-35 | 6-36 |
| Laminated structure | First layer | Ex. F. 4X | Ex. F. 5X | Ex. F. 6X | Ex. F. 7X | Ex. F. 8X |
| | Second layer | Ex. F. 13X | Ex. F. 13X | Ex. F. 13X | Ex. F. 13X | Ex. F. 13X |
| | Thickness of first layer [mm] | 0.25 | 0.25 | 0.25 | 0.25 | 0.25 |
| | Thickness of second layer [mm] | 0.05 | 0.05 | 0.05 | 0.05 | 0.05 |
| | Inner liner dimension length [mm] | 1300 | 1300 | 1300 | 1300 | 1300 |
| | Ply dimension length [mm] | 800 | 800 | 800 | 800 | 800 |
| | Displaced amount between inner liner and carcass ply in width direction [mm] | 250 | 250 | 250 | 250 | 250 |
| Evaluation | Weather resistance index | 120 | 120 | 121 | 122 | 120 |
| | Flex crack growth index | 120 | 119 | 120 | 119 | 120 |
| | Elasticity change index | 120 | 120 | 120 | 119 | 120 |
| | Durability driving index | 120 | 120 | 121 | 120 | 121 |
| | Uniformity | 120 | 119 | 119 | 118 | 119 |

*Ex. F: Example formulation

The ultraviolet absorber and the antioxidant used in Tables 30 and 31 are described below. Other components are the same as those used in Examples 6-1 to 6-24.

(*1) As the ultraviolet absorber, ADK STAB LA-36 (2-(2'-hydroxy-3'-tert-butyl-5'-methylphenyl)-5-chlorobenzotriazol), which is a benzotriazol-based ultraviolet absorber manufactured by ADEKA Corporation, was used. The ultraviolet absorber has a molecular weight of 315.8, a melting point of 138 to 141° C., and a maximum absorption wavelength of 353 nm.

(*2) As the antioxidant, "IRGANOX 1010" (pentaerythrityl tetrakis(3-3,5-di-t-butyl-4-hydroxyphenyl) propionate) was used as a hindered phenolic antioxidant manufactured by BASF. The antioxidant has a molecular weight of 111.7, a melting point of 110 to 125° C., and a specific gravity of 1.15.

Comparative Examples 6-12 to 6-20

In Comparative Examples 6-12 to 6-20, pneumatic tires were manufactured as in Comparative Examples 6-1 to 6-11 described above, using the first layer formulations shown in Table 30 and the second layer formulations shown in Table 31. Table 33 shows test results thereof.

TABLE 33

| | Laminated structure | Comparative examples | | | | | | | | |
|---|---|---|---|---|---|---|---|---|---|---|
| | | 6-12 | 6-13 | 6-14 | 6-15 | 6-16 | 6-17 | 6-18 | 6-19 | 6-20 |
| Laminated structure | First layer | Comp. F.* 1X | Comp. F. 2X | Comp. F. 3X | Comp. F. 4X | Comp. F. 3X | Comp. F. 3X | Comp. F. 1X | Comp. F. 1X | Comp. F. 1X |
| | Second layer | Ex. F.** 9X | Ex. F.. 9X | Ex. F. 9X | Ex. F. 9X | Ex. F. 11X | Ex. F. 12X | Ex. F. 9X | Ex. F. 9X | Ex. F. 9X |
| | Thickness of first layer [mm] | 0.25 | 0.25 | 0.25 | 0.25 | 0.25 | 0.25 | 0.25 | 0.25 | 0.25 |
| | Thickness of second layer [mm] | 0.05 | 0.05 | 0.05 | 0.05 | 0.05 | 0.05 | 0.05 | 0.05 | 0.05 |
| | Inner liner dimension length [mm] | 1300 | 1300 | 1300 | 1300 | 1300 | 1300 | 1300 | 1300 | 1300 |
| | Ply dimension length [mm] | 1250 | 1250 | 1250 | 1250 | 1250 | 1250 | 1300 | 1260 | 700 |
| | Displaced amount between inner liner and carcass ply in width direction [mm] | 50 | 50 | 50 | 50 | 50 | 50 | 0 | 40 | 600 |
| Evaluation | Weather resistance index | 100 | 98 | 98 | 98 | 98 | 98 | 94 | 98 | 99 |
| | Flex crack growth index | 100 | 100 | 99 | 93 | 95 | 100 | 89 | 95 | 95 |
| | Elasticity change index | 100 | 97 | 99 | 97 | 97 | 97 | 88 | 94 | 97 |
| | Durability driving index | 100 | 98 | 98 | 98 | 98 | 98 | 81 | 93 | 98 |
| | Uniformity | 100 | 100 | 99 | 99 | 99 | 99 | 93 | 92 | 99 |

*Comp. F.: Comparative formulation
**Ex. F: Example formulation

<Performance Test>

A performance test in the examples and comparative examples was performed in the following manner.

<Weather Resistance Index>

The inside of the inner liner of each tire was subjected to a weather resistance test using Sunshine Super Long-Life Weather Meter manufactured by Suga Test Instruments Co., Ltd., under the following conditions. Irradiation was conducted for 60 hours at a temperature in a bath of 63° C., at a humidity of 50%, at 60° C., and with rainfall for 12 minutes. The number of cracked portions in the inner liner after the test was determined. Using the value in Comparative Example 6-1 as a reference value, a relative value of the number of cracked portions in each of other comparative examples and examples were determined, and a weather resistance index was calculated by the following equation. The greater the value, the more excellent the weather resistance.

weather resistance index=(number of cracked portions in Comparative Example 6-1)/(number of cracked portions in each example and comparative example)×100

<Flex Crack Growth Index>

The flex crack growth index was determined based on the evaluation method described above.

<Elastic Modulus Change Index>

Under the conditions similar to those for the flex crack growth test, the inner liner of each pneumatic tire was evaluated on the increasing rate of dynamic elastic modulus (E') before driving and after driving for 20,000 km, using Viscoelasticity Spectrometer VES (Iwamoto Factory) under the conditions of a temperature of 70° C., an initial strain of 10%, and a dynamic strain of 2%. Using the value in Comparative Example 6-1 as a reference value, an elastic modulus change index was determined as a relative value of dynamic elastic modulus (E') in each comparative example and each example. The greater the value of the index, the smaller the increasing rate of the elastic modulus, which is more excellent.

elastic modulus change rate=(elastic modulus after driving)/(elastic modulus before driving)×100 elastic modulus change index=(elastic modulus change rate in Comparative Example 6-1)/(elastic modulus change rate in each example and comparative example)×100

<Durability Driving Test>

In a durability driving test, a driving distance until a tire was damaged was measured with oxygen being injected. Each prototype tire was left for 336 hours in an atmosphere of 90% of oxygen and a relative humidity of 70%. Thereafter, the tire was mounted on a rim, and 100% of oxygen was injected. The tire was left for 336 hours at an internal pressure of 350 kPa in the atmosphere of 90% of oxygen and a relative humidity of 70%. Thereafter, the tire was mounted on a JIS standard rim 15×6JJ, and 100% of oxygen was injected to prepare a tire having an internal pressure set to 280 kPa.

Driving was started under the conditions of a load of 500 kg and a speed of 170 km/hour. A break-in was conducted for 10 minutes, followed by cooling. Driving was started again at 170 km/hour. The speed was increased by 10 km/hour every 20 minutes during driving, and the driving speed was measured until the tire was broken down.

The driving distance at the time of breakdown in each comparative example and each example was determined, and its relative value was calculated as an index, using the value in Comparative Example 6-1 as a reference value. The greater the value of the index, the higher the durability driving speed, which is more excellent.

durability driving speed index=(driving speed at breakdown in each example and comparative example)/(driving speed at breakdown in comparative example 6-1)×100.

<Uniformity>

The uniformity was determined based on the test method described above.

<Evaluation Results>

In the examples of the present invention, both of the first layer and the second layer were blended with an ultraviolet absorber and an antioxidant by 0.5 to 40% by mass relative to the elastomer component. It is recognized that the weather resistance index in each of the examples has a value significantly higher than those in the comparative examples in which an ultraviolet absorber and an antioxidant in an amount outside of the above range were blended.

INDUSTRIAL APPLICABILITY

The method for manufacturing the pneumatic tire in accordance with the present invention is applicable to methods for manufacturing pneumatic tires for passenger cars, trucks and buses, heavy equipment, and the like.

REFERENCE SIGNS LIST

1: laminate; 2: inner liner; 3: unvulcanized rubber sheet; 4: cut sheet; 5: drum; L: displaced distance (amount); 11: pneumatic tire; 12: tread part; 13: sidewall part; 14: bead part; 15: bead core; 16: carcass ply; 17: belt layer; 18: bead apex; 19: inner liner; PL: polymer laminate; PL1: first layer; PL2, PL3: second layer.

What is claimed:

1. A method for manufacturing a pneumatic tire having an inner liner on an inner side of the tire, by molding of an unvulcanized form of the tire, the method of molding of the unvulcanized form of the tire comprising:
    (a) an assembly step of preparing an unvulcanized rubber sheet and the inner liner which has a width larger than that of said unvulcanized rubber sheet, and bonding said inner liner and said unvulcanized rubber sheet with end portions thereof in a width direction being displaced from each other by 50 mm to 500 mm in the width direction such that both end portions of said unvulcanized rubber sheet in the width direction are located on an inner side of both end portions of said inner liner in the width direction to manufacture a laminate;
    (b) a cutting step of cutting said laminate to have a constant length corresponding to a width of a drum to manufacture a cut sheet; and
    (c) a joining step of winding said cut sheet around an entire circumference of the drum such that a cut surface of the cut sheet extends in a circumferential direction of the drum and the inner liner is disposed on a radially inner surface of the unvulcanized rubber sheet with respect to the tire, and joining said cut sheet such that the both end portions of said inner liner in the width direction overlap each other,
    said inner liner being a laminate of a first layer and a second layer, the first layer being a polymer composition containing 0.1 to 50 parts by mass of an organic derivative of a clay mineral relative to 100 parts by mass of a thermoplastic elastomer mixture containing 60 to 99% by mass of a styrene-isobutylene-styrene block copolymer and 1 to 40% by mass of a polyamide-based polymer which contains polyamide in a molecular chain and has a Shore D hardness of 70 or less, and having a thickness of 0.05 mm to 0.6 mm, the second layer being disposed on a side of the unvulcanized rubber sheet, made of a thermoplastic elastomer composition, and having a thickness of 0.01 mm to 0.3 mm,
    wherein said second layer is a thermoplastic elastomer composition containing a styrene-isobutylene block copolymer.

2. The method for manufacturing the pneumatic tire according to claim 1, wherein, in said joining step, the both end portions of the unvulcanized rubber sheet in the width direction are joined using an unvulcanized rubber piece.

3. The method for manufacturing the pneumatic tire according to claim 1, wherein said second layer further contains a styrene-isoprene-styrene block copolymer.

4. The method for manufacturing the pneumatic tire according to claim 1, wherein 15 to 30% by mass of an ethylene-vinyl alcohol copolymer is contained in a polymer component of the thermoplastic elastomer mixture of said first layer.

5. The method for manufacturing the pneumatic tire according to claim 1, wherein said styrene-isobutylene-styrene block copolymer contains 10 to 30% by mass of a styrene component.

6. The method for manufacturing the pneumatic tire according to claim 1, wherein said polyamide-based polymer is a block copolymer composed of a polyamide component and a polyether component.

7. The method for manufacturing the pneumatic tire according to claim 1, wherein said unvulcanized rubber sheet is a carcass ply.

* * * * *